(12) United States Patent
Toyooka et al.

(10) Patent No.: US 11,999,157 B2
(45) Date of Patent: Jun. 4, 2024

(54) TRANSFER FILM, LAMINATE, ACOUSTIC SPEAKER, AND METHOD FOR PRODUCING LAMINATE

(71) Applicant: FUJIFILM Corporation, Tokyo (JP)

(72) Inventors: Kentaro Toyooka, Fujinomiya (JP); Masaya Suzuki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/847,579

(22) Filed: Jun. 23, 2022

(65) Prior Publication Data
US 2023/0025871 A1 Jan. 26, 2023

(30) Foreign Application Priority Data

Jun. 24, 2021 (JP) .................................. 2021-105034

(51) Int. Cl.
| | |
|---|---|
| *B32B 7/023* | (2019.01) |
| *B32B 27/08* | (2006.01) |
| *B32B 27/16* | (2006.01) |
| *B32B 37/00* | (2006.01) |
| *C09D 5/00* | (2006.01) |
| *G02B 1/11* | (2015.01) |
| *G02F 1/1335* | (2006.01) |

(52) U.S. Cl.
CPC .............. *B32B 7/023* (2019.01); *B32B 27/08* (2013.01); *B32B 27/16* (2013.01); *B32B 37/025* (2013.01); *C09D 5/006* (2013.01); *G02B 1/11* (2013.01); *G02F 1/133502* (2013.01); *B32B 2250/05* (2013.01); *B32B 2264/102* (2013.01); *B32B 2307/202* (2013.01); *B32B 2307/412* (2013.01); *B32B 2307/418* (2013.01); *B32B 2307/732* (2013.01); *B32B 2457/00* (2013.01); *B32B 2551/00* (2013.01); *G02F 2201/38* (2013.01)

(58) Field of Classification Search
CPC .. B32B 7/023; B32B 37/025; G02B 1/11–118
See application file for complete search history.

(56) References Cited

U.S. PATENT DOCUMENTS

| | | | | |
|---|---|---|---|---|
| 6,689,458 B1 * | 2/2004 | Mikoshiba | .............. | B32B 27/06 |
| | | | | 428/323 |
| 7,294,395 B2 * | 11/2007 | Itoh | .......................... | B32B 27/06 |
| | | | | 428/323 |
| 11,175,435 B1 * | 11/2021 | Ye | ............................ | B29C 55/02 |

(Continued)

FOREIGN PATENT DOCUMENTS

WO 2013/084873 A1 6/2013

*Primary Examiner* — Jasper Saberi
(74) *Attorney, Agent, or Firm* — Sughrue Mion, PLLC

(57) ABSTRACT

An object of the present invention is to provide a transfer film capable of forming a laminate exhibiting excellent antireflection performance in a case of being transferred to a member to be transferred exhibiting a high refractive index. Another object of the present invention is to provide a laminate, an acoustic speaker, and a method for manufacturing a laminate.

A transfer film including a temporary support and a photosensitive composition layer, and
further including a first layer having a lower refractive index than the refractive index of the photosensitive composition layer between the temporary support and the photosensitive composition layer,
in which a refractive index of the first layer is 1.45 or less.

14 Claims, 3 Drawing Sheets

(56) References Cited

U.S. PATENT DOCUMENTS

| | | | | |
|---|---|---|---|---|
| 2008/0118669 A1* | 5/2008 | Inoue | .................... | G02B 1/111 |
| | | | | 428/1.31 |
| 2008/0239488 A1* | 10/2008 | Asakura | ................ | G02B 1/111 |
| | | | | 349/96 |
| 2008/0310019 A1* | 12/2008 | Um | ...................... | G02B 1/111 |
| | | | | 359/580 |
| 2009/0315849 A1* | 12/2009 | Ito | ........................ | C08J 7/046 |
| | | | | 345/173 |
| 2013/0258570 A1* | 10/2013 | Nashiki | ................. | G06F 3/045 |
| | | | | 361/679.01 |
| 2017/0176644 A1* | 6/2017 | Nakayama | ............ | B32B 27/20 |
| 2019/0064397 A1* | 2/2019 | Yun | ....................... | C03C 17/007 |
| 2020/0309995 A1* | 10/2020 | Wells | ..................... | G02B 1/111 |

* cited by examiner

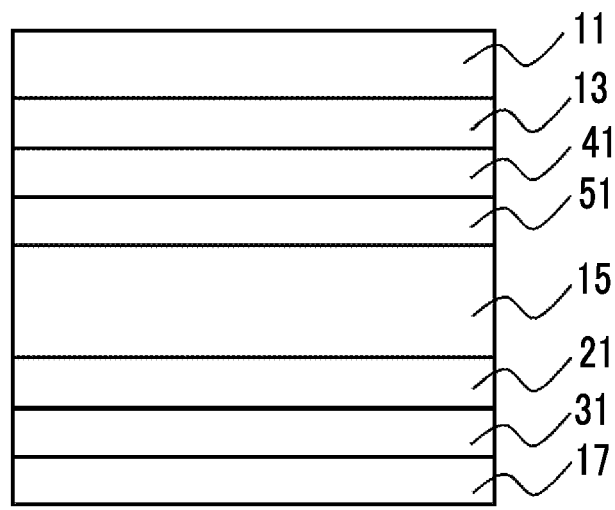
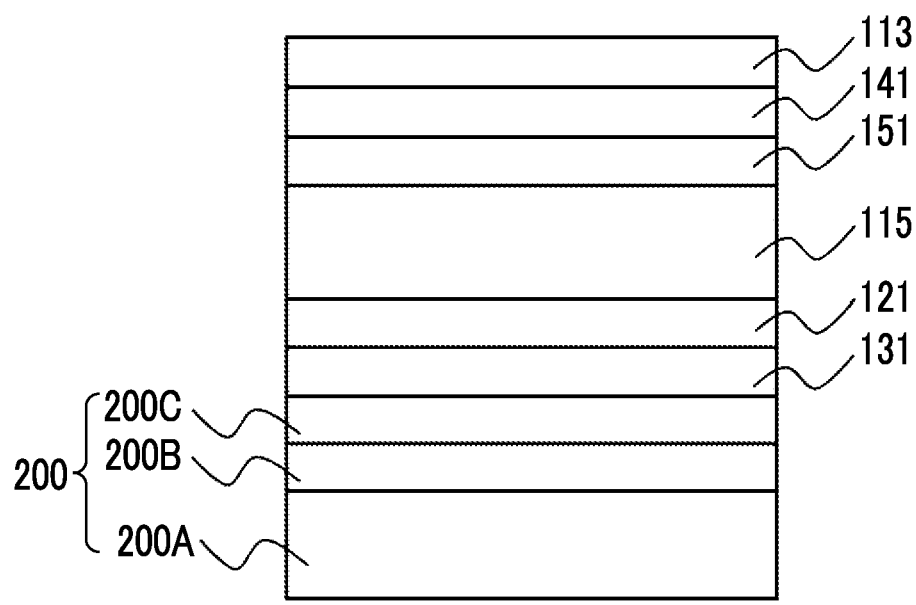

TRANSFER FILM, LAMINATE, ACOUSTIC SPEAKER, AND METHOD FOR PRODUCING LAMINATE

CROSS-REFERENCE TO RELATED APPLICATIONS

The present application claims priority under 35 U.S.C. § 119 to Japanese Patent Application No. 2021-105034, filed on Jun. 24, 2021. The above application is hereby expressly incorporated by reference, in its entirety, into the present application.

BACKGROUND OF THE INVENTION

1. Field of the Invention

The present invention relates to a transfer film, a laminate, an acoustic speaker, and a method for manufacturing a laminate.

2. Description of the Related Art

In recent years, a transfer film including a photosensitive layer has been increasingly used in various fields.

Since the transfer film can contribute to a reduction in cost of a product, it has been proposed to be used as a film for an etching resist, a film for a wiring line protective film, and the like. For example, WO2013/084873A discloses a transfer film for a use as a wiring protective film.

On the other hand, functions required for the transfer film are also increasingly sophisticated, and it is also considered that the transfer film is configured to have a plurality of functional layers laminated.

SUMMARY OF THE INVENTION

Recently, the present inventors have manufactured a transfer film with reference to WO2013/084873A and have conducted studies on the characteristics, and as a result, they have found that in a case where the transfer film is transferred to a member to be transferred exhibiting a high refractive index, the reflectance of a laminate is sometimes too high (in other words, the antireflection performance may be deteriorated).

Therefore, an object of the present invention is to provide a transfer film capable of forming a laminate exhibiting excellent antireflection performance in a case where the transfer film is transferred to a member to be transferred exhibiting a high refractive index.

In addition, another object of the present invention is to provide a laminate, an acoustic speaker, and a method for manufacturing a laminate.

The present inventors have conducted intensive studies to accomplish the objects, and as a result, they have found that the objects can be accomplished by the following configurations.

[1] A transfer film comprising:
a temporary support;
a photosensitive composition layer; and
a first layer exhibiting a lower refractive index than a refractive index of the photosensitive composition layer, between the temporary support and the photosensitive composition layer,
in which a refractive index of the first layer is 1.45 or less.
[2] The transfer film as described in [1], further comprising a second layer exhibiting a higher refractive index than the refractive index of the photosensitive composition layer on a side opposite to the temporary support side of a photosensitive composition layer.
[3] The transfer film as described in [2],
in which a refractive index on a surface of the second layer on the photosensitive composition layer side is lower than a refractive index on a surface of the second layer on a side opposite to the photosensitive composition layer side.
[4] The transfer film as described in [2] or [3], further comprising a fourth layer exhibiting a lower refractive index than a refractive index of the photosensitive composition layer on a side opposite to the photosensitive composition layer side of the second layer.
[5] The transfer film as described in any one of [2] to [4], in which the second layer includes a metal oxide.
[6] The transfer film as described in any one of [1] to [5], in which a refractive index on a surface of the first layer on the temporary support side is lower than the refractive index on a surface of the first layer on a photosensitive composition layer side.
[7] The transfer film as described in any one of [1] to [6], further comprising a third layer exhibiting a higher refractive index than the refractive index of the photosensitive composition layer between the first layer and the photosensitive composition layer.
[8] The transfer film as described in any one of [1] to [7], in which the first layer includes hollow particles.
[9] The transfer film as described in any one of [1] to [8], in which the first layer includes inorganic particles.
[10] The transfer film as described in any one of [1] to [9], in which the photosensitive composition layer includes an alkali-soluble resin.
[11] The transfer film as described in any one of [1] to [10],
in which the photosensitive composition layer is transparent.
[12] The transfer film as described in any one of [1] to [10],
in which the photosensitive composition layer is black.
[13] A laminate comprising, in the following order:
a substrate;
a layer with a high refractive index;
a resin layer; and
a first refractive index-adjusting layer,
in which a refractive index of the layer with a high refractive index is higher than a refractive index of the resin layer,
a refractive index of the first refractive index-adjusting layer is lower than the refractive index of the resin layer, and
the refractive index of the first refractive index-adjusting layer is 1.45 or less.
[14] The laminate as described in [13], further comprising a second refractive index-adjusting layer exhibiting a higher refractive index than the refractive index of the resin layer, between the resin layer and the layer with a high refractive index.
[15] The laminate as described in [14],
in which a refractive index on a surface of the second refractive index-adjusting layer on the resin layer side is lower than a refractive index on a surface of the second refractive index-adjusting layer on a side opposite to the resin layer side.
[16] The laminate as described in [14] or [15], further comprising a fourth refractive index-adjusting layer exhibiting a lower refractive index than the refractive index of the resin layer on a side opposite to the resin layer side of the second refractive index-adjusting layer.

[17] The laminate as described in any one of [13] to [15], in which a refractive index on a surface of the first refractive index-adjusting layer on a side opposite to the resin layer side is lower than a refractive index on a surface of the first refractive index-adjusting layer on the resin layer side.

[18] The laminate as described in any one of [13] to [17], further comprising a third refractive index-adjusting layer exhibiting a higher refractive index than the refractive index of the resin layer between the first refractive index-adjusting layer and the resin layer.

[19] The laminate as described in any one of [13] to [18], in which the resin layer is a cured product layer formed by curing a photosensitive composition.

[20] The laminate as described in any one of [13] to [19], in which the layer with a high refractive index is a transparent conductive layer.

[21] A laminate comprising, in the following order:
a substrate;
a layer with a high refractive index;
a second refractive index-adjusting layer;
a resin layer; and
a first refractive index-adjusting layer,
in which the layer with a high refractive index is a transparent conductive layer,
a refractive index of the layer with a high refractive index is higher than the second refractive index-adjusting layer,
a refractive index of the second refractive index-adjusting layer is higher than a refractive index of the resin layer,
a refractive index of the first refractive index-adjusting layer is lower than the refractive index of the resin layer, and
the refractive index of the first refractive index-adjusting layer is 1.45 or less.

[22] An acoustic speaker comprising the laminate as described in any one of [13] to [21].

[23] A method for producing a laminate, comprising:
an affixing step of affixing a surface of the transfer film as described in any one of [1] to [12] on a side opposite to the temporary support, and a member to be transferred to each other;
an exposing step of exposing the photosensitive composition layer; and
a peeling step of peeling the temporary support between the affixing step and the exposing step, or after the exposing step.

[24] A method for producing a laminate, comprising:
an affixing step of affixing a surface of the transfer film as described in any one of [1] to [12] on a side opposite to the temporary support, a substrate, and a surface on a transparent conductive layer side of a member to be transferred having the transparent conductive layer arranged on the substrate to one another;
an exposing step of exposing the photosensitive composition layer; and
a peeling step of peeling the temporary support between the affixing step and the exposing step, or after the exposing step.

According to the present invention, it is possible to provide a transfer film capable of forming a laminate exhibiting excellent antireflection performance in a case of being transferred to a member to be transferred exhibiting a high refractive index.

In addition, according to the present invention, it is possible to provide a laminate, an acoustic speaker, and a method for manufacturing a laminate.

BRIEF DESCRIPTION OF THE DRAWINGS

FIG. 7 shows a schematic view for explaining a positional relationship of the respective layers included in transfer films manufactured in Examples and Comparative Examples.

FIG. 8 shows a schematic view for explaining a positional relationship of the respective layers included in laminates manufactured in Examples and Comparative Examples.

DESCRIPTION OF THE PREFERRED EMBODIMENTS

Figure 1:
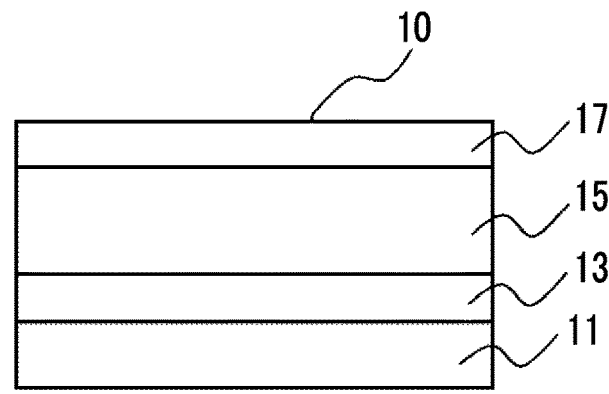
FIG. 1 is a schematic cross-sectional view showing an example of an embodiment of the transfer film of the present invention.

Hereinafter, the details of the present invention will be described.

In the present specification, numerical ranges represented by "to" include numerical values before and after "to" as lower limit values and upper limit values.

With regard to ranges of numerical values disclosed stepwise in the present specification, an upper limit value and a lower limit value disclosed in a certain range of numerical values may be replaced with an upper limit value and a lower limit value disclosed in another range of numerical values disclosed in stepwise. In addition, in the range of numerical values disclosed in the present specification, an upper limit value and a lower limit value disclosed in a certain range of numerical values may be replaced with values shown in Examples.

In the present specification, the term "step" includes not only an independent step but also a step that cannot be clearly distinguished from other steps, as long as the intended purpose of the step is achieved.

In the present specification, unless otherwise specified, the weight-average molecular weight (Mw) and the number-average molecular weight (Mn) are values converted in terms of polystyrene as a standard substance, measured by a gel permeation chromatography (GPC) analyzer, for which TSKgel GMHxL, TSKgel G4000HxL, or TSKgel G2000HxL (all product names manufactured by Tosoh Corporation) is used as columns, a tetrahydrofuran (THF) is used as an eluent, a differential refractometer is as a detector, and polystyrene is used as a standard substance.

In addition, in the present specification, unless otherwise specified, a molecular weight of a compound having a molecular weight distribution is the weight-average molecular weight (Mw).

In the present specification, the content of a metal element is a value measured using an inductively coupled plasma (ICP) spectroscopic apparatus unless otherwise specified.

In the present specification, the hue is a value measured using a colorimeter (CR-221, manufactured by Minolta Co., Ltd.) unless otherwise specified.

In the present specification, "(meth)acryl" is a term with a concept encompassing both acryl and methacryl, a "(meth) acryloyl group" is a term with a concept encompassing both an acryloyl group and a methacryloyl group, a "(meth) acrylamide group" is a term with a concept encompassing both an acrylamide group and a methacrylamide group, and "(meth)acrylate" is a term with a concept encompassing both acrylate and methacrylate.

Furthermore, in the present specification, a term "alkali-soluble" means that the solubility in 100 g of a 1%-by-mass aqueous sodium carbonate solution having a liquid temperature of 22° C. is 0.1 g or more. Therefore, for example, an alkali-soluble resin is intended to be a resin that satisfies the above-mentioned solubility condition.

In the present specification, a term "water-soluble" means that the solubility in 100 g of water with a pH of 7.0 at a liquid temperature of 22° C. is 0.1 g or more. Therefore, for example, a water-soluble resin is intended to be a resin that satisfies the above-mentioned solubility condition.

In the present specification, a "solid content" of a composition refers to components that form a composition layer formed using the composition, and in a case where the composition includes a solvent (an organic solvent, water, and the like), the solid content means all components except the solvent. Moreover, in a case where the components are components that form a composition layer, the components are considered to be solid contents even in a case where the components are liquid components.

In the present specification, a term "transparent" means that an average transmittance of visible light at a wavelength of 400 to 700 nm is 80% or more, and preferably 90% or more. Accordingly, a "transparent layer" as mentioned means a layer having an average transmittance of visible light at a wavelength of 400 nm to 700 nm of 80% or more. For the average transmittance, straight-moving transmitted light is measured every 1 nm.

In the present specification, the average transmittance of visible light is a value measured at 25° C. using a spectrophotometer, and can be measured, for example, using a spectrophotometer U-3310 manufactured by Hitachi, Ltd.

In addition, in the present specification, the thicknesses of the first layer to the fifth layer and photosensitive composition layer, and the thicknesses of the first refractive index-adjusting layer to the sixth refractive index-adjusting layer are values obtained using an average value of the thicknesses measured at 10 points by observing cross-sections cut by a microtome with a scanning electron microscope (SEM) or a transmission electron microscope (TEM) unless otherwise specified. It should be noted that the thickness of a layer with a thickness of 1 μm or more is measured by SEM, and a layer with a thickness of less than 1 μm is measured by TEM.

In addition, in the present specification, the refractive index is intended to be a refractive index at a wavelength of 550 nm, measured at 25° C. based on a measuring device in accordance with an ellipsometry method, unless otherwise specified. In particular, the refractive indices of the first layer to fifth layer and the photosensitive composition layer, the refractive indices of the first refractive index-adjusting layer to the sixth refractive index-adjusting layer, the refractive index of the layer with a high refractive index, and the refractive index of the transparent conductive layer are intended to be each a refractive index at a wavelength of 550 nm, which can be obtained by measurement of a reflection spectrum (wavelength: 400 to 1,000 nm) at 25° C. using a measuring device in accordance with an ellipsometry method, and fitting using a Cauchy model unless otherwise specified.

Transfer Film

The transfer film of an embodiment of the present invention is a transfer film including a temporary support and a photosensitive composition layer, in which the transfer film further includes a first layer exhibiting a lower refractive index than the refractive index of the photosensitive composition layer between the temporary support and the photosensitive composition layer (the first layer is hereinafter simply referred to as a "first layer"), and a refractive index of the first layer is 1.45 or less.

According to the transfer film of the embodiment of the present invention having the configuration, for example, in a case where a member to be transferred having a layer exhibiting a relatively high refractive index (the layer being hereinafter also referred to as a "layer with a high refractive index") on a side of a surface to be transferred (the member being hereinafter referred to as a "member containing a layer with a high refractive index"), it is possible to form a laminate exhibiting excellent antireflection performance.

With regard to the action, the present inventors have inferred this matter as follows.

A laminate formed by transferring the transfer film of the embodiment of the present invention onto a member containing a layer with a high refractive index, and performing an exposure treatment has a layer derived from the first layer (first refractive index-adjusting layer), a layer derived from a photosensitive composition layer (resin layer), and the member containing a layer with a high refractive index in this order.

In the laminate, since the first refractive index-adjusting layer having a lower refractive index than the resin layer is arranged on the air interface side, reflection of light entering from the air interface side is unlikely to occur, as compared with a laminate having no first refractive index-adjusting layer.

In addition, it has been confirmed by the present inventors that the antireflection performance is remarkably excellent in a case where the refractive index of the first layer in the transfer film is 1.45 or less.

As an example of a use of the transfer film of the embodiment of the present invention, a use of the transfer film as a protective film for a member containing a layer with a high refractive index having an image display surface may be mentioned. In a case where a laminate is formed by transferring the transfer film of the embodiment of the present invention to a member containing a layer with a high refractive index having an image display surface, the obtained laminate suppresses reflection of light entering from the first refractive index-adjusting layer side (in other words, the transmittance of the light entering from the first refractive index-adjusting layer side is higher), and thus, the image display surface of the member containing a layer with a high refractive index is more easily visible.

In the following, a case where the reflectance of the laminate formed by transferring the transfer film of the embodiment of the present invention to the member containing a layer with a high refractive index is lower, and/or the reflected light of the laminate formed by transferring the transfer film of the embodiment of the present invention to the member containing a layer with a high refractive index is less colored may be described as follows: "the effect of the present invention is more excellent".

Furthermore, as described above, the member containing a layer with a high refractive index means a member to be transferred having a layer exhibiting a relatively high refractive index (layer with a high refractive index) on a surface to be transferred. Incidentally, the layer with a high refractive index typically has a higher refractive index than the refractive index of the photosensitive composition layer.

Hereinafter, the configurations of the transfer film of the embodiment of the present invention will be described more specifically with reference to the drawings.

First Embodiment

FIG. 1 is a schematic cross-sectional view showing an example of the first embodiment of the transfer film of the present invention.

A transfer film 10 has a temporary support 11, a first layer 13, a photosensitive composition layer 15, and a protective film 17 in this order. The refractive index of the first layer 13 is 1.45 or less, and is lower than the refractive index of the photosensitive composition layer 15.

Incidentally, the transfer film 10 shown in FIG. 1 has a form in which the protective film 17 is arranged, but the protective film 17 may not be arranged.

In addition, the first layer 13 and the photosensitive composition layer 15 are preferably transparent layers. The definitions of the terms "transparent" and "transparent layer" are as mentioned above.

Hereinafter, each of the elements constituting the transfer film 10 will be described.

Temporary Support

The transfer film has a temporary support.

The temporary support is a member that supports the photosensitive composition layer and the first layer, and is finally removed by a peeling treatment.

The temporary support may be a monolayer structure or a multilayer structure.

The temporary support is preferably a film, and more preferably a resin film. As the temporary support, a film which has flexibility and does not generate significant deformation, contraction, or stretching under pressure or under pressure and heating is preferable.

Examples of such a film include a polyethylene terephthalate film (for example, a biaxially stretching polyethylene terephthalate film), a polymethyl methacrylate film, a cellulose triacetate film, a polystyrene film, a polyimide film, and a polycarbonate film.

Among those, the polyethylene terephthalate film is preferable as the temporary support.

In addition, it is preferable that the film used as the temporary support does not have deformations such as a wrinkles, and scars.

From the viewpoint that pattern exposure through the temporary support can be performed, the temporary support preferably has high transparency, and the transmittance at 365 nm is preferably 60% or more, and more preferably 70% or more.

From the viewpoint of the pattern forming properties during pattern exposure through the temporary support and the transparency of the temporary support, it is preferable that the haze of the temporary support is small. Specifically, the haze value of the temporary support is preferably 2% or less, more preferably 0.5% or less, and still more preferably 0.1% or less.

From the viewpoint of the pattern forming properties during pattern exposure through the temporary support and the transparency of the temporary support, it is preferable that the number of fine particles, foreign substances, and defects included in the temporary support is small. The number of fine particles having a diameter of 1 μm or more, foreign substances, and defects in the temporary support is preferably 50 pieces/10 $mm^2$ or less, more preferably 10 pieces/10 $mm^2$ or less, still more preferably 3 pieces/10 $mm^2$ or less, and particularly preferably 0 piece/10 $mm^2$.

A thickness of the temporary support is not particularly limited, but is preferably 5 to 200 μm, more preferably 5 to 150 μm, still more preferably 5 to 50 μm, and most preferably 5 to 25 μm from the viewpoint of easiness of handling and versatility. The thickness of the temporary support can be calculated as an average value at any 5 points measured by cross-section observation with a scanning electron microscope (SEM).

In addition, for the purpose of improving the adhesiveness between the temporary support and a composition layer formed on the temporary support, a surface of the temporary support on a side in contact with the composition layer may be modified by irradiation with ultraviolet rays (UV), corona discharge, plasma, or the like In a case where a surface modification of the temporary support is carried out by UV irradiation, the exposure amount is preferably 10 to 2,000 $mJ/cm^2$, and more preferably 50 to 1,000 $mJ/cm^2$. Furthermore, examples of the light source include a low-pressure mercury lamp, a high pressure mercury lamp, an ultra-high pressure mercury lamp, a carbon arc lamp, a metal halide lamp, a xenon lamp, a chemical lamp, an electrodeless discharge lamp, and a light emitting diode (LED), which emit a light in a wavelength range of 150 to 450 nm. As long as the amount of light irradiated is within this range, the lamp output or the illuminance is not particularly limited.

Examples of the temporary support include a biaxially stretching polyethylene terephthalate film having a film thickness of 16 μm, a biaxially stretching polyethylene terephthalate film having a film thickness of 12 μm, and a biaxially stretching polyethylene terephthalate film having a film thickness of 9 μm.

Preferred aspects of the temporary support are described in, for example, paragraphs [0017] and [0018] of JP2014-085643A, paragraphs [0019] to [0026] of JP2016-027363A, paragraphs [0041] to [0057] of WO2012/081680A, and paragraphs [0029] to [0040] of WO2018/179370A, the contents of which are incorporated herein by reference.

From the viewpoint of imparting handleability, a layer (lubricant layer) including fine particles may be provided on a surface of the temporary support. The lubricant layer may be provided on one surface of the temporary support or on both surfaces thereof. A diameter of the particles included in the lubricant layer is preferably 0.05 to 0.8 μm.

In addition, a film thickness of the lubricant layer is preferably 0.05 to 1.0 μm. Examples of a commercially available product of the temporary support include LUMIRROR 16KS40 and LUMIRROR 16FB40 (both manufactured by Toray Industries, Inc.), and COSMOSHINE A4100, COSMOSHINE A4300, and COSMOSHINE A8300 (all manufactured by TOYOBO Co., Ltd.).

Photosensitive Composition

The transfer film has a photosensitive composition layer.

A resin layer having a refractive index adjusted to a predetermined level can be formed by transferring the photosensitive composition layer onto an object to be transferred, followed by performing exposure.

In addition, a pattern can be formed on the object to be transferred by transferring the photosensitive composition layer onto the object to be transferred followed by performing exposure and development.

As the photosensitive composition layer, a negative tone photosensitive composition layer is preferable. Incidentally, the negative tone photosensitive composition layer is a photosensitive composition layer having a solubility in a developer that decreases by exposure to an exposed portion. In a case where the photosensitive composition layer is a negative tone photosensitive composition layer, a pattern thus formed corresponds to a cured layer.

Refractive Index of Photosensitive Composition Layer

A refractive index of the photosensitive composition layer is preferably more than 1.45, more preferably 1.47 to 1.56, and still more preferably 1.49 to 1.54.

Thickness of Photosensitive Composition Layer

A thickness of the photosensitive composition layer is not particularly limited, but is often 30 μm or less, preferably 20 μm or less, more preferably 15 μm or less, still more preferably 10 μm or less, and particularly preferably 5.0 μm or less. The lower limit is preferably 0.60 μm or more, and more preferably 1.5 μm or more from the viewpoint that the strength of a film obtained by curing the photosensitive composition layer is excellent.

The thickness of the photosensitive composition layer can be calculated, for example, as an average value at any 5 random points measured by cross-section observation with a scanning electron microscope (SEM).

Color of Photosensitive Composition Layer

The photosensitive composition layer is preferably achromatic. Specifically, in CIE1976 (L*, a*, b*) color space of the total reflection (incidence angle: 8°, light source: D-65 (visual field: 2°)), the L* value is preferably 10 to 90, the a* value is preferably −1.0 to 1.0, and the b* value is preferably −1.0 to 1.0.

Furthermore, a pattern obtained by curing the photosensitive composition layer (a cured film of the photosensitive composition layer) is preferably achromatic.

Specifically, in CIE1976 (L*, a*, b*) color space, the total reflection (incidence angle: 8°, light source: D-65 (visual field: 2°)) preferably has a pattern L* value of 10 to 90, preferably has a pattern a* value of −1.0 to 1.0, and preferably has a pattern b* value of −1.0 to 1.0.

Moisture Permeability of Photosensitive Composition Layer

A moisture permeability of a pattern obtained by curing the photosensitive composition layer (a cured film of the photosensitive composition layer) at a film thickness of 40 μm is preferably 500 g/m$^2$/24 hr or less, more preferably 300 g/m$^2$/24 hr or less, and still more preferably 100 g/m$^2$/24 hr or less from the viewpoint of rust preventing properties.

Furthermore, the moisture permeability is measured with a cured film by curing the photosensitive composition layer by exposing the photosensitive composition layer with an i-line at an exposure amount of 300 mJ/cm$^2$ and then performing post-baking at 145° C. for 30 minutes.

Components of Photosensitive Composition Layer

The photosensitive composition layer preferably includes at least a binder polymer, a polymerizable compound, and a polymerization initiator. As a suitable example of the content of each of the components in the photosensitive composition layer, for example, an aspect in which a content of the resin is 30.0% to 80.0% by mass, a content of the polymerizable compound is 15.0% to 70.0% by mass, and a content of the polymerization initiator is 0.01% to 10.0% by mass, with respect to a total mass of the photosensitive composition layer, may be mentioned.

Hereinafter, the components which can be included in the photosensitive composition layer will be described in detail.

Binder Polymer

The photosensitive composition layer may include a binder polymer.

Examples of the binder polymer include a (meth)acrylic resin, a styrene resin, an epoxy resin, an amide resin, an amide epoxy resin, an alkyd resin, a phenol resin, an ester resin, a urethane resin, an epoxy acrylate resin obtained by a reaction of an epoxy resin with a (meth)acrylic acid, and an acid-modified epoxy acrylate resin obtained by a reaction of an epoxy acrylate resin with an acid anhydride.

As one of suitable aspects of the binder polymer, a (meth)acrylic resin may be mentioned from the viewpoint that it has excellent alkali developability and film-forming properties.

Furthermore, in the present specification, the (meth) acrylic resin means a resin having a constitutional unit derived from a (meth)acrylic compound.

A content of the constitutional unit derived from the (meth)acrylic compound is preferably 50% by mass or more, more preferably 70% by mass or more, and still more preferably 90% by mass or more with respect to all the constitutional units of the (meth)acrylic resin.

The (meth)acrylic resin may be composed of only a constitutional unit derived from the (meth)acrylic compound, or may have a constitutional unit derived from a polymerizable monomer other than the (meth)acrylic compound. That is, the upper limit of the content of the constitutional unit derived from the (meth)acrylic compound is 100% by mass or less with respect to all the constitutional units of the (meth)acrylic resin.

Examples of the (meth)acrylic compound include a (meth)acrylic acid, a (meth)acrylic acid ester, a (meth) acrylamide, and a (meth)acrylonitrile.

Examples of the (meth)acrylic acid ester include an alkyl (meth)acrylate ester, a tetrahydrofurfuryl (meth)acrylate ester, a dimethylaminoethyl (meth)acrylate ester, a diethylaminoethyl (meth)acrylate ester, a (meth)acrylic acid ester, a glycidyl acrylate ester, a benzyl (meth)acrylate ester, a 2,2,2-trifluoroethyl (meth)acrylate, and 2,2,3,3-tetrafluoropropyl (meth)acrylate, and the alkyl (meth)acrylate ester is preferable.

Examples of the (meth)acrylamide include acrylamides such as diacetone acrylamide.

The alkyl group of the alkyl (meth)acrylate ester may be linear or branched. Specific examples of the alkyl (meth) acrylate ester include alkyl (meth)acrylate esters having an alkyl group having 1 to 12 carbon atoms, such as methyl (meth)acrylate, ethyl (meth)acrylate, propyl (meth)acrylate, butyl (meth)acrylate, pentyl (meth)acrylate, hexyl (meth) acrylate, heptyl acrylate, octyl (meth)acrylate, 2-ethylhexyl (meth)acrylate, nonyl (meth)acrylate, decyl (meth)acrylate, undecyl (meth)acrylate, and dodecyl (meth)acrylate.

As the (meth)acrylic acid ester, an alkyl (meth)acrylate ester having an alkyl group having 1 to 4 carbon atoms is preferable, and methyl (meth)acrylate or ethyl (meth)acrylate is more preferable.

The (meth)acrylic resin may have a constitutional unit other than the constitutional unit derived from the (meth) acrylic compound.

A polymerizable monomer that forms the constitutional unit is not particularly limited as long as it is a compound other than the (meth)acrylic compound which can be copolymerized with the (meth)acrylic compound, and styrene compounds may have a substituent, for example, at an α-position or an aromatic ring of styrene, vinyl toluene, α-methylstyrene, and the like, vinyl alcohol esters such as styrene compounds, acrylonitrile, and vinyl-n-butyl ether, maleic acid monoesters such as maleic acid, maleic acid anhydride, monomethyl maleate, monoethyl maleate, and monoisopropyl maleate, fumaric acid, cinnamic acid, α-cyanocinnamic acid, itaconic acid, and crotonic acid.

These polymerizable monomers may be used alone or in combination of two or more kinds thereof.

In addition, from the viewpoint of improving alkali developability, it is preferable that the (meth)acrylic resin has a constitutional unit having an acid group. Examples of the acid group include a carboxyl group, a sulfo group, a phosphoric acid group, and a phosphonic acid group.

Among those, the (meth)acrylic resin more preferably has a constitutional unit having a carboxyl group, and more preferably has a constitutional unit derived from the above-mentioned (meth)acrylic acid.

A content of the constitutional unit having an acid group (preferably the constitutional unit derived from a (meth)acrylic acid) in the (meth)acrylic resin is preferably 10% by mass or more with respect to a total mass of the (meth)acrylic resin from the viewpoint that the developability is excellent. In addition, the upper limit value is not particularly limited, and is preferably 50% by mass or less, and more preferably 40% by mass or less from the viewpoint that the alkali resistance is excellent.

In addition, the (meth)acrylic resin more preferably has a constitutional unit derived from the above-mentioned alkyl (meth)acrylate ester.

A content of the constitutional unit derived from the alkyl (meth)acrylate ester in the (meth)acrylic resin is preferably 50% to 90% by mass, more preferably 60% to 90% by mass, and still more preferably 65% to 90% by mass with respect to all the constitutional units of the (meth)acrylic resin.

As the (meth)acrylic resin, a resin having both a constitutional unit derived from a (meth)acrylic acid and a constitutional unit derived from a (meth)alkyl acrylate ester is preferable, and a resin composed only of a constitutional unit derived from a (meth)acrylic acid and a constitutional unit derived from an alkyl (meth)acrylate ester is more preferable.

In addition, as the (meth)acrylic resin, an acrylic resin having a constitutional unit derived from a methacrylic acid, a constitutional unit derived from methyl methacrylate, and a constitutional unit derived from ethyl acrylate is also preferable.

Moreover, the (meth)acrylic resin preferably has at least one selected from the group consisting of a constitutional unit derived from a methacrylic acid and a constitutional unit derived from an alkyl methacrylate ester, and more preferably has both of the constitutional unit derived from a methacrylic acid and the constitutional unit derived from an alkyl methacrylate ester.

A total content of the constitutional unit derived from a methacrylic acid and the constitutional unit derived from an alkyl methacrylate ester in the (meth)acrylic resin is preferably 40% by mass or more, and more preferably 60% by mass or more with respect to all the constitutional units of the (meth)acrylic resin. The upper limit is not particularly limited, and may be 100% by mass or less, and preferably 80% by mass or less.

In addition, the (meth)acrylic resin more preferably has at least one selected from the group consisting of a constitutional unit derived from a methacrylic acid and a constitutional unit derived from an alkyl methacrylate ester, and at least one selected from the group consisting of a constitutional unit derived from an acrylic acid and a constitutional unit derived from an alkyl acrylate ester.

A total content of the constitutional unit derived from a methacrylic acid and the constitutional unit derived from an alkyl methacrylate ester is preferably 60/40 to 80/20 with respect to a total content of the constitutional unit derived from an acrylic acid and the constitutional unit derived from an alkyl acrylate ester in terms of a mass ratio.

The (meth)acrylic resin preferably has an ester group at a terminal thereof from the viewpoint that the developability of the photosensitive composition layer after transfer is excellent.

Furthermore, the terminal part of the (meth)acrylic resin is composed of a site derived from a polymerization initiator used in the synthesis. A (meth)acrylic resin having an ester group at a terminal thereof can be synthesized by using a polymerization initiator that generates a radical having an ester group.

In addition, as another suitable aspect of the binder polymer, an alkali-soluble resin may be mentioned.

For example, from a viewpoint of developability, the binder polymer is preferably a binder polymer having an acid value of 60 mgKOH/g or more.

In addition, from the viewpoint that it is easy to form a strong film by thermal crosslinking with a crosslinking component by heating, for example, the binder polymer is more preferably a resin (so-called a carboxyl group-containing resin) having an acid value of 60 mgKOH/g or more and having a carboxyl group, and still more preferably a (meth)acrylic resin (so-called a carboxyl group-containing (meth)acrylic resin) having an acid value of 60 mgKOH/g or more and having a carboxyl group.

In a case where the binder polymer is a resin having a carboxyl group, for example, the three-dimensional crosslinking density can be increased by adding a thermal crosslinking compound such as a blocked isocyanate compound and thermal crosslinking. In addition, in a case where the carboxyl group of the resin having a carboxyl group is anhydrous and hydrophobized, wet heat resistance can be improved.

The carboxyl group-containing (meth)acrylic resin having an acid value of 60 mgKOH/g or more is not particularly limited as long as the conditions of acid value are satisfied, and a known (meth)acrylic resin can be appropriately selected.

For example, a carboxyl group-containing acrylic resin having an acid value of 60 mgKOH/g or more among polymers described in paragraph [0025] of JP2011-095716A, a carboxyl group-containing acrylic resin having an acid value of 60 mgKOH/g or more among polymers described in paragraphs [0033] to [0052] of JP2010-237589A, and the like can be preferably used.

As another suitable aspect of the binder polymer, a styrene-acrylic copolymer may be mentioned.

Furthermore, in the present specification, the styrene-acrylic copolymer refers to a resin having a constitutional unit derived from a styrene compound and a constitutional unit derived from a (meth)acrylic compound, and a total content of the constitutional unit derived from a styrene compound and the constitutional unit derived from a (meth)acrylic compound is preferably 30% by mass or more, and more preferably 50% by mass or more with respect to all the constitutional units of the copolymer. The upper limit is often 100% by mass or less.

In addition, a content of the constitutional unit derived from the styrene compound is preferably 1% by mass or more, more preferably 5% by mass or more, and still more preferably 5% to 80% by mass with respect to all the constitutional units of the copolymer.

Moreover, a content of the constitutional unit derived from the (meth)acrylic compound is preferably 5% by mass or more, more preferably 10% by mass or more, and still more preferably 20% to 95% by mass with respect to all the constitutional units of the copolymer.

The binder polymer preferably has an aromatic ring structure, and more preferably has a constitutional unit having an aromatic ring structure.

Examples of a monomer that forms the constitutional unit having an aromatic ring structure include a monomer having an aralkyl group, styrene, and a polymerizable styrene derivative (for example, methylstyrene, vinyl toluene, tert-butoxystyrene, acetoxystyrene, 4-vinylbenzoic acid, a styrene dimer, and a styrene trimmer). Among these, the monomer having an aralkyl group, or styrene is preferable.

Examples of the aralkyl group include a substituted or unsubstituted phenylalkyl group (excluding a benzyl group), and a substituted or unsubstituted benzyl group, and the substituted or unsubstituted benzyl group is preferable.

Examples of the monomer having a phenylalkyl group include phenylethyl (meth)acrylate.

Examples of the monomer having a benzyl group include (meth)acrylate having a benzyl group, for example, benzyl (meth)acrylate and chlorobenzyl (meth)acrylate; and a vinyl monomer having a benzyl group, for example, vinylbenzyl chloride and vinylbenzyl alcohol. Among these, benzyl (meth)acrylate is preferable.

In addition, the binder polymer more preferably has a constitutional unit represented by Formula (S) (constitutional unit derived from styrene).

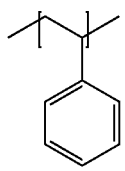

(S)

In a case where the binder polymer has a constitutional unit having an aromatic ring structure, a content of the constitutional unit having an aromatic ring structure is preferably 5% to 90% by mass, and more preferably 10% to 70% by mass, and still more preferably 20% to 60% by mass, with respect to a total mass of the binder polymer.

In addition, the content of the constitutional unit having an aromatic ring structure in the binder polymer is preferably 5% to 70% by mole, more preferably 10% to 60% by mole, and still more preferably 20% to 60% by mole with respect to all the constitutional units of the binder polymer.

Further, the content of the constitutional unit represented by Formula (S) in the binder polymer is preferably 5% to 70% by mole, more preferably 10% to 60% by mole, still more preferably 20% to 60% by mole, and particularly preferably 20% to 50% by mole with respect to all the constitutional units of the binder polymer.

Moreover, in the present specification, in a case where the content of a "constitutional unit" is defined by a molar ratio, the "constitutional unit" has the same definition as that of the "monomer unit". In addition, in the present specification, the "monomer unit" may be modified after polymerization by a polymer reaction or the like. The same applies to the following.

The binder polymer preferably has an aliphatic hydrocarbon ring structure. That is, the binder polymer preferably has a constitutional unit having an aliphatic hydrocarbon ring structure. The aliphatic hydrocarbon ring structure may be either a monocycle or a polycycle. Above all, the binder polymer more preferably has a ring structure in which two or more aliphatic hydrocarbon rings are fused.

Examples of a ring constituting the aliphatic hydrocarbon ring structure in the constitutional unit having an aliphatic hydrocarbon ring structure include a tricyclodecane ring, a cyclohexane ring, a cyclopentane ring, a norbornane ring, and an isophorone ring.

Among these, a ring in which two or more aliphatic hydrocarbon rings are fused is preferable, and a tetrahydrodicyclopentadiene ring (tricyclo[$5.2.1.0^{2,6}$]decane ring) is more preferable.

Examples of a monomer that forms the constitutional unit having an aliphatic hydrocarbon ring structure include dicyclopentanyl (meth)acrylate, cyclohexyl (meth)acrylate, and isobornyl (meth)acrylate.

In addition, the binder polymer more preferably has a constitutional unit represented by Formula (Cy), and still more preferably has the constitutional unit represented by Formula (S) and the constitutional unit represented by Formula (Cy).

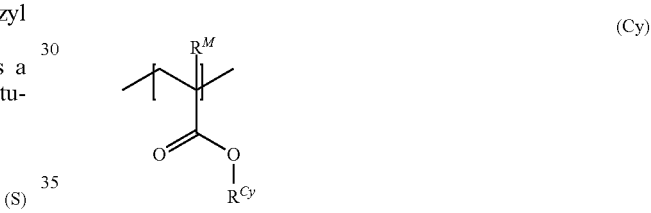

(Cy)

In Formula (Cy), $R^M$ represents a hydrogen atom or a methyl group, and $R^{Cy}$ represents a monovalent group having an aliphatic hydrocarbon ring structure.

$R^M$ in Formula (Cy) is preferably a methyl group.

$R^{Cy}$ in Formula (Cy) is preferably a monovalent group having an aliphatic hydrocarbon ring structure having 5 to 20 carbon atoms, more preferably a monovalent group having an aliphatic hydrocarbon ring structure having 6 to 16 carbon atoms, and still more preferably a monovalent group having an aliphatic hydrocarbon ring structure having 8 to 14 carbon atoms.

In addition, the aliphatic hydrocarbon ring structure in $R^{Cy}$ of Formula (Cy) is preferably a cyclopentane ring structure, a cyclohexane ring structure, a tetrahydrodicyclopentadiene ring structure, a norbornane ring structure, or an isophorone ring structure, more preferably a cyclohexane ring structure or a tetrahydrodicyclopentadiene ring structure, and still more preferably a tetrahydrodicyclopentadiene ring structure.

In addition, the aliphatic hydrocarbon ring structure in $R^{Cy}$ of Formula (Cy) is preferably a ring structure in which two or more aliphatic hydrocarbon rings are fused, and more preferably a ring in which 2 to 4 aliphatic hydrocarbon rings are fused.

In addition, $R^{Cy}$ in Formula (Cy) is preferably a group in which the oxygen atom in —C(=O)O— of Formula (Cy) and the aliphatic hydrocarbon ring structure are directly bonded, that is, an aliphatic hydrocarbon ring group, more preferably a cyclohexyl group or a dicyclopentanyl group, and still more preferably a dicyclopentanyl group.

The binder polymer may have one constitutional unit having an aliphatic hydrocarbon ring structure alone, or two or more kinds thereof.

In a case where the binder polymer has the constitutional unit having an aliphatic hydrocarbon ring structure, a content of the constitutional unit having an aliphatic hydrocarbon ring structure is preferably 5% to 90% by mass, and more preferably 10% to 80% by mass, and still more preferably 20% to 70% by mass, with respect to a total mass of the binder polymer.

In addition, the content of the constitutional unit having an aliphatic hydrocarbon ring structure in the binder polymer is preferably 5% to 70% by mole, more preferably 10% to 60% by mole, and still more preferably 20% to 50% by mole with respect to all the constitutional units of the binder polymer.

Further, the content of the constitutional unit represented by Formula (Cy) in the binder polymer is preferably 5% to 70% by mole, more preferably 10% to 60% by mole, and still more preferably 20% to 50% by mole with respect to all the constitutional units of the binder polymer.

In a case where the binder polymer has a constitutional unit having an aromatic ring structure and a constitutional unit having an aliphatic hydrocarbon ring structure, a total content of the constitutional unit having an aromatic ring structure and the constitutional unit having an aliphatic hydrocarbon ring structure is preferably 10% to 90% by mass, more preferably 20% to 80% by mass, and still more preferably 40% to 75% by mass with respect to all the constitutional units of the binder polymer.

In addition, the total content of the constitutional unit having an aromatic ring structure and the constitutional unit having an aliphatic hydrocarbon ring structure in the binder polymer is preferably 10% to 80% by mole, more preferably 20% to 70% by mole, and still more preferably 40% to 60% by mole with respect to all the constitutional units of the binder polymer.

Further, the total content of the constitutional unit represented by Formula (S) and the constitutional unit represented by Formula (Cy) in the binder polymer is preferably 10% to 80% by mole, more preferably 20% to 70% by mole, and still more preferably 40% to 60% by mole with respect to all the constitutional units of the binder polymer.

The binder polymer preferably has a constitutional unit having an acid group.

Examples of the acid group include a carboxyl group, a sulfo group, a phosphonic acid group, and a phosphoric acid group, and a carboxyl group is preferable.

Preferred examples of the constitutional unit having an acid group include constitutional units derived from a (meth)acrylic acid, as shown below, and more preferred examples thereof include a constitutional unit derived from a methacrylic acid.

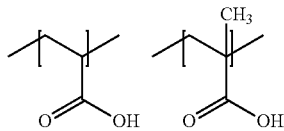

The binder polymer may have one constitutional unit having an acid group alone, or two or more kinds thereof.

In a case where the binder polymer has a constitutional unit having an acid group, the content of the constitutional unit having an acid group is preferably 5% to 50% by mass, more preferably 5% to 40% by mass, and still more preferably 10% to 30% by mass with respect to all the constitutional units of the binder polymer.

In addition, the content of the constitutional unit having an acid group in the binder polymer is preferably 5% to 70% by mole, more preferably 10% to 50% by mole, and still more preferably 20% to 40% by mole with respect to all the constitutional units of the binder polymer.

Further, the content of the constitutional unit derived from a (meth)acrylic acid in the binder polymer is preferably 5% to 70% by mole, more preferably 10% to 50% by mole, and still more preferably 20% to 40% by mole with respect to all the constitutional units of the binder polymer.

The binder polymer preferably has a reactive group, and more preferably has a constitutional unit having a reactive group.

As the reactive group, a radically polymerizable group is preferable, and an ethylenically unsaturated group is more preferable. In addition, in a case where the binder polymer has an ethylenically unsaturated group, the binder polymer preferably has a constitutional unit having an ethylenically unsaturated group in the side chain.

In the present specification, the "main chain" represents a relatively longest binding chain in a molecule of a polymer compound constituting a resin, and the "side chain" represents an atomic group branched from the main chain.

As the ethylenically unsaturated group, an ally group or a (meth)acryloxy group is more preferable.

Examples of the constitutional unit having a reactive group include those shown below, but the constitutional unit having a reactive group is not limited thereto.

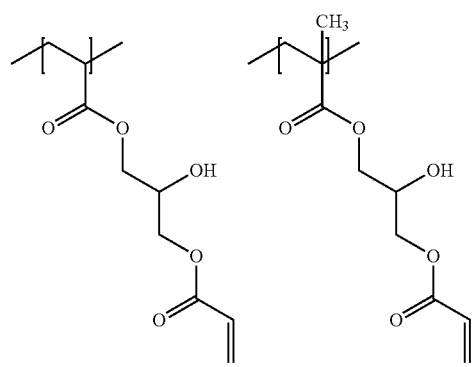

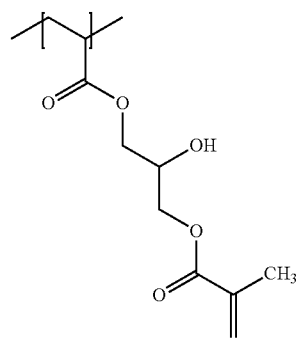

-continued

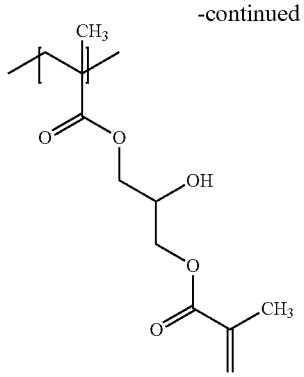

The binder polymer may have one constitutional unit having a reactive group alone, or two or more kinds thereof.

In a case where the binder polymer has the constitutional unit having a reactive group, a content of the constitutional unit having a reactive group is preferably 5% to 70% by mass, more preferably 10% to 50% by mass, and still more preferably 20% to 40% by mass with respect to all the constitutional units of the binder polymer.

In addition, the content of the constitutional unit having a reactive group in the binder polymer is preferably 5% to 70% by mole, more preferably 10% to 60% by mole, and still more preferably 20% to 50% by mole with respect to all the constitutional units of the binder polymer.

Examples of a method for introducing the reactive group into the binder polymer include a method of reacting a compound such as an epoxy compound, a blocked isocyanate compound, an isocyanate compound, a vinyl sulfone compound, an aldehyde compound, a methylol compound, a carboxylic acid anhydride, or the like with a functional group such as a hydroxy group, a carboxyl group, a primary amino group, a secondary amino group, an acetoacetyl group, and a sulfo group.

Preferred examples of the method for introducing the reactive group into the binder polymer include a method in which a polymer having a carboxyl group is synthesized by a polymerization reaction, and then a glycidyl (meth)acrylate is reacted with a part of the carboxyl group of the obtained polymer by a polymer reaction, thereby introducing a (meth)acryloxy group into the polymer. By this method, a binder polymer having a (meth)acryloxy group in the side chain can be obtained.

The polymerization reaction is preferably carried out under a temperature condition of 70° C. to 100° C., and more preferably carried out under a temperature condition of 80° C. to 90° C. As a polymerization initiator used in the polymerization reaction, an azo-based initiator is preferable, and for example, V-601 (product name) or V-65 (product name) manufactured by FUJIFILM Wako Pure Chemical Corporation is more preferable. The polymer reaction is preferably carried out under a temperature condition of 80° C. to 110° C. In the polymer reaction, it is preferable to use a catalyst such as an ammonium salt.

As the binder polymer, polymers X1 to X4 shown below are preferable. Furthermore, the content ratios (a to d), the weight-average molecular weight Mw, and the like of each constitutional unit shown below can be appropriately changed depending on the intended purpose, but the following configuration is preferable from the viewpoint that the effect of the present invention is more excellent.

Polymer X1
a: 20% to 60% by mass, b: 10% to 50% by mass, c: 5.0% to 25% by mass, d: 10% to 50% by mass.

Polymer X2
a: 20% to 60% by mass, b: 10% to 50% by mass, c: 5.0% to 25% by mass, d: 10% to 50% by mass.

Polymer X3
a: 30% to 65% by mass, b: 1.0% to 20% by mass, c: 5.0% to 30% by mass, d: 10% to 50% by mass.

Polymer X4
a: 1.0% to 20% by mass, b: 20% to 60% by mass, c: 5.0% to 230% by mass, d: 10 to 50% by mass.

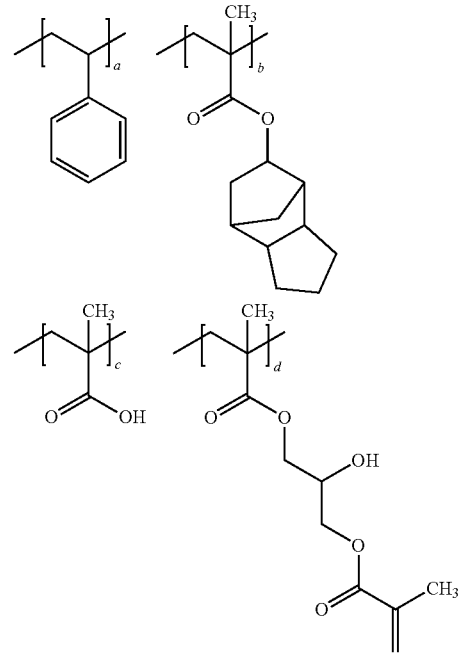

X1

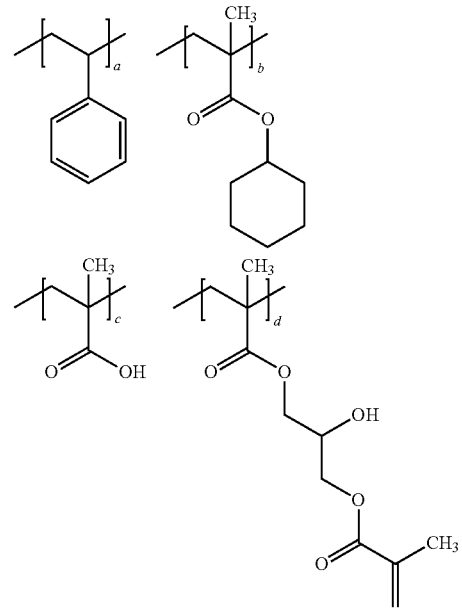

X2

-continued

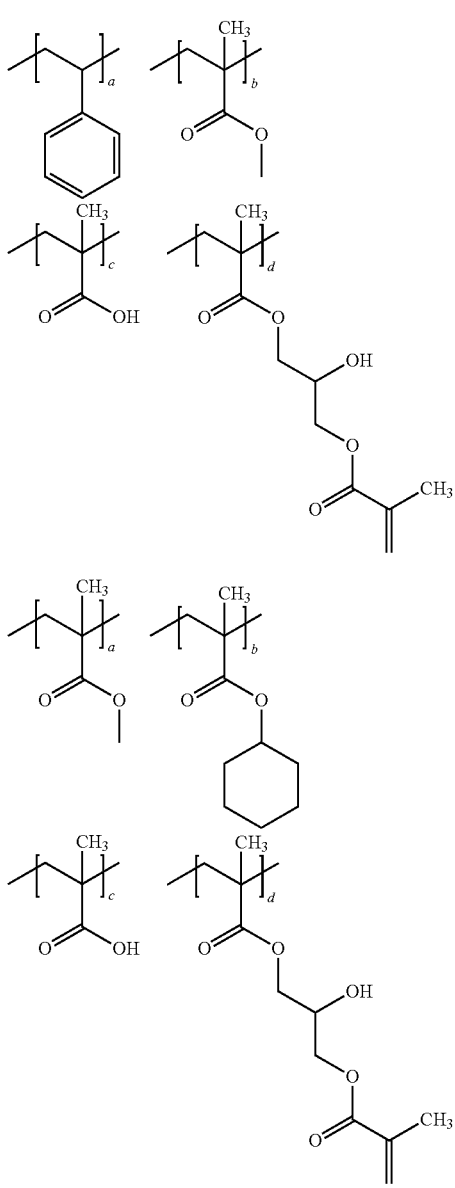

In addition, the binder polymer may include a polymer having a constitutional unit having a carboxylic acid anhydride structure (hereinafter also referred to as a "polymer X").

The carboxylic acid anhydride structure may be either a chain carboxylic acid anhydride structure or a cyclic carboxylic acid anhydride structure, and a cyclic carboxylic acid anhydride structure is preferable.

The ring of the cyclic carboxylic acid anhydride structure is preferably a 5- to 7-membered ring, more preferably a 5-membered ring or a 6-membered ring, and still more preferably a 5-membered ring.

The constitutional unit having a carboxylic acid anhydride structure is preferably a constitutional unit containing a divalent group obtained by removing two hydrogen atoms from a compound represented by Formula P-1 in a main chain, or a constitutional unit in which a monovalent group obtained by removing one hydrogen atom from a compound represented by Formula P-1 is bonded to the main chain directly or through a divalent linking group.

P-1

In Formula P-1, $R^{A1a}$ represents a substituent, $n^{1a}$ pieces of $RA^{1a}$'s may be the same or different, $Z^{1a}$ represents a divalent group forming a ring including —C(=O)—O—C(=O)—, and $n^{1a}$ represents an integer of 0 or more.

Examples of the substituent represented by $R^{A1a}$ include an alkyl group.

$Z^{1a}$ is preferably an alkylene group having 2 to 4 carbon atoms, more preferably an alkylene group having 2 or 3 carbon atoms, and still more preferably an alkylene group having 2 carbon atoms.

$n^{1a}$ represents an integer of 0 or more. In a case where $Z^{1a}$ represents an alkylene group having 2 to 4 carbon atoms, $n^{1a}$ is preferably an integer of 0 to 4, more preferably an integer of 0 to 2, and still more preferably 0.

In a case where $n^{1a}$ represents an integer of 2 or more, a plurality of $R^{A1a}$'s existing may be the same or different. In addition, the plurality of $R^{A1a}$'s existing may be bonded to each other to form a ring, but it is preferable that they are not bonded to each other to form a ring.

As the constitutional unit having a carboxylic acid anhydride structure, a constitutional unit derived from an unsaturated carboxylic acid anhydride is preferable, a constitutional unit derived from an unsaturated cyclic carboxylic acid anhydride is more preferable, a constitutional unit derived from an unsaturated aliphatic carboxylic acid anhydride is still more preferable, a constitutional unit derived from maleic anhydride or itaconic anhydride is particularly preferable, and a constitutional unit derived from maleic acid anhydride is the most preferable.

Hereinafter, specific examples of the constitutional unit having a carboxylic acid anhydride structure will be described, but the constitutional unit having a carboxylic acid anhydride structure is not limited to these specific examples. In the following constitutional units, Rx represents a hydrogen atom, a methyl group, a CH$_2$OH group, or a CF$_3$ group, and Me represents a methyl group.

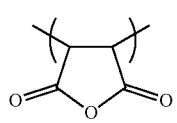

Formula a2-1

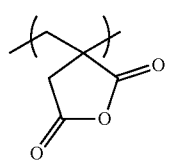

Formula a2-2

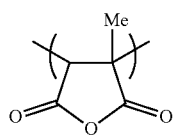

Formula a2-3

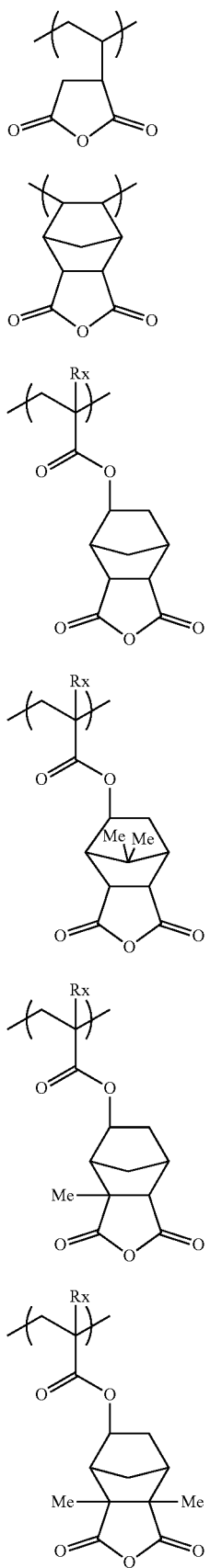
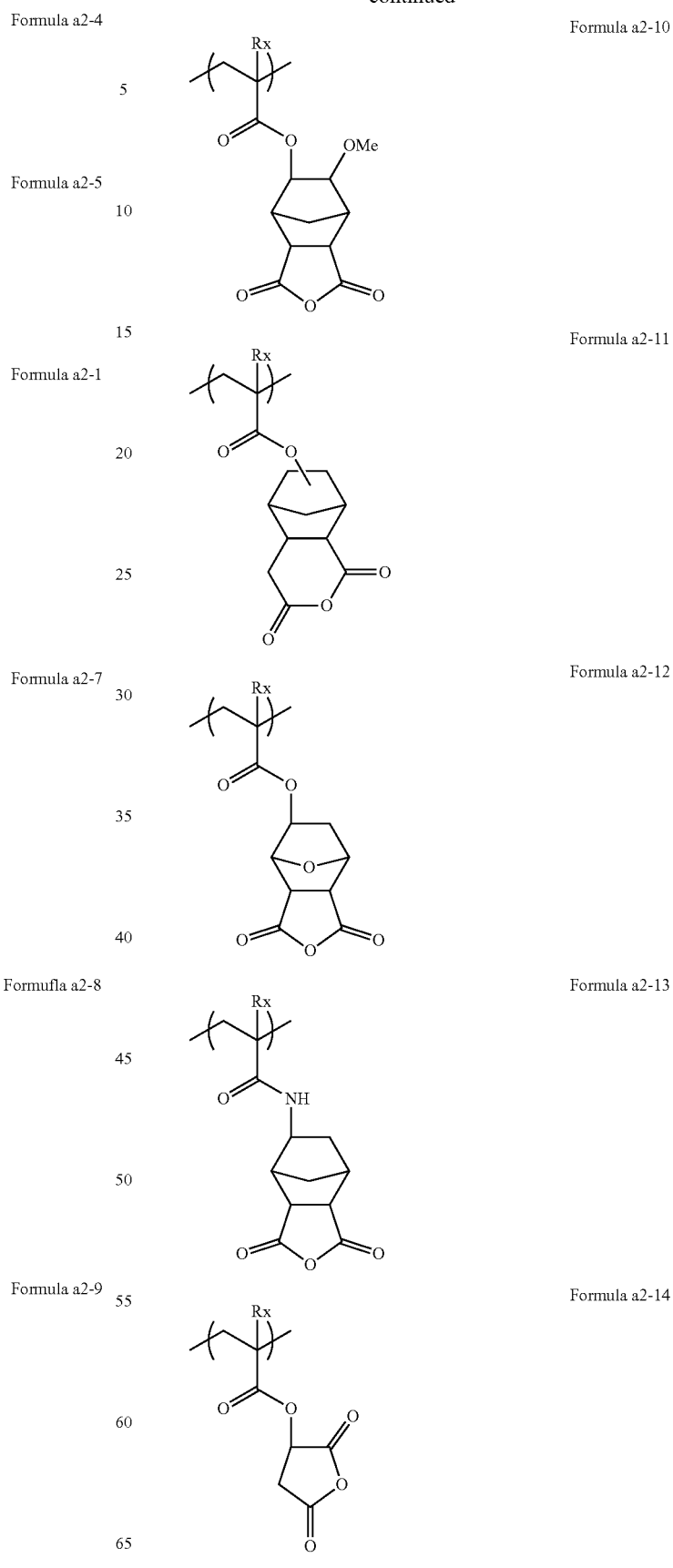

Formula a2-15
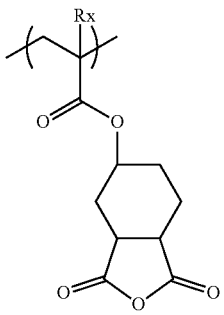

Formula a2-16
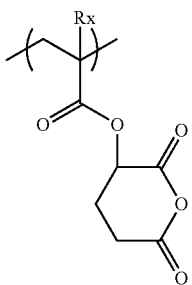

Formula a2-17
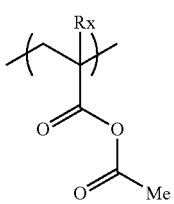

Formula a2-18
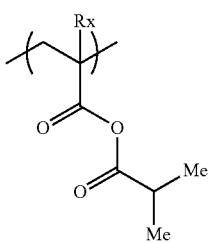

Formula a2-19
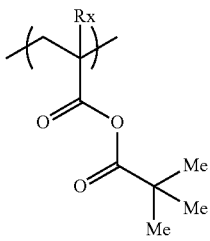

Formula a2-20
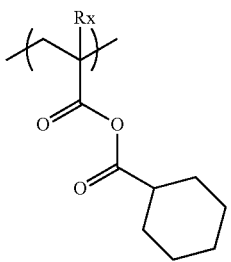

Formula a2-21
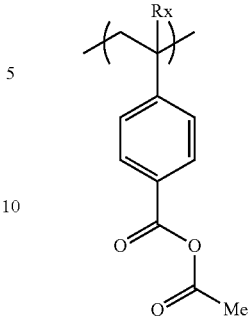

The polymer X may have only one kind or two or more kinds of constitutional units having a carboxylic acid anhydride structure.

A total content of the constitutional unit having a carboxylic acid anhydride structure is preferably 0% to 60% by mole, more preferably 5% to 40% by mole, and still more preferably 10% to 35% by mole with respect to all the constitutional units in the polymer X.

The photosensitive composition layer may include only one kind or two or more kinds of the polymer X.

In a case where the photosensitive composition layer includes the polymer X, a content of the polymer X is preferably 0.1% to 30% by mass, more preferably 0.2% to 20% by mass, still more preferably 0.5% to 20% by mass, and even still more preferably 1% to 20% by mass with respect to the total mass of the photosensitive composition layer The weight-average molecular weight (Mw) of the binder polymer is preferably 5,000 or more, more preferably 10,000 or more, still more preferably 10,000 to 50,000, and particularly preferably 20,000 to 30,000.

An acid value of the binder polymer is preferably 10 to 200 mgKOH/g, more preferably 60 mg to 200 mgKOH/g, still more preferably 60 to 150 mgKOH/g, and particularly preferably 70 to 125 mgKOH/g.

Incidentally, the acid value of the binder polymer is a value measured according to the method described in JIS K0070: 1992.

A dispersity of the binder polymer is preferably 1.0 to 6.0, more preferably 1.0 to 5.0, still more preferably 1.0 to 4.0, and particularly preferably 1.0 to 3.0 from the viewpoint of developability.

The photosensitive composition layer may include only one kind or two or more kinds of the binder polymers.

A content of the binder polymer is preferably 10.0% to 90.0% by mass, more preferably 20.0% to 80.0% by mass, still more preferably 30.0% to 80.0% by mass, and particularly preferably 30.0% to 70.0% by mass with respect to the total mass of the photosensitive composition layer.

Polymerizable Compound

The photosensitive composition layer may include a polymerizable compound.

The polymerizable compound is a compound having a polymerizable group. Examples of the polymerizable group include a radically polymerizable group and a cationically polymerizable group, and a radically polymerizable group is preferable.

The polymerizable compound preferably includes a radically polymerizable compound having an ethylenically unsaturated group (hereinafter also simply referred to as an "ethylenically unsaturated compound").

As the ethylenically unsaturated group, a (meth)acryloxy group is preferable.

Furthermore, the ethylenically unsaturated compound in the present specification is a compound other than the binder polymer, and preferably has a molecular weight of less than 5,000.

As one of suitable aspects of the polymerizable compound, a compound represented by Formula (M) (simply referred to as "Compound M") may be mentioned.

$$Q^2\text{-}R^1\text{-}Q^1 \qquad \text{Formula (M)}$$

In Formula (M), $Q^1$ and $Q^2$ each independently represent a (meth)acryloyloxy group, and $R^1$ represents a divalent linking group having a chain structure.

From the viewpoint of easiness of synthesis, it is preferable that $Q^1$ and $Q^2$ in Formula (M) have the same group.

In addition, from the viewpoint of reactivity, it is preferable that $Q^1$ and $Q^2$ in Formula (M) are acryloyloxy groups.

$R^1$ in Formula (M) is preferably an alkylene group, an alkyleneoxyalkylene group ($-L^1$-$O$-$L^1$-), or a polyalkyleneoxyalkylene group ($-(L^1$-$O)_p$-$L^1$-), more preferably a hydrocarbon group having 2 to 20 carbon atoms or a polyalkyleneoxyalkylene group, still more preferably an alkylene group having 4 to 20 carbon atoms, and particularly preferably a linear alkylene group having 6 to 18 carbon atoms.

The hydrocarbon group only needs to have a chain structure at least in a portion thereof, and a portion other than the chain structure is not particularly limited, may be, for example, any one of a branched, cyclic, or linear alkylene group having 1 to 5 carbon atoms, an arylene group, an ether bond, and a combination thereof, and is preferably the alkylene group or a group formed by combination of two or more alkylene groups and one or more arylene groups, more preferably the alkylene group, and still more preferably the linear alkylene group.

Furthermore, $L^1$'s each independently represent an alkylene group, and are each preferably an ethylene group, a propylene group, or a butylene group, and more preferably the ethylene group or a 1,2-propylene group. p represents an integer of 2 or more, and is preferably an integer of 2 to 10.

In addition, the number of atoms in the shortest linking chain which links $Q^1$ and $Q^2$ in the compound M is preferably 3 to 50, more preferably 4 to 40, still more preferably 6 to 20, and particularly preferably 8 to 12.

In the present specification, the "number of atoms in the shortest linking chain which links $Q^1$ and $Q^2$" is the shortest number of atoms linking from an atom in $R^1$ linked to $Q^1$ to an atom in $R^1$ linked to $Q^2$.

Specific examples of the compound M include 1,3-butanediol di(meth)acrylate, tetramethylene glycol di(meth)acrylate, neopentyl glycol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, hydrogenated bisphenol A di(meth)acrylate, hydrogenated bisphenol F di(meth)acrylate, polyethylene glycol di(meth)acrylate, polypropylene glycol di(meth)acrylate, poly (ethylene glycol/propylene glycol) di(meth)acrylate, and polybutylene glycol di(meth)acrylate. The ester monomers can also be used as a mixture.

Among the compounds, at least one compound selected from the group consisting of 1,6-hexanediol di(meth)acrylate, 1,9-nonanediol di(meth)acrylate, 1,10-decanediol di(meth)acrylate, and neopentyl glycol di(meth)acrylate is preferable, at least one compound selected from the group consisting of 1,6-hexanediol di(meth)acrylate, 1,9-nonanediol di(meth)acrylate, and 1,10-decanediol di(meth)acrylate is more preferable, and at least one compound selected from the group consisting of 1,9-nonanediol di(meth)acrylate and 1,10-decanediol di(meth)acrylate is still more preferable.

In addition, as one of suitable aspects of the polymerizable compound, a bi- or higher functional ethylenically unsaturated compound may be mentioned.

In the present specification, the "bi- or higher functional ethylenically unsaturated compound" means a compound having two or more ethylenically unsaturated groups in one molecule.

As the ethylenically unsaturated group in the ethylenically unsaturated compound, a (meth)acryloyl group is preferable.

As the ethylenically unsaturated compound, a (meth) acrylate compound is preferable.

The bifunctional ethylenically unsaturated compound can be appropriately selected from known compounds.

Examples of the bifunctional ethylenically unsaturated compound other than the compound M include tricyclodecanedimethanol di(meth)acrylate and 1,4-cyclohexanediol di(meth)acrylate.

Examples of a commercially available product of the bifunctional ethylenically unsaturated compound include tricyclodecane dimethanol diacrylate (product name: NK ESTER A-DCP, manufactured by Shin-Nakamura Chemical Co., Ltd.), tricyclodecane dimethanol dimethacrylate (product name: NK ESTER DCP, manufactured by Shin-Nakamura Chemical Co., Ltd.), 1,9-nonanediol diacrylate (product name: NK ESTER A-NOD-N, manufactured by Shin-Nakamura Chemical Co., Ltd.), and 1,6-hexanediol diacrylate (product name: NK ESTER A-HD-N, manufactured by Shin-Nakamura Chemical Co., Ltd.).

The tri- or higher functional ethylenically unsaturated compound can be appropriately selected from known compounds.

Examples of the tri- or higher functional ethylenically unsaturated compound include dipentaerythritol (tri/tetra/penta/hexa) (meth)acrylate, pentaerythritol (tri/tetra) (meth)acrylate, trimethylolpropane tri(meth)acrylate, ditrimethylolpropane tetra(meth)acrylate, isocyanuric acid (meth)acrylate, and a (meth)acrylate compound of a glycerin tri(meth)acrylate skeleton.

Here, the "(tri/tetra/penta/hexa) (meth)acrylate" has a concept including tri(meth)acrylate, tetra(meth)acrylate, penta(meth)acrylate, and hexa(meth)acrylate, and the "(tri/tetra) (meth)acrylate" has a concept including tri(meth)acrylate and tetra(meth)acrylate.

Examples of the polymerizable compound also include a caprolactone-modified compound of a (meth)acrylate compound (KAYARAD (registered trademark) DPCA-20 manufactured by Nippon Kayaku Co., Ltd., A-9300-1CL manufactured by Shin-Nakamura Chemical Co., Ltd., or the like), an alkylene oxide-modified compound of a (meth)acrylate compound (KAYARAD (registered trademark) RP-1040 manufactured by Nippon Kayaku Co., Ltd., ATM-35E or A-9300 manufactured by Shin-Nakamura Chemical Co., Ltd., EBECRYL (registered trademark) 135 manufactured by Daicel-Allnex Ltd., or the like), and ethoxylated glycerin triacrylate (NK ESTER A-GLY-9E manufactured by Shin-Nakamura Chemical Co., Ltd., or the like).

As one of suitable aspects of the polymerizable compound, a urethane (meth)acrylate compound may also be mentioned.

Examples of the urethane (meth)acrylate include urethane di(meth)acrylate, for example, propylene oxide-modified urethane di(meth)acrylate, and ethylene oxide- and propylene oxide-modified urethane di(meth)acrylates.

In addition, examples of the urethane (meth)acrylate also include urethane (meth)acrylate having tri- or higher functionality. The lower limit of the number of functional groups is more preferably 6 or more, and still more preferably 8 or more. Incidentally, the upper limit of the number of functional groups is preferably 20 or less. Examples of the tri- or higher functional urethane (meth)acrylate include 8UX-015A (manufactured by Taisei Fine Chemical Co., Ltd.), UA-32P (manufactured by Shin-Nakamura Chemical Co., Ltd.), U-15HA (manufactured by Shin-Nakamura Chemical Co., Ltd.), UA-1100H (manufactured by Shin-Nakamura Chemical Co., Ltd.), AH-600 (product name) manufactured by KYOEISHA Chemical Co., Ltd, and UA-306H, UA-306T, UA-306I, UA-510H, and UX-5000 (all manufactured by Nippon Kayaku Co., Ltd.).

As one of suitable aspects of the polymerizable compound, an ethylenically unsaturated compound having an acid group can also be mentioned.

Examples of the acid group include a carboxyl group, a sulfo group, and a phosphoric acid group.

Among these, the carboxyl group is preferable as the acid group.

Examples of the ethylenically unsaturated compound having the acid group include a tri- and tetrafunctional ethylenically unsaturated compound including the acid group [component obtained by introducing a carboxy acid group to pentaerythritol tri- and tetra-acrylate (PETA) skeleton (acid value: 80 to 120 mgKOH/g)], and a penta- and hexafunctional ethylenically unsaturated compound including the acid group (component obtained by introducing a carboxyl group to dipentaerythritol penta- and hexaacrylate (DPHA) skeleton [acid value: 25 to 70 mgKOH/g)].

The tri- or higher functional ethylenically unsaturated compound including the acid group may be used in combination with the bifunctional ethylenically unsaturated compound including the acid group, as necessary.

As the ethylenically unsaturated compound having an acid group, at least one selected from the group consisting of bi- or higher functional ethylenically unsaturated compound having a carboxyl group and a carboxylic acid anhydride thereof is preferable.

In a case where the ethylenically unsaturated compound having an acid group is at least one selected from the group consisting of bi- or higher functional ethylenically unsaturated compound having a carboxyl group and a carboxylic acid anhydride thereof, developability and film hardness are further enhanced.

The bi- or higher functional ethylenically unsaturated compound having a carboxyl group is not particularly limited and can be appropriately selected from known compounds.

Examples of the bi- or higher functional ethylenically unsaturated compound having a carboxyl group include ARONIX (registered trademark) TO-2349 (manufactured by Toagosei Co., Ltd.), ARONIX (registered trademark) M-520 (manufactured by Toagosei Co., Ltd.), and ARONIX (registered trademark) M-510 (manufactured by Toagosei Co., Ltd.).

As the ethylenically unsaturated compound having an acid group, the polymerizable compounds having an acid group, described in paragraphs [0025] to [0030] of JP2004-239942A, the contents of which are incorporated herein by reference, are preferable.

Examples of the polymerizable compound include a compound obtained by reacting a polyhydric alcohol with an α,β-unsaturated carboxylic acid, a compound obtained by reacting a glycidyl group-containing compound with an α,β-unsaturated carboxylic acid, urethane monomers such as a (meth)acrylate compound having a urethane bond, phthalic acid-based compounds such as γ-chloro-p-hydroxypropyl-β'-(meth)acryloyloxyethyl-o-phthalate, β-hydroxyethyl-β'-(meth)acryloyloxyethyl-o-phthalate, and β-hydroxypropyl-β'-(meth)acryloyloxyethyl-o-phthalate, and alkyl (meth)acrylate esters.

These may be used alone or in combination of two or more kinds thereof.

Examples of the compound obtained by reacting a polyhydric alcohol with an α,β-unsaturated carboxylic acid include bisphenol A-based (meth)acrylate compounds such as 2,2-bis(4-((meth)acryloxypolyethoxy)phenyl)propane, 2,2-bis(4-((meth)acryloxypolypropoxy)phenyl)propane, and 2,2-bis(4-((meth)acryloxypolyethoxypolypropoxy)phenyl)propane, polyethylene glycol di(meth)acrylate having 2 to 14 ethylene oxide groups, polypropylene glycol di(meth)acrylate having 2 to 14 propylene oxide groups, polyethylene glycol polypropylene glycol di(meth)acrylate having 2 to 14 ethylene oxide groups and 2 to 14 propylene oxide groups, trimethylolpropane di(meth)acrylate, trimethylolpropane tri(meth)acrylate, trimethylolpropane ethoxytri(meth)acrylate, trimethylolpropane diethoxytri(meth)acrylate, trimethylolpropane triethoxytri(meth)acrylate, trimethylolpropane tetraethoxytri(meth)acrylate, trimethylolpropane pentaethoxytri(meth)acrylate, trimethylolpropane tetraethoxytri(meth)acrylate, tetramethylol methane tri(meth)acrylate, tetramethylol methane tetra(meth)acrylate, dipentaerythritol tetra(meth)acrylate, dipentaerythritol penta(meth)acrylate, and dipentaerythritol hexa(meth)acrylate.

Among those, the ethylenically unsaturated compound having a tetramethylolmethane structure or a trimethylolpropane structure is preferable, and tetramethylolmethane tri(meth)acrylate, a tetramethylolmethane tetra(meth)acrylate, a trimethylolpropane tri(meth)acrylate, a trimethylolpropane tri(meth)acrylate, or di(trimethylolpropane) tetraacrylate is more preferable.

Examples of the polymerizable compound include a caprolactone-modified compound of an ethylenically unsaturated compound (for example, KAYARAD (registered trademark) DPCA-20 manufactured by Nippon Kayaku Co., Ltd., A-9300-1CL manufactured by Shin-Nakamura Chemical Co., Ltd., or the like), an alkylene oxide-modified compound of an ethylenically unsaturated compound (for example, KAYARAD RP-1040 manufactured by Nippon Kayaku Co., Ltd., ATM-35E, A-9300 manufactured by Shin-Nakamura Chemical Co., Ltd., EBECRYL (registered trademark) 135 manufactured by Daicel-Allnex Ltd., or the like), and ethoxylated glycerin triacrylate (A-GLY-9E manufactured by Shin-Nakamura Chemical Co., Ltd.).

In addition, examples of the polymerizable compound also include bisacrylic acid (2,2-dimethylethylene)(5-ethyl-1,3-dioxane-2,5-diyl)methylene (KAYARAD R-604 manufactured by Nippon Kayaku Co., Ltd.).

As the polymerizable compound (in particular, an ethylenically unsaturated compound), the compound including an ester bond is also preferable from the viewpoint that developability of the photosensitive composition layer after transfer is excellent.

The ethylenically unsaturated compound including an ester bond is not particularly limited as long as it includes an ester bond in the molecule, but from the viewpoint that the effect of the present invention is excellent, an ethylenically unsaturated compound having a tetramethylolmethane structure or a trimethylolpropane structure is preferable, and tetramethylolmethane tri(meth)acrylate, trimethylolmethane tetra(meth)acrylate, trimethylolpropane tri(meth)acrylate, or di(trimethylolpropane) tetraacrylate is more preferable.

From the viewpoint of imparting reliability, it is preferable that an ethylenically unsaturated compound having an aliphatic group having 6 to 20 carbon atoms, and the ethylenically unsaturated compound having a tetramethylol methane structure or a trimethylol propane structure are included as the ethylenically unsaturated compound.

Examples of the ethylenically unsaturated compound having an aliphatic group having 6 to 20 carbon atoms include 1,9-nonanediol di(meth)acrylate, 1,10-decanediol di(meth)acrylate, and tricyclodecanedimethanol di(meth)acrylate.

As one of suitable aspects of the polymerizable compound, a polymerizable compound having an aliphatic hydrocarbon ring structure (preferably a bifunctional ethylenically unsaturated compound) may be mentioned.

As the polymerizable compound, a polymerizable compound having a ring structure in which two or more aliphatic hydrocarbon rings are fused (preferably a structure selected from the group consisting of a tricyclodecane structure and a tricyclodecane structure) is preferable, a bifunctional ethylenically unsaturated compound having a ring structure in which two or more aliphatic hydrocarbon rings are fused is more preferable, and tricyclodecane dimethanol di(meth)acrylate is still more preferable.

As the aliphatic hydrocarbon ring structure, a cyclopentane structure, a cyclohexane structure, a tricyclodecane structure, a tricyclodecene structure, a norbornane structure, or an isophorone structure is preferable.

A molecular weight of the polymerizable compound is preferably 200 to 3,000, more preferably 250 to 2,600, still more preferably 280 to 2,200, and particularly preferably 300 to 2,200.

As one of suitable aspects of the photosensitive composition layer, the photosensitive composition layer preferably includes a bi- or higher functional ethylenically unsaturated compound, more preferably includes a tri- or higher functional ethylenically unsaturated compound, and still more preferably includes a trifunctional or tetrafunctional ethylenically unsaturated compound.

In addition, in one of suitable aspects of the photosensitive composition layer, the photosensitive composition layer preferably includes a bifunctional ethylenically unsaturated compound having an aliphatic hydrocarbon ring structure, and a binder polymer having a constitutional unit having an aliphatic hydrocarbon ring.

In addition, in one of suitable aspects of the photosensitive composition layer, the photosensitive composition layer preferably includes the compound represented by Formula (M) and an ethylenically unsaturated compound having an acid group, and more preferably includes 1,9-nonanediol diacrylate and a polyfunctional ethylenically unsaturated compound having a carboxylic acid group.

Moreover, in one of suitable aspects of the photosensitive composition layer, the photosensitive composition layer preferably includes the compound represented by Formula (M), an ethylenically unsaturated compound having an acid group, and a thermal crosslinking compound which will be described later, and more preferably includes the compound represented by Formula (M), an ethylenically unsaturated compound having an acid group, and a blocked isocyanate compound which will be described later.

Furthermore, in one of suitable aspects of the photosensitive composition layer, from the viewpoint of development residue suppressing properties and rust preventing properties, it is preferable that the photosensitive composition layer includes a bifunctional ethylenically unsaturated compound (preferably a bifunctional (meth)acrylate compound) and a tri- or higher functional ethylenically unsaturated compound (preferably a tri- or higher functional (meth)acrylate compound).

A mass ratio of the content of the ethylenically unsaturated bifunctional ethylenically unsaturated compound to the content of the tri- or higher functional ethylenically unsaturated compound (the mass of the bifunctional ethylenically unsaturated compound/the mass of the tri- or higher functional ethylenically unsaturated compound) is preferably 10/90 to 90/10, and more preferably 30/70 to 70/30.

A content of the bifunctional ethylenically unsaturated compound with respect to the total amount of all the ethylenically unsaturated compounds is preferably 20.0% by mass or more, more preferably 30.0% by mass or more, and still more preferably 40.0% by mass or more. The upper limit is not particularly limited, but is, for example, 100% by mass or less, preferably 90.0% by mass or less, and more preferably 80.0% by mass or less.

A content of the bifunctional ethylenically unsaturated compound in the photosensitive composition layer is preferably 5.0% to 60.0% by mass, more preferably 5.0% to 40.0% by mass, and still more preferably 5.0% to 40.0% by mass.

Furthermore, in one of suitable aspects of the photosensitive composition layer, from the viewpoint of rust preventing properties, it is preferable that the photosensitive composition layer includes the compound M and a bifunctional ethylenically unsaturated compound having an aliphatic hydrocarbon ring structure.

In addition, in one of suitable aspects of the photosensitive composition layer, from the viewpoints of adhesiveness to a substrate, development residue suppressing properties, and rust preventing properties, the photosensitive composition layer preferably includes the compound M and an ethylenically unsaturated compound having an acid group, more preferably includes the compound M, a bifunctional ethylenically unsaturated compound an aliphatic hydrocarbon ring structure, and an ethylenically unsaturated compound having an acid group, and still more preferably includes the compound M, a bifunctional ethylenically unsaturated compound having an aliphatic hydrocarbon ring structure, a tri- or higher functional ethylenically unsaturated compound, and an ethylenically unsaturated compound having an acid group.

The photosensitive composition layer may include a monofunctional ethylenically unsaturated compound as the ethylenically unsaturated compound.

A content of the bi- or higher functional ethylenically unsaturated compound is preferably 60% to 100% by mass with respect to a total content of all the ethylenically unsaturated compounds included in the photosensitive composition layer.

The polymerizable compound (in particular, the ethylenically unsaturated compound) may be used alone or in combination of two or more kinds thereof.

A content of the polymerizable compound (in particular, the ethylenically unsaturated compound) in the photosensitive composition layer is preferably 15.0% to 70.0% by mass, more preferably 15.0% to 60.0% by mass, and particularly preferably 15.0% to 50.0% by mass with respect to the total mass of the photosensitive composition layer.

Polymerization Initiator

The photosensitive composition may include a polymerization initiator.

As the polymerization initiator, a photopolymerization initiator is preferable.

The photopolymerization initiator is not particularly limited and a known photopolymerization initiator can be used.

Examples of the photopolymerization initiator include a photopolymerization initiator having an oxime ester structure (hereinafter also referred to as an "oxime-based photopolymerization initiator"), a photopolymerization initiator having an α-aminoalkylphenone structure (hereinafter also referred to as an "α-aminoalkylphenone-based photopolymerization initiator"), a photopolymerization initiator having an α-hydroxyalkylphenone structure (hereinafter also referred to as an "α-hydroxyalkylphenone-based photopolymerization initiator"), a photopolymerization initiator having an acylphosphine oxide structure (hereinafter also referred to as an "acylphosphine oxide-based photopolymerization initiator"), and a photopolymerization initiator having an N-phenylglycine structure (hereinafter also referred to as an N-phenylglycine-based photopolymerization initiator").

The photopolymerization initiator preferably includes at least one kind selected from the group consisting of the oxime-based photopolymerization initiator, the α-aminoalkylphenone-based photopolymerization initiator, the α-hydroxyalkylphenone-based photopolymerization initiator, and the N-phenylglycine-based photopolymerization initiator, and more preferably includes at least one kind selected from the group consisting of the oxime-based photopolymerization initiator, the α-aminoalkylphenone-based photopolymerization initiator, and the N-phenylglycine-based photopolymerization initiator.

In addition, as the photopolymerization initiator, for example, polymerization initiators disclosed in paragraphs [0031] to [0042] of JP2011-95716A and paragraphs [0064] to [0081] of JP2015-014783A may be used.

Examples of a commercially available product of the photopolymerization initiator include 1-[4-(phenylthio)phenyl]-1,2-octanedione-2-(O-benzoyloxime) [product name: IRGACURE (registered trademark) OXE-01, manufactured by BASF], 1-[9-ethyl-6-(2-methylbenzoyl)-9H-carbazol-3-yl]ethanone-1-(O-acetyloxime) [product name: IRGACURE (registered trademark) OXE-02, manufactured by BASF], IRGACURE (registered trademark) OXE-03 (manufactured by BASF), IRGACURE (registered trademark) OXE-04 (manufactured by BASF), 2-(dimethylamino)-2-[(4-methylphenyl)methyl]-1-[4-(4-morpholinyl)phenyl]-1-butanone [product name: Omnirad (registered trademark) 369EG, manufactured by IGM Resins B. V.], 2-methyl-1-(4-methylthiophenyl)-2-morpholinopropan-1-one [product name: Omnirad (registered trademark) 907, manufactured by IGM Resins B. V.], 2-hydroxy-1-{4-[4-(2-hydroxy-2-methylpropionyl)benzyl]phenyl}-2-methylpropan-1-one [product name: Omnirad (registered trademark) 127, manufactured by IGM Resins B. V.], 2-benzyl-2-dimethylamino-1-(4-morpholinophenyl)butanone-1 [product name: Omnirad (registered trademark) 369, manufactured by IGM Resins B. V.], 2-hydroxy-2-methyl-1-phenylpropan-1-one [product name: Omnirad (registered trademark) 1173, manufactured by IGM Resins B. V.], 1-hydroxy cyclohexyl phenyl ketone [product name: Omnirad (registered trademark) 184, manufactured by IGM Resins B. V.], 2,2-dimethoxy-1,2-diphenylethan-1-one (product name: Omnirad (registered trademark) 651, manufactured by IGM Resins B. V.], an oxime ester-based photopolymerization initiator [product name: Lunar (registered trademark) 6, manufactured by DKSH Management Ltd.], 1-[4-(phenylthio)phenyl]-3-cyclopentylpropane-1,2-dione-2-(O-benzoyloxime) (product name: TR-PBG-305, manufactured by Changzhou Tronly New Electronic Materials Co., Ltd.), 1,2-propanedione, 3-cyclohexyl-1-[9-ethyl-6-(2-furanylcarbonyl)-9H-carbazol-3-yl]-, 2-(O-acetyloxime) (product name: TR-PBG-326, manufactured by Changzhou Tronly New Electronic Materials Co., Ltd.), 3-cyclohexyl-1-(6-(2-(benzoyloxyimino)hexanoyl)-9-ethyl-9H-carbazol-3-yl)-propane-1,2-dione-2-(O-benzoyloxime) (product name: TR-PBG-391, manufactured by Changzhou Tronly New Electronic Materials Co., Ltd.), and APi-307 (1-(biphenyl-4-yl)-2-methyl-2-morpholinopropan-1-one, manufactured by Shenzhen UV-ChemTech Ltd.).

The photopolymerization initiators may be used alone or in combination of two or more kinds thereof. In a case where two or more kinds of the photopolymerization initiators are used in combination, an oxime-based photopolymerization initiator and at least one selected from an α-aminoalkylphenone-based photopolymerization initiator or an α-hydroxyalkylphenone-based photopolymerization initiator are preferably used.

In a case where the photosensitive composition layer includes the photopolymerization initiator, a content of the photopolymerization initiator is preferably 0.01% by mass or more, preferably 0.1% by mass or more, and still more preferably 0.5% by mass or more with respect to the total mass of the photosensitive composition layer. In addition, the upper limit is preferably 10.0% by mass or less, and more preferably 5.0% by mass or less with respect to the total mass of the photosensitive composition layer.

Heterocyclic Compound

The photosensitive composition layer may include a heterocyclic compound.

A heterocyclic ring contained in the heterocyclic compound may be either a monocyclic or polycyclic heterocyclic ring.

Examples of a heteroatom contained in the heterocyclic compound include an oxygen atom, a nitrogen atom, and a sulfur atom. The heterocyclic compound preferably has at least one atom selected from the group consisting of a nitrogen atom, an oxygen atom, and a sulfur atom, and more preferably has a nitrogen atom.

Examples of the heterocyclic compound include a triazole compound, a benzotriazole compound, a tetrazole compound, a thiadiazole compound, a triazine compound, a rhodanine compound, a thiazole compound, a benzothiazole compound, a benzimidazole compound, a benzoxazole compound, and a pyrimidine compound.

Among those, as the heterocyclic compound, at least one compound selected from the group consisting of a triazole compound, a benzotriazole compound, a tetrazole compound, a thiadiazole compound, a triazine compound, a rhodanine compound, a thiazole compound, a benzimidazole compounds, and a benzoxazole compound is preferable, and at least one compound selected from the group consisting of a triazole compound, a benzotriazole compound, a tetrazole compound, a thiadiazole compound, a thiazole compound, a benzothiazole compound, a benzimidazole compound, and a benzoxazole compound is more preferable.

Preferred specific examples of the heterocyclic compound are shown below. The following compounds can be exemplified as a triazole compound and a benzotriazole compound.

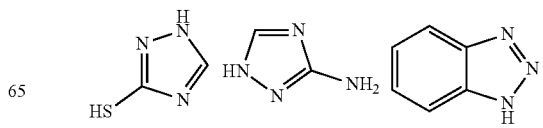

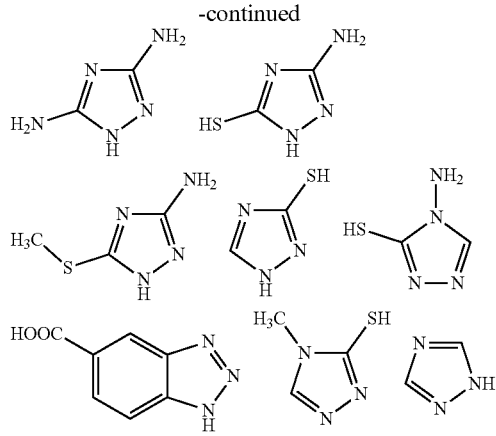

Examples of the tetrazole compound include the following compounds.

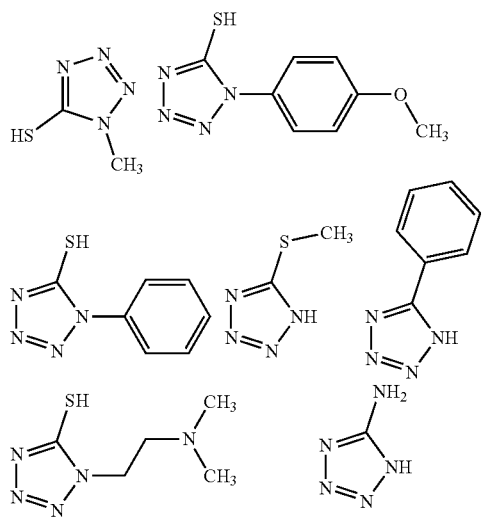

Examples of the thiadiazole compound include the following compounds.

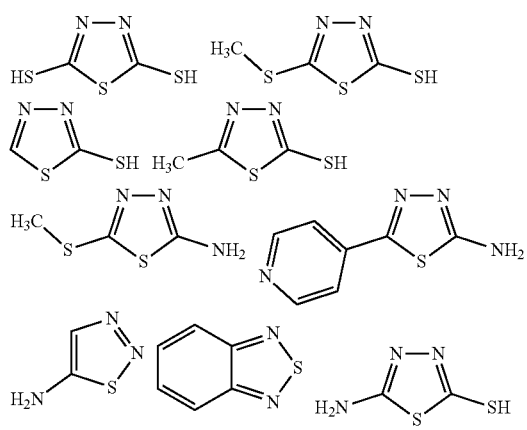

Examples of the triazine compound include the following compounds.

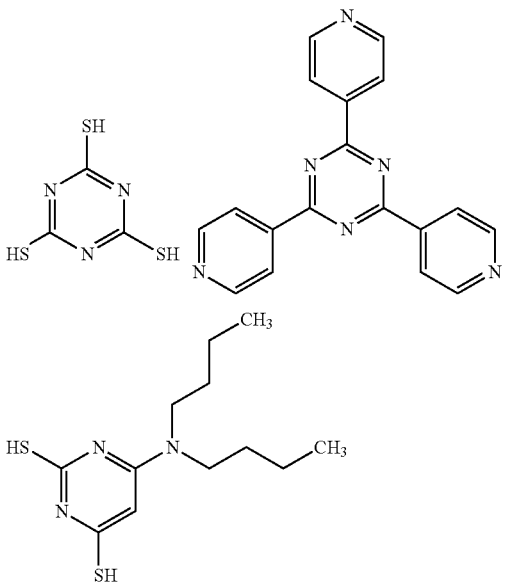

The following compounds can be exemplified as a rhodanine compound.

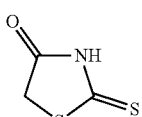

Examples of the thiazole compound include the following compounds.

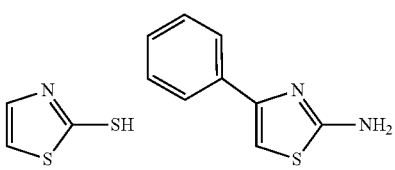

Examples of the benzothiazole compound include the following compounds.

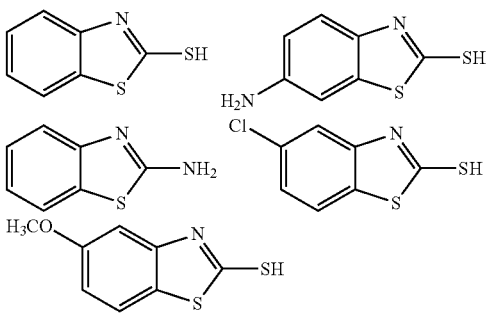

Examples of the benzimidazole compound include the following compounds.

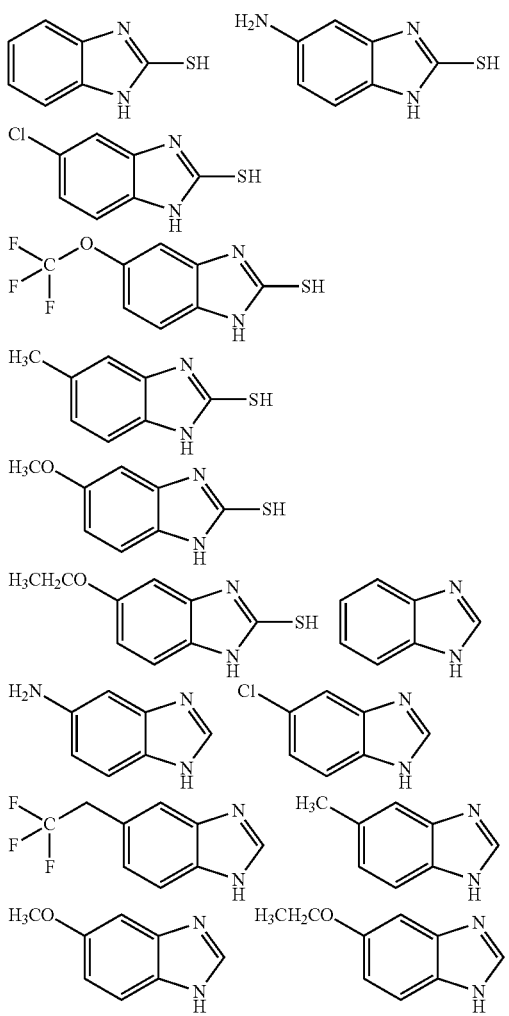

Examples of the benzoxazole compound include the following compounds.

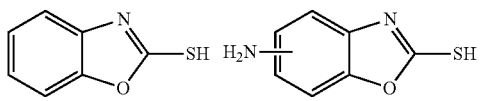

The heterocyclic compounds may be used alone or in combination of two or more kinds thereof.

In a case where the photosensitive composition layer includes the heterocyclic compound, a content of the heterocyclic compound is preferably 0.01% to 20.0% by mass, more preferably 0.10% to 10.0% by mass, still more preferably 0.30% to 8.0% by mass, and particularly preferably 0.50% to 5.0% by mass with respect to the total mass of the photosensitive composition layer.

Aliphatic Thiol Compound

The photosensitive composition layer may include an aliphatic thiol compound.

By incorporating the aliphatic thiol compound into the photosensitive composition layer, the aliphatic thiol compound undergoes an ene-thiol reaction with a radically polymerizable compound having an ethylenically unsaturated group, whereby a film formed is suppressed from being cured and shrunk, and the stress is thus relieved.

As the aliphatic thiol compound, a monofunctional aliphatic thiol compound or a polyfunctional aliphatic thiol compound (that is, a bi- or higher functional aliphatic thiol compound) is preferable.

Among those, as the aliphatic thiol compound, the polyfunctional aliphatic thiol compound is preferable from the viewpoint of adhesiveness (in particular, adhesiveness after exposure) of a pattern thus formed.

In the present specification, the "polyfunctional aliphatic thiol compound" refers to an aliphatic compound having two or more thiol groups (also referred to as "mercapto groups") in a molecule.

As the polyfunctional aliphatic thiol compound, a low-molecular-weight compound having a molecular weight of 100 or more is preferable. Specifically, a molecular weight of the polyfunctional aliphatic thiol compound is more preferably 100 to 1,500 and still more preferably 150 to 1,000.

The number of functional groups of the polyfunctional aliphatic thiol compound is, for example, preferably 2 to 10, more preferably 2 to 8, and still more preferably 2 to 6 from the viewpoint of the adhesiveness of a pattern thus formed.

Examples of the polyfunctional aliphatic thiol compound include trimethylolpropane tris(3-mercaptobutyrate), 1,4-bis(3-mercaptobutyryloxy)butane, pentaerythritol tetrakis(3-mercaptobutyrate), 1,3,5-tris(3-mercaptobutyryloxyethyl)-1,3,5-triazine-2,4,6(1H,3H,5H)-trione, 1,3,5-tris(2-(3-sulfanylbutanoyloxy)ethyl)-1,3,5-triazinane-2,4,6-trione, trimethylolethane tris(3-mercaptobutyrate), tris[(3-mercaptopropionyloxy)ethyl] isocyanurate, trimethylolpropane tris(3-mercaptopropionate), pentaerythritol tetrakis(3-mercaptopropionate), tetraethylene glycol bis(3-mercaptopropionate), dipentaerythritol hexakis(3-mercaptopropionate), ethylene glycol bisthiopropionate, 1,2-ethanedithiol, 1,3-propanedithiol, 1,6-hexamethylenedithiol, 2,2'-(ethylenedithio)diethanethiol, meso-2,3-dimercaptosuccinic acid, and di(mercaptoethyl) ether.

Among those, the polyfunctional aliphatic thiol compound is preferably at least one compound selected from the group consisting of trimethylolpropane tris(3-mercaptobutyrate), 1,4-bis(3-mercaptobutyryloxy)butane and 1,3,5-tris(3-mercaptobutyryloxyethyl)-1,3,5-triazine-2,4,6(1H,3H,5H)-trione.

Examples of the monofunctional aliphatic thiol compound include 1-octanethiol, 1-dodecanethiol, β-mercaptopropionic acid, methyl-3-mercaptopropionate, 2-ethylhexyl-3-mercaptopropionate, n-octyl-3-mercaptopropionate, methoxybutyl-3-mercaptopropionate, and stearyl-3-mercaptopropionate.

The photosensitive composition layer may include only one kind or two or more kinds of aliphatic thiol compounds.

In a case where the photosensitive composition layer includes the aliphatic thiol compound, a content of the aliphatic thiol compound is preferably 5% by mass or more, more preferably 5% to 50% by mass, still more preferably 5% to 30% by mass, and particularly preferably 8% to 20% by mass with respect to the total mass of the photosensitive composition layer.

Thermal Crosslinking Compound

From the viewpoint of hardness of a cured film to be obtained and pressure-sensitive adhesiveness of an uncured film to be obtained, it is preferable that the photosensitive composition layer includes a thermal crosslinking compound. Furthermore, in the present specification, a thermal crosslinking compound having an ethylenically unsaturated group, which will be described later, is not treated as the ethylenically unsaturated compound, but is treated as the thermal crosslinking compound.

Examples of the thermal crosslinking compound include an epoxy compound, an oxetane compound, a methylol compound, and a blocked isocyanate compound. Among these, from the viewpoint of hardness of a cured film to be obtained and pressure-sensitive adhesiveness of an uncured film to be obtained, a blocked isocyanate compound is preferable.

Since the blocked isocyanate compound reacts with a hydroxy group and a carboxyl group, for example, in a case where at least one of the binder polymer or the radically polymerizable compound having an ethylenically unsaturated group has at least one of a hydroxy group or a carboxyl group, hydrophilicity of the formed film tends to decrease, and the function as a protective film tends to be strengthened.

Furthermore, the blocked isocyanate compound refers to a "compound having a structure in which the isocyanate group of isocyanate is protected (so-called masked) with a blocking agent".

A dissociation temperature of the blocked isocyanate compound is not particularly limited, but is preferably 100° C. to 160° C., and more preferably 130° C. to 150° C.

The dissociation temperature of blocked isocyanate means "temperature at an endothermic peak accompanied with a deprotection reaction of blocked isocyanate, in a case where the measurement is performed by differential scanning calorimetry (DSC) analysis using a differential scanning calorimeter".

As the differential scanning calorimeter, for example, a differential scanning calorimeter (model: DSC6200) manufactured by Seiko Instruments Inc. can be suitably used. It should be noted that the differential scanning calorimeter is not limited thereto.

Examples of the blocking agent having a dissociation temperature of 100° C. to 160° C. include active methylene compounds [malonate diesters (such as dimethyl malonate, diethyl malonate, di-n-butyl malonate, and di-2-ethylhexyl malonate)], and oxime compounds (compound having a structure represented by —C(=N—OH)— in a molecule, such as formaldoxime, acetoaldoxime, acetoxime, methyl ethyl ketoxime, and cyclohexanone oxime).

Among these, from the viewpoint of storage stability, the blocking agent blocking agent having a dissociation temperature of 100° C. to 160° C. is preferably, for example, at least one selected from oxime compounds.

From the viewpoint of improving brittleness of the film and improving the adhesion to an object to transferred, for example, the blocked isocyanate compound preferably has an isocyanurate structure.

The blocked isocyanate compound having an isocyanurate structure can be obtained, for example, by isocyanurate-forming and protecting hexamethylene diisocyanate.

Among the blocked isocyanate compounds having an isocyanurate structure, a compound having an oxime structure using an oxime compound as a blocking agent is preferable from the viewpoint that the dissociation temperature can be easily set in a preferred range and the development residue can be easily reduced, as compared with a compound having no oxime structure.

The blocked isocyanate compound may have a polymerizable group.

The polymerizable group is not particularly limited, a known polymerizable group can be used, and a radically polymerizable group is preferable.

Examples of the polymerizable group include a (meth)acryloxy group, a (meth)acrylamide group, an ethylenically unsaturated group such as styryl group, and an epoxy group such as a glycidyl group.

Among those, as the polymerizable group, the ethylenically unsaturated group is preferable, the (meth)acryloxy group is more preferable, and the acryloxy group is still more preferable.

As the blocked isocyanate compound, a commercially available product can be used.

Examples of the commercially available blocked isocyanate compound include KARENZ (registered trademark), AOI-BM, KARENZ (registered trademark), MOI-BM, KARENZ (registered trademark), MOI-BP, and the like (all manufactured by Showa Denko K. K.), and blocked DURANATE series (for example, DURANATE (registered trademark), TPA-B80E, DURANATE (registered trademark), WT32-B75P, and the like (manufactured by Asahi Kasei Chemicals Corporation).

The thermal crosslinking compounds may be used alone or in combination of two or more kinds thereof.

In a case where the photosensitive composition layer incudes the thermal crosslinking compound, a content of the thermal crosslinking compound is preferably 1.0% to 50.0% by mass, more preferably 5.0% to 30.0% by mass, and still more preferably 5.0% to 25.0% by mass with respect to the total mass of the photosensitive composition layer.

Surfactant

The photosensitive composition layer may include a surfactant.

Examples of the surfactant include the surfactants described in paragraph [0017] of JP4502784B and paragraphs [0060] to [0071] of JP2009-237362A.

As the surfactant, a fluorine-based surfactant or a silicone-based surfactant is preferable.

Examples of a commercially available product of the fluorine-based surfactant include: MEGAFACE F-171, F-172, F-173, F-176, F-177, F-141, F-142, F-143, F-144, F-437, F-475, F-477, F-479, F-482, F-551-A, F-552, F-554, F-555-A, F-556, F-557, F-558, F-559, F-560, F-561, F-565, F-563, F-568, F-575, F-780, EXP, MFS-330, R-41, R-41-LM, R-01, R-40, R-40-LM, RS-43, TF-1956, RS-90, R-94, RS-72-K, and DS-21 (all manufactured by DIC Corporation); FLUORAD FC430, FC431, and FC171 (all manufactured by Sumitomo 3M Ltd.); SURFLON S-382, SC-101, SC-103, SC-104, SC-105, SC-1068, SC-381, SC-383, S-393, and KH-40 (all manufactured by Asahi Glass Co., Ltd.); POLYFOX PF636, PF656, PF6320, PF6520, and PF7002 (all manufactured by OMNOVA Solutions Inc.); and FTERGENT 710FM, 710FL, 610FM, 601AD, 601ADH2, 602A, 215M, 245F, 251, 212M, 250, 209F, 222F, 208G, 710LA, 710FS, 730LM, 650AC, and 681 (all manufactured by NEOS Co., Ltd.).

In addition, as the fluorine-based surfactant, an acrylic compound which has a molecular structure having a functional group containing a fluorine atom and in which the functional group containing a fluorine atom is broken to volatilize a fluorine atom by applying heat to the molecular structure can also be suitably used. Examples of such a fluorine-based surfactant include MEGAFACE DS series manufactured by DIC Corporation (The Chemical Daily (Feb. 22, 2016) and Nikkei Business Daily (Feb. 23, 2016)), for example, MEGAFACE DS-21.

In addition, as the fluorine-based surfactant, a polymer of a fluorine atom-containing vinyl ether compound having a fluorinated alkyl group or a fluorinated alkylene ether group, and a hydrophilic vinyl ether compound can be preferably used.

In addition, a block polymer can also be used as the fluorine-based surfactant.

As the fluorine-based surfactant, a fluorine-containing polymer compound including a constitutional unit derived from a (meth)acrylate compound having a fluorine atom and a constitutional unit derived from a (meth)acrylate compound having 2 or more (preferably 5 or more) alkyleneoxy groups (preferably ethyleneoxy groups or propyleneoxy groups) can also be preferably used.

In addition, as the fluorine-based surfactant, a fluorine-containing polymer having an ethylenically unsaturated bond-containing group at a side chain can also be used. Examples thereof include MEGAFACE RS-101, RS-102, RS-718K, and RS-72-K (all manufactured by DIC Corporation.

As the fluorine-based surfactant, from the viewpoint of improving environmental suitability, a surfactant derived from a substitute material for a compound having a perfluoroalkyl group having 7 or more carbon atoms, such as perfluorooctanoic acid (PFOA) and perfluorooctanesulfonic acid (PFOS), is preferable.

Examples of the nonionic surfactant include glycerol, trimethylolpropane, trimethylolethane, an ethoxylate and propoxylate thereof (for example, glycerol propoxylate or glycerol ethoxylate), polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, sorbitan fatty acid esters, PLURONIC (registered trademark) L10, L31, L61, L62, 10R5, 17R2, and 25R2 (all manufactured by BASF SE), TETRONIC 304, 701, 704, 901, 904, and 150R1 (all manufactured by BASF SE), SOLSPERSE 20000 (manufactured by Lubrizol Corporation), NCW-101, NCW-1001, and NCW-1002 (all manufactured by FUJIFILM Wako Pure Chemical Corporation), PIONIN D-6112, D-6112-W, and D-6315 (all manufactured by Takemoto Oil&Fat Co., Ltd.), and OLFINE E1010 and SURFYNOL 104, 400, and 440 (all manufactured by Nissin Chemical Co., Ltd.).

Examples of the silicone-based surfactant include a linear polymer consisting of a siloxane bond and a modified siloxane polymer with an organic group introduced in the side chain or the terminal.

Specific examples of the surfactant include DOWSIL 8032 ADDITIVE, TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (all manufactured by Dow Corning Toray Co., Ltd.), X-22-4952, X-22-4272, X-22-6266, KF-351A, K354L, KF-355A, KF-945, KF-640, KF-642, KF-643, X-22-6191, X-22-4515, KF-6004, KP-341, KF-6001, and KF-6002 (all manufactured by Shin-Etsu Silicone Co., Ltd.), F-4440, TSF-4300, TSF-4445, TSF-4460, and TSF-4452 (all manufactured by Momentive Performance Materials Co., Ltd.), and BYK307, BYK323, and BYK330 (all manufactured by BYK Chemie).

The surfactants may be used alone or in combination of two or more kinds thereof.

In a case where the photosensitive composition layer includes the surfactant, a content of the surfactant is preferably 0.01% to 3.0% by mass, more preferably 0.01% to 1.0% by mass, and still more preferably 0.05% to 0.80% by mass with respect to the total mass of the photosensitive composition layer.

Polymerization Inhibitor

The photosensitive composition layer may include a polymerization inhibitor.

The polymerization inhibitor means a compound having a function of delaying or prohibiting a polymerization reaction. As the polymerization inhibitor, for example, a known compound used as a polymerization inhibitor can be used.

Examples of the polymerization inhibitor include phenothiazine compounds such as phenothiazine, bis-(1-dimethylbenzyl)phenothiazine, and 3,7-dioctylphenothiazine; hindered phenol compounds or salts thereof, such as bis[3-(3-tert-butyl-4-hydroxy-5-methylphenyl)propionic acid] [ethylenebis(oxyethylene)]2,4-bis[(laurylthio)methyl]-o-cresol, 1,3,5-tris(3,5-di-t-butyl-4-hydroxybenzyl), 1,3,5-tris (4-t-butyl-3-hydroxy-2,6-dimethylbenzyl), 2,4-bis-(n-octylthio)-6-(4-hydroxy-3,5-di-t-butylanilino)-1,3,5-triazine, and pentaerythritol tetrakis-3-(3,5-di-tert-butyl-4-hydroxyphenyl)propionate; 4-nitroso compounds such as nitrosophenol, N-nitrosodiphenylamine, N-nitrosocyclohexylhydroxylamine, and N-nitrosophenylhydroxylamine; quinone compounds such as methylhydroquinone, t-butylhydroquinone, 2,5-di-t-butylhydroquinone, and 4-benzoquinone; phenolic compounds such as 4-methoxyphenol, 4-methoxy-1-naphthol, and t-butylcatechol; and metal salt compounds such as copper dibutyldithiocarbamate, copper diethyldithiocarbamate, manganese diethyldithiocarbamate, and manganese diphenyldithiocarbamate.

Among those, at least one selected from the group consisting of the phenothiazine compounds, the nitroso compounds or salts thereof, and the hindered phenol compounds is preferable, and phenothiazine and bis[3-(3-tert-butyl-4-hydroxy-5-methylphenyl)propionic acid][ethylenebis(oxyethylene)] 2,4-bis[(laurylthio)methyl]-o-cresol, 1,3,5-tris(3, 5-di-t-butyl-4-hydroxybenzyl), and the N-nitrosophenylhydroxylamine aluminum salt are more preferable as the polymerization inhibitor from the viewpoint that the effect of the present invention is more excellent.

The polymerization inhibitors may be used alone or in combination of two or more kinds thereof.

In a case where the photosensitive composition layer includes the polymerization inhibitor, a content of the polymerization inhibitor is preferably 0.001% to 5.0% by mass, more preferably 0.01% to 3.0% by mass, and still more preferably 0.02% to 2.0% by mass with respect to the total mass of the photosensitive composition layer. The content of the polymerization inhibitor is preferably 0.005% to 5.0% by mass, more preferably 0.01% to 3.0% by mass, and still more preferably 0.01% to 1.0% by mass with respect to the total mass of the polymerizable compound.

Hydrogen Donating Compound

The photosensitive composition layer may include a hydrogen donating compound.

The hydrogen donating compound has a function of, for example, further improving sensitivity of the photopolymerization initiator to actinic ray, and suppressing inhibition of polymerization of the polymerizable compound by oxygen.

Examples of the hydrogen donating compound include amines and amino acid compounds.

Examples of the amines include the compounds described in M. R. Sander et al., "Journal of Polymer Society," Vol. 10, page 3173 (1972), JP1969-020189B (JP-S44-020189B), JP1976-082102A (JP-S51-082102A), JP1977-134692A (JP-S52-134692A), JP1984-138205A (JP-S59-138205A), JP1985-084305A (JP-S60-084305A), JP1987-018537A (JP-S62-018537A), JP1989-033104A (JP-S64-033104A), and Research Disclosure 33825. More specific examples of the amines include 4,4'-bis(diethylamino)benzophenone, tris(4-dimethylaminophenyl)methane (also known as Leucocrystal Violet), triethanolamine, an ethyl p-dimethylaminobenzoate ester, p-formyl dimethylaniline, and p-methylthiodimethylaniline.

Among those, at least one selected from the group consisting of 4,4'-bis(diethylamino)benzophenone and tris(4-dimethylaminophenyl)methane is preferable as the amines from the viewpoint that the effect of the present invention is more excellent.

Examples of the amino acid compound include N-phenylglycine, N-methyl-N-phenylglycine, and N-ethyl-N-phenylglycine.

Among those, N-phenylglycine is preferable as the amino acid compound from the viewpoint that the effect of the present invention is more excellent.

In addition, examples of the hydrogen donating compound also include the organic metal compound described in JP1973-042965B (JP-S48-042965B) (tributyl tin acetate and the like), a hydrogen donor described in JP1980-034414B (JP-S55-034414B), and a sulfur compound described in JP1994-308727A (JP-H06-308727A) (trithiane and the like).

The hydrogen donating compounds may be used alone or in combination of two or more kinds thereof.

In a case where the photosensitive composition layer includes the hydrogen donating compound, a content of the hydrogen donating compound is preferably 0.01% to 10.0% by mass, more preferably 0.01% to 8.0% by mass, and still more preferably 0.03% to 5.0% by mass with respect to the total mass of the photosensitive composition layer from the viewpoint of improving a curing rate by balancing the polymerization growth rate and the chain transfer.

Impurities and the Like

The photosensitive composition layer may include a predetermined amount of impurities.

Examples of the impurities include sodium, potassium, magnesium, calcium, iron, manganese, copper, aluminum, titanium, chromium, cobalt, nickel, zinc, tin, halogen, and ions of these. Among these, halide ion, sodium ion, and potassium ion are easily mixed as impurities, so that the following content is preferable.

A content of impurities in the photosensitive composition layer is preferably 80 ppm or less, more preferably 10 ppm or less, and still more preferably 2 ppm or less on a mass basis. The content of impurities in the photosensitive composition layer may be 1 ppb or more or 0.1 ppm or more on a mass basis.

Examples of a method for keeping the impurities in the range include selecting a raw material having a low content of impurities as a raw material for the photosensitive composition layer, preventing the impurities from being mixed in a case of forming the photosensitive composition layer, and washing and removing the impurities. By such a method, the amount of impurities can be kept within the range.

The impurities can be quantified by a known method such as inductively coupled plasma (ICP) emission spectroscopy, atomic absorption spectroscopy, and ion chromatography.

In addition, it is preferable that the content of compounds such as benzene, formaldehyde, trichlorethylene, 1,3-butadiene, carbon tetrachloride, chloroform, N,N-dimethylformamide, N,N-dimethylacetamide, and hexane is low in the photosensitive composition layer. A content of these compounds in the photosensitive composition layer is preferably 100 ppm or less, more preferably 20 ppm or less, and still more preferably 4 ppm or less on a mass basis. The lower limit may be 10 ppb or more or 100 ppb or more on a mass basis. The content of these compounds can be suppressed in the same manner as in the metal as impurities. In addition, the compounds can be quantified by a known measurement method.

From the viewpoint of reliability and laminating property, the content of water in the photosensitive composition layer is preferably 0.01% to 1.0% by mass, and more preferably 0.05% to 0.5% by mass.

Residual Monomers

The photosensitive composition layer sometimes includes residual monomers of each constitutional unit of the above-mentioned alkali-soluble resin.

From the viewpoint of patterning properties and reliability, a content of the residual monomers is preferably 5,000 ppm by mass or less, more preferably 2,000 ppm by mass or less, and still more preferably 500 ppm by mass or less with respect to the total mass of the alkali-soluble resin. The lower limit is not particularly limited, but is preferably 1 ppm by mass or more, and more preferably 10 ppm by mass or more.

From the viewpoint of patterning properties and reliability, a content of the residual monomers of each constitutional unit in the alkali-soluble resin is preferably 3,000 ppm by mass or less, more preferably 600 ppm by mass or less, and still more preferably 100 ppm by mass or less with respect to the total mass of the photosensitive composition layer. The lower limit is not particularly limited, but is preferably 0.1 ppm by mass or more, and more preferably 1 ppm by mass or more.

It is preferable that an amount of residual monomers of the monomers in a case of synthesizing the alkali-soluble resin by the polymer reaction is also within the range. For example, in a case where glycidyl acrylate is reacted with a carboxylic acid side chain to synthesize the alkali-soluble resin, a content of glycidyl acrylate is preferably within the range.

The amount of the residual monomers can be measured by a known method such as liquid chromatography and gas chromatography.

Other Components

The photosensitive composition layer may include a component other than the above-mentioned components (hereinafter also referred to as "other components"). Examples of such other components include a colorant, an antioxidant, and particles (for example, metal oxide particles). In addition, examples of such other components also include other additives described in paragraphs [0058] to [0071] of JP2000-310706A.

Particles

As the particles, metal oxide particles are preferable.

Examples of a metal in the metal oxide particles also include semimetal such as B, Si, Ge, As, Sb, and Te.

For example, from a viewpoint of transparency of a cured film, an average primary particle diameter of the particles is preferably 1 to 200 nm, and more preferably 3 to 80 nm.

The average primary particle diameter of the particles is calculated by measuring particle diameters of 200 random particles using an electron microscope and arithmetically averaging the measurement result. Furthermore, in a case where the shape of the particle is not a spherical shape, the longest side is set as the particle diameter.

Colorant

The photosensitive composition layer may include a trace amount of a colorant (pigment, dye, and the like), but for example, from the viewpoint of transparency, it is preferable that the photosensitive composition layer does not substantially include the colorant.

In a case where the photosensitive composition layer includes the colorant, the content of the colorant is preferably less than 1% by mass, and more preferably less than 0.1% by mass with respect to the total mass of the photosensitive composition layer.

Antioxidant

Examples of the antioxidant include 3-pyrazolidones such as 1-phenyl-3-pyrazolidone (also known as phenidone), 1-phenyl-4,4-dimethyl-3-pyrazolidone, and 1-phenyl-4-methyl-4-hydroxymethyl-3-pyrazolidone; polyhydroxybenzenes such as hydroquinone, catechol, pyrogallol, methylhydroquinone, and chlorhydroquinone; paramethylaminophenol, paraaminophenol, parahydroxyphenylglycine, and paraphenylenediamine.

Among those, 3-pyrazolidone is preferable, and 1-phenyl-3-pyrazolidone is more preferable as the antioxidant from the viewpoint that the effect of the present invention is more excellent.

First Layer

The first layer is a layer arranged between the temporary support and the photosensitive composition layer, and has a smaller refractive index than the refractive index of the photosensitive composition layer.

Refractive Index of First Layer

A refractive index of the first layer is 1.45 or less, preferably 1.10 to 1.45, more preferably 1.15 to 1.40, and still more preferably 1.20 to 1.30.

A method for controlling the refractive index of the first layer is not particularly limited, but examples thereof include a method using a resin or polymerizable compound having a desired refractive index, a method using particles (for example, hollow particles, metal particles, and metal oxide particles) having a desired refractive index, and a method using a composite of a metal salt and a polymer, each having a desired refractive index.

Thickness of First Layer

Moreover, an upper limit of the thickness of the first layer is preferably 300 nm or less, more preferably 200 nm or less, and still more preferably 120 nm or less. The lower limit value is preferably 10 nm or more, more preferably 30 nm or more, and still more preferably 50 nm or more.

Components of First Layer

The first layer may be a composition layer formed from a curable composition that is cured by energy such as heat or light (hereinafter also referred to as a "curable composition layer"), and may also be a non-curable composition which does not correspond to the type. As the first layer, the curable composition layer is preferable from the viewpoint that the film-forming properties are more excellent.

In a case where the first layer is a curable composition layer, in one suitable aspect of the first layer, it is preferable that the first layer includes refractive index-adjusting particles and a resin (preferably an alkali-soluble resin). As a suitable example of the content of each component in a case where the first layer has the configuration, for example, an aspect in which the content of the refractive index-adjusting particles is 30.0% to 95.0% by mass and the content of the resin is 1.0% to 60.0% by mass with respect to the total mass of the first layer may be mentioned.

In addition, in a case where the first layer is a curable composition layer, in one suitable aspect of the first layer, it is preferable that the first layer includes refractive index-adjusting particles, a resin (preferably an alkali-soluble resin), and a polymerizable compound. As a suitable example of the content of each component in a case where the first layer has the configuration, for example, an aspect in which the content of the refractive index-adjusting particles is 30.0% to 95.0% by mass, the content of the resin is 1.0% to 60.0% by mass, and the content of the polymerizable compound is 1.0% to 60.0% by mass with respect to the total mass of the first layer.

Hereinafter, the components included in the first layer will be described in detail.

Resin

The first layer preferably includes a resin, and more preferably includes an alkali-soluble resin.

The alkali-soluble resin that can be used in the first layer is the same as the alkali-soluble resin that can be included in the above-mentioned photosensitive composition layer, and suitable aspects thereof are also the same.

As a suitable aspect of the alkali-soluble resin used in the first layer, a (meth)acrylic resin having a constitutional unit derived from at least one of a (meth)acrylic acid or a (meth)acrylic acid ester may be mentioned. Among the resins, the (meth)acrylic resin having a constitutional unit derived from a (meth)acrylic acid and a constitutional unit derived from allyl (meth)acrylate is preferable.

In addition, in another suitable aspect of the alkali-soluble resin used in the first layer, a copolymer including a structural unit derived from a (meth)acrylic acid and a structural unit derived from styrene in the main chain may also be mentioned. Among the copolymers, the copolymer including a structural unit derived from a (meth)acrylic acid and a structural unit derived from styrene is preferable, and the copolymer including structural unit derived from a (meth) acrylic acid, a structural unit derived from styrene, and a structural unit derived from a (meth)acrylic acid ester having an ethyleneoxy chain is more preferable.

In addition, in a case where the alkali-soluble resin used in the first layer has an acid group (for example, a carboxyl group, a phosphoric acid group, and a sulfonic acid group) in the structure, the acid group may have a salt structure (for example, an ammonium salt structure).

A commercially available product can also be used as the alkali-soluble resin.

Examples of the commercially available product include ARUFON (registered trademark) UC3000, UC3510, UC3080, UC3920, and UF5041 (all product names) manufactured by Toagosei Co., Ltd., and JONCRYL (registered trademark) 67, JONCRYL611, JONCRYL678, JONCRYL690, and JONCRYL819 (all product names) manufactured by BASF.

The resins may be used alone or in combination of two or more kinds thereof.

A content of the resin in the first layer is preferably 1.0% to 60.0% by mass, more preferably 1.0% to 40.0% by mass, and still more preferably 1.0% to 30.0% by mass with respect to the total mass of the first layer.

Refractive Index-Adjusting Particles

The first layer preferably includes refractive index-adjusting particles.

The refractive index-adjusting particles may be either inorganic particles or organic particles, but are preferably the inorganic particles.

Examples of the inorganic particles include metal oxide particles such as silica particles ($SiO_2$ particles), and hollow particles such as hollow silica particles.

The hollow particles are intended to be particles including air in a cavity covered by an outer shell. The air included in the cavity of the particles (refractive index: 1.0) can reduce the refractive index of a film in a case where the air is introduced into the film. A porosity of the hollow particles is preferably 10% to 80%, more preferably 20% to 60%, and still more preferably 30% to 60% from the viewpoint that it is easy to adjust the refractive index to a low level.

Examples of the hollow particles include silica hollow particles.

In addition, the refractive index-adjusting particles may be subjected to a physical surface treatment such as a plasma discharge treatment and a corona discharge treatment, or a chemical surface treatment with a surfactant, a coupling agent, and the like.

From the viewpoint that the refractive index of the transfer layer can be easily adjusted to 1.45 or less, the refractive index-adjusting particles preferably include at least one of the silica particles or the hollow silica particles.

Examples of the silica particles include colloidal silica and fumed silica, and examples of commercially available products thereof include SNOWTEX ST-N (colloidal silica; non-volatile fraction: 20% by mass) and SNOWTEX ST-C (colloidal silica; non-volatile fraction: 20% by mass), manufactured by Nissan Chemical Corporation.

Examples of the commercially available hollow silica particles include Sluria series manufactured by JGC Catalysts & Chemicals Ltd.

The refractive index of the refractive index-adjusting particles is preferably 1.45 or less, more preferably 1.0 to 1.45, and still more preferably 1.1 to 1.35.

Here, the refractive index of the particles is intended to be a refractive index at a wavelength of 550 nm at 25° C., and can be measured by a method such as an extinction spectral method, an extrapolation method, a Becke's line method, and an immersion method.

An average primary particle diameter of the refractive index-adjusting particles is preferably 100 nm or less, more preferably 50 nm or less, and still more preferably 20 nm or less from the viewpoint of optical performance such as a haze.

The average primary particle diameter of the refractive index-adjusted particles is a value obtained by measuring the diameters of any 100 particles by observation with a transmission electron microscope (TEM), and arithmetically averaging the diameters of the 100 particles.

The refractive index-adjusting particles may be used singly or in combination of two or more kinds thereof.

A content of the refractive index-adjusting particles in the first layer is not particularly limited, but is preferably 30.0% to 95.0% by mass, more preferably 55.0% to 95.0% by mass, and still more preferably 60.0% to 95.0% by mass with respect to the total mass of the first layer.

Metal Oxidation Inhibitor

In a case where the first layer includes inorganic particles as the refractive index-adjusting particles, it is preferable that the first layer further includes a metal oxidation inhibitor.

As the metal oxidation inhibitor, a compound having an aromatic ring (nitrogen-containing aromatic ring) including a nitrogen atom as a ring member atom is preferable.

Examples of the nitrogen-containing aromatic ring include an imidazole ring, a triazole ring, a tetrazole ring, and a thiadiazole ring; and a fused ring of one or more selected from the group consisting of an imidazole ring, a triazole ring, a tetrazole ring, and a thiadiazole ring, and another aromatic ring.

Such another aromatic ring may be either an aromatic hydrocarbon ring or an aromatic heterocyclic ring, but the aromatic hydrocarbon ring is more preferable, the benzene ring or a naphthalene ring is more preferable, and the benzene ring is particularly preferable.

As the compound having a nitrogen-containing aromatic ring, triazole, imidazole, benzimidazole, tetrazole, mercaptothiadiazole, or benzotriazole is preferable, and triazole or benzotriazole is more preferable.

The metal oxidation inhibitors may be used singly or in combination of two or more kinds thereof.

A content of the metal oxidation inhibitor in the first layer is preferably 0.01% to 8.0% by mass, more preferably 0.01% to 5.0% by mass, and still more preferably 0.01% to 3.0% by mass with respect to the total mass of the first layer.

Polymerizable Compound

It is also preferable that the first layer includes a polymerizable compound.

The polymerizable compound is a compound having a polymerizable group. Examples of the polymerizable group include a radically polymerizable group and a cationically polymerizable group, and a radically polymerizable group is preferable.

The polymerizable compound preferably includes a radically polymerizable compound having an ethylenically unsaturated group (hereinafter also simply referred to as an "ethylenically unsaturated compound").

The ethylenically unsaturated group is preferably a (meth) acryloxy group or a (meth)acrylamide group, and more preferably the (meth)acryloxy group.

The molecular weight of the ethylenically unsaturated compound is preferably less than 2,000.

As the polymerizable compound, for example, the polymerizable compounds described in the section of the photosensitive composition layer and the polymerizable compounds described in paragraphs 0023 and 0024 of JP4098550B can be used. Among those, pentaerythritol tetraacrylate, pentaerythritol triacrylate, and a pentaerythritol ethylene oxide adduct tetraacrylate can be preferably used. These polymerizable compounds may be used alone or in combination of two or more kinds thereof.

Examples of the polymerizable compound used in the first layer include a polymerizable compound represented by Structural Formula 1, a polymerizable compound represented by Structural Formula 2, dipentaerythritol (tri/tetra/penta/hexa)(meth)acrylate, pentaerythritol (tri/tetra)(meth) acrylate, a tetraacrylate of a pentaerythritol ethylene oxide adduct, trimethylolpropane tri(meth)acrylate, ditrimethylolpropane tetra(meth)acrylate, isocyanuric acid (meth)acrylate, and a (meth)acrylate compound of a glycerin tri(meth) acrylate skeleton.

Structural Formula 1

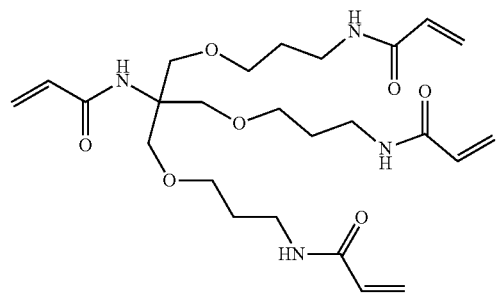

Structural Formula 2

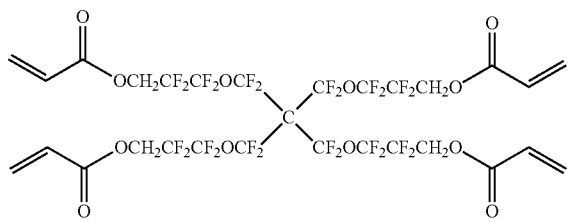

Examples of commercially available products of the polymerizable compounds include NK Ester A-TMMT, A-TMM3LM-N, A-TMM-3L, and A-TMM3 (all manufactured by Shin-Nakamura Chemical Co., Ltd.), and KAYARAD RP-1040 (manufactured by Nippon Kayaku Co., Ltd.).

As one of suitable aspects of the polymerizable compound, an ethylenically unsaturated compound having an acid group can also be mentioned.

Examples of the acid group include a carboxyl group, a sulfo group, and a phosphoric acid group.

Among these, the carboxyl group is preferable as the acid group. In addition, the carboxyl group may be an acid anhydride.

Examples of the ethylenically unsaturated compound having an acid group include a tri- or tetrafunctional ethylenically unsaturated compound [component obtained by introducing a carboxyl group to pentaerythritol tri- and tetraaerylate (PETA) skeleton (acid value: 80 to 120 mgKOH/g)], and a penta- or hexafunctional ethylenically unsaturated compound including the acid group (component obtained by introducing a carboxyl group to a dipentaerythritol penta- or hexaaerylate (DPHA) skeleton [acid value: 25 to 70 mgKOH/g)].

In addition, as the ethylenically unsaturated compound having an acid group, the polymerizable compound having an acid group described in paragraphs [0025] to [0030] of JP2004-239942A can also be preferably used.

From the viewpoints of developability and film strength, as the ethylenically unsaturated compound having an acid group, at least one selected from the group consisting of a bi- or higher functional ethylenically unsaturated compound having a carboxyl group and a bi- or higher functional ethylenically unsaturated compound having a carboxylic acid anhydride is preferable.

The bi- or higher functional ethylenically unsaturated compound having a carboxyl group is not particularly limited and can be appropriately selected from known compounds.

Examples of the bi- or higher functional ethylenically unsaturated compound having a carboxyl group include ARONIX (registered trademark) TO-2349 (manufactured by Toagosei Co., Ltd.), ARONIX (registered trademark) M-520 (manufactured by Toagosei Co., Ltd.), and ARONIX (registered trademark) M-510 (manufactured by Toagosei Co., Ltd.).

The polymerizable compounds may be used alone or in combination of two or more kinds thereof.

A content of the polymerizable compound in the first layer is preferably 1.0% to 60.0% by mass, and more preferably 1.0% to 20.0% by mass with respect to the total mass of the first layer.

Polymerization Initiator

The first layer may include a polymerization initiator.

The polymerization initiator used in the first layer is not particularly limited, and examples thereof include IRGACURE 2959, a photopolymerization initiator of Structural Formula 3.

Structural Formula 3

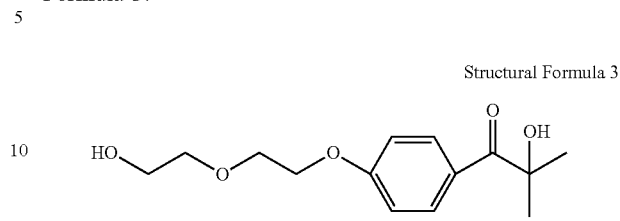

The polymerization initiators may be used alone or in combination of two or more kinds thereof.

In a case where the first layer includes the polymerization initiator, a content of the polymerization initiator is preferably 0.1% to 5.0% by mass, and more preferably 0.1% to 3.0% by mass with respect to the total mass of the first layer.

Other Components

The first layer may include a component other than the above-mentioned components (hereinafter also referred to as "other components"). Examples of such other components include a surfactant. As the surfactant, the same ones as the surfactants that can be included in the photosensitive composition layer can be used.

Protective Film

The transfer film may have a protective film.

As the protective film, a resin film having heat resistance and solvent resistance can be used, and examples thereof include polyolefin films such as a polypropylene film and a polyethylene film, polyester films such as a polyethylene terephthalate film, polycarbonate films, and polystyrene films.

In addition, as the protective film, a resin film composed of the same material as the above-mentioned temporary support may be used.

Among those, as the protective film, the polyolefin film is preferable, the polypropylene film or the polyethylene film is more preferable, and the polyethylene film is still more preferable.

A thickness of the protective film is preferably 1 to 100 μm, more preferably 5 to 50 μm, still more preferably 5 to 40 μm, and particularly preferably 15 to 30 μm.

The thickness of the protective film is preferably 1 μm or more from the viewpoint of excellent mechanical hardness, and is preferably 100 μm or less from viewpoint of relatively low cost.

In addition, the protective film preferably has 5 pieces/m$^2$ or less of the number of fisheyes having a diameter of 80 μm or more included in the protective film.

Incidentally, the "fisheye" means that, in a case where a material is hot-melted, kneaded, extruded, biaxially stretched, cast or the like to produce a film, foreign substances, undissolved substances, oxidatively deteriorated substances, and the like of the material are incorporated into the film.

The number of particles having a diameter of 3 μm or more included in the protective film is preferably 30 particles/mm$^2$ or less, more preferably 10 particles/mm$^2$ or less, and still more preferably 5 particles/mm$^2$ or less.

This makes it possible to suppress defects generated in a case where unevenness caused by the particles included in the protective film is transferred to the photosensitive composition layer and the like.

From the viewpoint of imparting a take-up property, an arithmetic average roughness Ra of a surface of the protective film on a side opposite to the surface in contact with the photosensitive composition layer is preferably 0.01 μm or more, more preferably 0.02 μm or more, and still more preferably 0.03 μm or more. On the other hand, Ra is preferably less than 0.50 μm, more preferably 0.40 μm or less, and still more preferably 0.30 μm or less.

From the viewpoint of suppressing defects during transfer, the surface roughness Ra of a surface in contact with the photosensitive composition layer in the protective film is preferably 0.01 μm or more, more preferably 0.02 μm or more, and still more preferably 0.03 μm or more. On the other hand, Ra is preferably less than 0.50 μm, more preferably 0.40 μm or less, and still more preferably 0.30 μm or less.

Modified Example of First Embodiment

Figure 2:
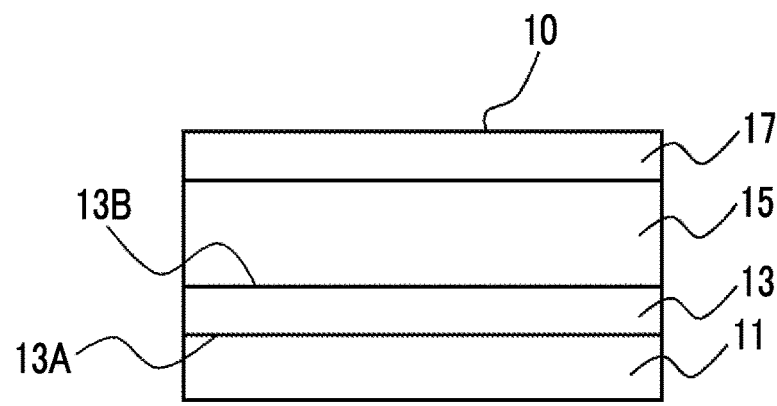
FIG. 2 is a schematic cross-sectional view showing an example of an embodiment of the transfer film of the present invention.

In the transfer film 10, as shown in FIG. 2, the refractive index on a surface 13A of the first layer 13 on the temporary support 11 side may be set to be lower than the refractive index on a surface 13B of the first layer 13 on the photosensitive composition layer 15 side. In a laminate obtained by affixing the transfer film 10 from which the protective film 17 has been peeled and a member containing a layer with a high refractive index to each other so that the photosensitive composition layer 15 and the member containing a layer with a high refractive index (not shown) are in contact with each other to perform exposure, the refractive index of the first refractive index-adjusting layer derived from the first layer 13 changes stepwise between the resin layer side derived from the photosensitive composition layer 15 and the air interface side of the first refractive index-adjusting layer derived from the first layer 13 (note that the air interface is intended to be an air side interface of the first refractive index-adjusting layer derived from the first layer 13 exposed after the temporary support 11 is peeled), and accordingly, the laminate exhibits a more excellent antireflection function.

Second Embodiment

Figure 3:
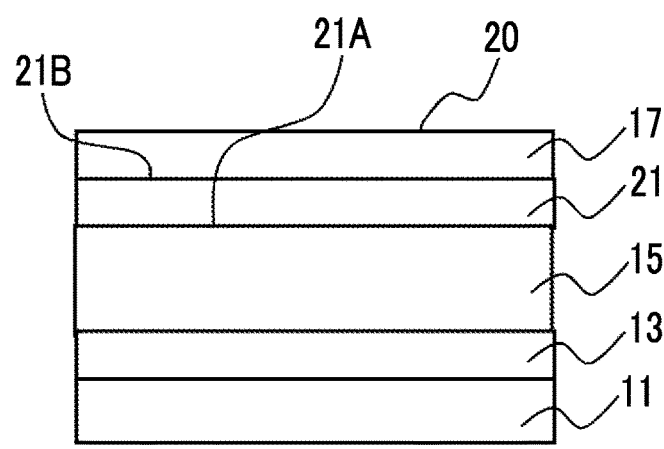
FIG. 3 is a schematic cross-sectional view showing an example of an embodiment of the transfer film of the present invention.

FIG. 3 is a schematic cross-sectional view showing a second embodiment of the transfer film of the embodiment of the present invention. The transfer film 20 includes the temporary support 11, the first layer 13, the photosensitive composition layer 15, the second layer 21, and the protective film 17 in this order. The refractive index of the first layer 13 is 1.45 or less, and is lower than the refractive index of the photosensitive composition layer 15. In addition, the refractive index of the second layer 21 is higher than the refractive index of the photosensitive composition layer 15.

Furthermore, the transfer film 20 shown in FIG. 3 has a form in which the protective film 17 is arranged, but the protective film 17 may not be arranged.

After the protective film 17 is peeled, the transfer film 20 is transferred to the member containing a layer with a high refractive index so that the surface of the second layer 21 exposed by the peeling is in contact with the member containing a layer with a high refractive index (not shown). In the obtained laminate, by allowing the second refractive index-adjusting layer derived from the second layer 21 to be interposed, a refractive index difference between the resin layer derived from the photosensitive composition layer 15 and the member containing a layer with a high refractive index is alleviated, and thus, the laminate exhibits an excellent antireflection function.

In addition, the first layer 13, the second layer 21, and the photosensitive composition layer 15 are preferably transparent layers. The definitions of the terms "transparent" and "transparent layer" are as mentioned above.

Hereinafter, each of the components constituting the transfer film 20 will be described.

In the transfer film 20, the temporary support, the first layer, the photosensitive composition layer, and the protective film are the same as the temporary support, the first layer, the photosensitive composition layer, and the protective film, respectively, which are included in the transfer film 10 of the first embodiment, and suitable aspects thereof are also the same.

Second Layer

The second layer is a layer arranged on a surface of the photosensitive composition layer opposite to the first layer, and has a refractive index larger than the refractive index of the photosensitive composition layer.

Refractive Index of Second Layer

A refractive index of the second layer is preferably 1.60 or more, more preferably 1.60 to 2.00, and still more preferably 1.65 to 1.80.

A method for controlling the refractive index of the second layer is not particularly limited, but examples thereof include a method using a resin or polymerizable compound having a desired refractive index, a method using particles (for example, metal particles, and metal oxide particles) having a desired refractive index, and a method using a composite of a metal salt and a polymer, each having a desired refractive index.

Thickness of Second Layer

In addition, an upper limit value of the thickness of the second layer is preferably 200 nm or less, more preferably 150 nm or less, and still more preferably 100 nm or less. The lower limit value is preferably 20 nm or more, more preferably 30 nm or more, and still more preferably 50 nm or more.

Components of Second Layer

The second layer may be a composition layer formed from a curable composition that is cured by energy such as heat or light (hereinafter also referred to as a "curable composition layer"), and may also be a non-curable composition which does not correspond to the form. Among those, the curable composition layer is preferable as the second layer from the viewpoint that the film-forming properties are more excellent.

In a case where the second layer is the curable composition layer, it is preferable to include refractive index-adjusting particles and a resin (preferably an alkali-soluble resin) in one suitable aspect of the second layer. As a suitable example of the content of each component in a case where the second layer has the configuration, for example, an aspect in which the content of the refractive index-adjusting particles is 30.0% to 93.0% by mass and the content of the resin is 5.0% to 60.0% by mass with respect to the total mass of the second layer may be mentioned.

In addition, in a case where the second layer is a curable composition layer, one suitable aspect of the second layer is preferably the second layer including refractive index-adjusting particles, a resin (preferably an alkali-soluble resin), and a polymerizable compound. As a suitable example of the content of each component in a case where the second layer has the configuration, for example, an aspect in which the content of the refractive index-adjusting particles is 30.0% to 93.0% by mass, the content of the resin is 5.0% to 60.0% by mass, and the content of the polymerizable compound is 1.0% to 60.0% by mass with respect to the total mass of the second layer.

Hereinafter, the components included in the second layer will be described in detail.

Resin

The second layer preferably includes a resin.

The resin that can be used in the second layer has the same definition as the resin that can be included in the above-mentioned first layer, and suitable aspects thereof are also the same.

The resins may be used alone or in combination of two or more kinds thereof.

A lower limit value of the resin content in the second layer is preferably 1.0% by mass or more, and more preferably 5.0% by mass or more with respect to the total mass of the second layer. An upper limit value of the resin content is preferably 60.0% by mass or less, more preferably 45.0% by mass or less, and still more preferably 40.0% by mass or less with respect to the total mass of the second layer.

Refractive Index-Adjusting Particles

The second layer preferably includes the refractive index-adjusting particles.

The refractive index-adjusting particles may be either inorganic particles or organic particles, but are preferably the inorganic particles.

Examples of the inorganic particles include metal oxide particles such as zirconium oxide particles ($ZrO_2$ particles), $Nb_2O_5$ particles, and titanium oxide particles ($TiO_2$ particles), and the zirconium oxide particles ($ZrO_2$ particles) or the titanium oxide particles ($TiO_2$ particles) are preferable from the viewpoint that the refractive index can be easily adjusted to a high level.

In addition, the refractive index-adjusting particles may be subjected to a physical surface treatment such as a plasma discharge treatment and a corona discharge treatment, or a chemical surface treatment with a surfactant, a coupling agent, and the like.

Examples of the zirconium oxide particles include NanoUse OZ-S30M (a methanol dispersion liquid, content of non-volatile components: 30.5% by mass) manufactured by Nissan Chemical Corporation, SZR-CW (an aqueous dispersion liquid, content of non-volatile components: 30% by mass), and SZR-M (a methanol dispersion liquid, content of non-volatile components: 30% by mass) manufactured by Sakai Chemical Industry Co., Ltd.).

Examples of the titanium oxide particles include TS-020 (an aqueous dispersion liquid, content of non-volatile components: 25.6% by mass) manufactured by TAYCA, and TITANIA SOL R (a methanol dispersion liquid, content of non-volatile components: 32.1% by mass) manufactured by Nissan Chemical Corporation.

A refractive index of the refractive index-adjusting particles is preferably 1.60 or more, more preferably 1.6 to 3.5, and still more preferably 1.6 to 2.8.

Here, the refractive index of the particles is intended to be a refractive index at a wavelength of 550 nm at 25° C., and can be measured by a method such as an extinction spectral method, an extrapolation method, a Becke's line method, and an immersion method.

An average primary particle diameter of the refractive index-adjusting particles is preferably 100 nm or less, more preferably 50 nm or less, and still more preferably 20 nm or less from the viewpoint of optical performance such as a haze.

The average primary particle diameter of the refractive index-adjusted particles is a value obtained by measuring the diameters of any 100 particles by observation with a transmission electron microscope (TEM), and arithmetically averaging the diameters of the 100 particles.

The refractive index-adjusting particles may be used singly or in combination of two or more kinds thereof.

A content of the refractive index-adjusting particles in the second layer is not particularly limited, but is preferably 30.0% to 93.0% by mass, more preferably 40.0% to 93.0% by mass, still more preferably 50.0% to 93.0% by mass, and particularly preferably 60.0% to 90.0% by mass with respect to the total mass of the second layer.

Metal Oxidation Inhibitor

In a case where the second layer includes inorganic particles as the refractive index-adjusting particles, it is preferable that the second layer further includes a metal oxidation inhibitor.

The metal oxidation inhibitors may be used singly or in combination of two or more kinds thereof.

A content of the metal oxidation inhibitor in the second layer is preferably 0.01% to 8.0% by mass, more preferably 0.01% to 5.0% by mass, and still more preferably 0.01% to 3.0% by mass with respect to the total mass of the second layer.

Polymerizable Compound

The second layer preferably includes a polymerizable compound.

The polymerizable compound that can be used in the second layer has the same definition as the polymerizable compound that can be included in the above-mentioned first layer, and suitable aspects thereof are also the same.

The polymerizable compounds may be used alone or in combination of two or more kinds thereof.

A content of the polymerizable compound in the second layer is preferably 1.0% to 60.0% by mass, and more preferably 1.0% to 20.0% by mass with respect to the total mass of the second layer.

Polymerization Initiator

The second layer preferably includes a polymerization initiator.

The polymerization initiator that can be used in the second layer has the same definition as the polymerization initiator that can be included in the above-mentioned first layer, and suitable aspects thereof are also the same.

The polymerization initiators may be used alone or in combination of two or more kinds thereof.

In a case where the second layer includes the polymerization initiator, a content of the polymerization initiator is preferably 0.1% to 5.0% by mass, and more preferably 0.1% to 3.0% by mass with respect to the total mass of the second layer.

Other Components

The second layer may include a component other than the above-mentioned components (hereinafter also referred to as "other components"). Examples of such other components include a surfactant. As the surfactant, the same ones as the surfactants that are included in the photosensitive composition layer can be used.

Modified Example of Second Embodiment

In the transfer film 20, the refractive index on a surface 21A of the second layer 21 on the photosensitive composition layer 15 side may be lower than the refractive index on a surface 21B of the second layer 21 on the side opposite to the photosensitive composition layer 15 side. In a laminate obtained by affixing the transfer film 20 from which the protective film 17 has been peeled and a member containing a layer with a high refractive index to each other so that the second layer 21 and the member containing a layer with a high refractive index are in contact with each other to perform exposure and development, the refractive index of the second refractive index-adjusting layer derived from the second layer 21 changes stepwise between the resin layer derived from the photosensitive composition layer 15 and a side of the member containing a layer with a high refractive index, and accordingly, the laminate exhibits a more excellent antireflection function.

In the laminate formed from the transfer film of the second embodiment, it is preferable that the refractive index of the second layer is higher than the refractive index of the resin layer derived from the photosensitive composition layer and is lower than the refractive index of the layer with a high refractive index in the member containing a layer with a high refractive index.

Third Embodiment

Figure 4:
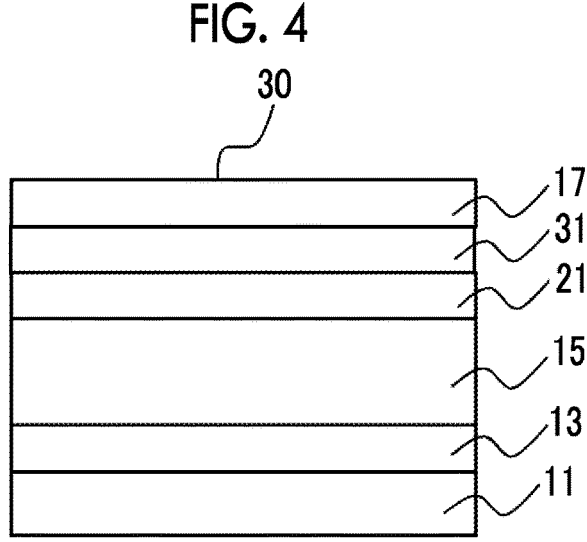
FIG. 4 is a schematic cross-sectional view showing an example of an embodiment of the transfer film of the present invention.

FIG. 4 is a schematic cross-sectional view showing a first embodiment of the transfer film of the embodiment of the present invention.

The transfer film 30 has a temporary support 11, a first layer 13, a photosensitive composition layer 15, a second layer 21, a fourth layer 31, and a protective film 17 in this order. The refractive index of the first layer 13 is 1.45 or less, and is lower than the refractive index of the photosensitive composition layer 15. In addition, the refractive index of the second layer 21 is higher than the refractive index of the photosensitive composition layer 15. In addition, the refractive index of the fourth layer 31 is lower than the refractive index of the photosensitive composition layer 15.

Moreover, the transfer film 30 shown in FIG. 4 has a form in which the protective film 17 is arranged, but the protective film 17 may not be arranged.

In addition, the first layer 13, the second layer 21, the fourth layer 31, and the photosensitive composition layer 15 are preferably transparent layers. The definitions of the terms "transparent" and "transparent layer" are as mentioned above.

After the protective film 17 is peeled, the transfer film 30 is transferred to the member containing a layer with a high refractive index (not shown) so that the surface of the fourth layer 31 exposed by the peeling and the member containing a layer with a high refractive index are in contact with each other. A laminate obtained by performing an exposing treatment after the transfer exhibits an excellent antireflection function due to an interference action of rays incident on the second refractive index-adjusting layer derived from the second layer 21 having a higher refractive index and the fourth refractive index-adjusting layer derived from the fourth layer 31 having a lower refractive index.

In the transfer film 30, the temporary support 11, the first layer 13, the photosensitive composition layer 15, the second layer 21, and the protective film 17 are the same as the temporary support 11, the first layer 13, the photosensitive composition layer 15, the second layer 21, and the protective film 17, respectively, which are included in the transfer film 20 of the second embodiment, and suitable aspects thereof are also the same.

The fourth layer 31 is the same as the above-mentioned first layer described in the first embodiment, and may have the same configuration and physical properties as the first layer.

In addition, a total thickness of the second layer and the fourth layer of the transfer film 40 is preferably 30 to 100 nm, and more preferably 30 to 80 nm.

Modified Example of Third Embodiment

In the transfer film 30, the refractive index on a surface of the first layer 13 on the temporary support 11 side may be set to be lower than the refractive index of a surface of the first layer 13 on the photosensitive composition layer 15 side. In addition, in the transfer film 30, the refractive index on a surface of the second layer 21 on the photosensitive composition layer 15 side may be set to be lower than the refractive index on a surface of the second layer 21 on the side opposite to the photosensitive composition layer 15 side. With these configurations, a laminate obtained by transferring the transfer film 30 to the member containing a layer with a high refractive index exhibits a more excellent antireflection function.

In addition, in the transfer film 30, a third layer having a higher refractive index than the photosensitive composition layer 15 may be further arranged between the first layer 13 and the photosensitive composition layer 15. The third layer has the same definition as the third layer 41 described in the fourth embodiment described later, and suitable aspects thereof are also the same. With the configuration, a laminate obtained by transferring the transfer film 30 to the member containing a layer with a high refractive index exhibits a more excellent antireflection function.

Fourth Embodiment

Figure 5:
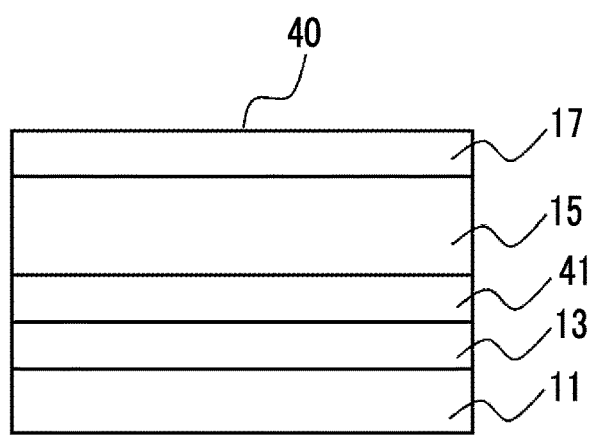
FIG. 5 is a schematic cross-sectional view showing an example of an embodiment of the transfer film of the embodiment of the present invention.

FIG. 5 is a schematic cross-sectional view showing a fourth embodiment of the transfer film of the embodiment of the present invention. The transfer film 40 includes the temporary support 11, the first layer 13, the third layer 41, the photosensitive composition layer 15, and the protective film 17 in this order. The refractive index of the first layer 13 is 1.45 or less, and is lower than the refractive index of the photosensitive composition layer 15. In addition, the refractive index of the third layer 41 is higher than the refractive index of the photosensitive composition layer 15.

Furthermore, the transfer film 40 shown in FIG. 5 has a form in which the protective film 17 is arranged, but the protective film 17 may not be arranged.

After the protective film 17 is peeled, the transfer film 40 is transferred to the member containing a layer with a high refractive index so that a surface of the photosensitive composition layer exposed by the peeling and the member containing a layer with a high refractive index (not shown) are in contact with each other. A laminate obtained by performing an exposing treatment after the transfer exhibits an excellent antireflection function due to an interference action of incidence rays of the third refractive index-adjusting layer derived from the third layer 41 having a higher refractive index and the first refractive index-adjusting layer derived from the first layer 13 having a lower refractive index.

In the transfer film 40, the temporary support 11, the first layer 13, the photosensitive composition layer 15, and the protective film 17 are the same as the temporary support 11, the first layer 13, the photosensitive composition layer 15, and the protective film 17, respectively, which are included in the transfer film 10 of the first embodiment, and suitable aspects thereof are also the same.

The third layer 41 is the same as the second layer described in the third embodiment, and may have the same configuration and physical properties as the second layer.

Modified Example of Fourth Embodiment

In the transfer film 40, the refractive index on a surface of the first layer 13 on the temporary support 11 side may be set to be lower than the refractive index on a surface of the first layer 13 on the photosensitive composition layer 15 side. In addition, the transfer film 40 may further have a fourth layer having a lower refractive index lower than the photosensitive composition layer 15 on a surface of the photosensitive composition layer 15 on the side opposite to the third layer 41. The fourth layer has the same definition as the fourth layer described in the third embodiment, and suitable aspects thereof are also the same. With these configurations, a laminate obtained by transferring the transfer film 40 to the member containing a layer with a high refractive index exhibits a more excellent antireflection function.

Fifth Embodiment

Figure 6:
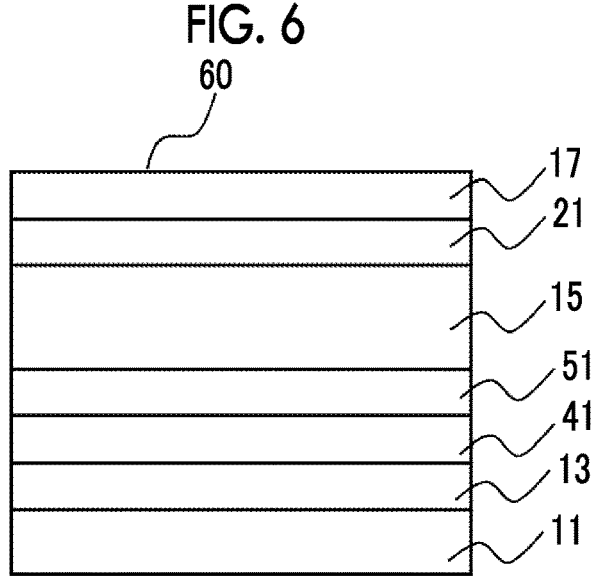
FIG. 6 is a schematic cross-sectional view showing an example of an embodiment of the transfer film of the embodiment of the present invention.

FIG. 6 is a schematic cross-sectional view showing a fifth embodiment of the transfer film of the embodiment of the present invention.

The transfer film 60 has the temporary support 11, the first layer 13, the third layer 41, the fifth layer 51, the photosensitive composition layer 15, the second layer 21, and the protective film 17 in this order. The refractive index of the first layer 13 is 1.45 or less, and is lower than the refractive index of the photosensitive composition layer 15. In addition, the refractive index of the third layer 41 is higher than the refractive index of the photosensitive composition layer 15. Furthermore, the refractive index of the fifth layer 51 is higher than the refractive index of the photosensitive composition layer 15 and is lower than the refractive index of the third layer 41. In addition, the refractive index of the second layer 21 is higher than the refractive index of the photosensitive composition layer 15.

Furthermore, the transfer film 60 shown in FIG. 6 has a form in which the protective film 17 is arranged, but the protective film 17 may not be arranged.

In addition, the first layer 13, the second layer 21, the third layer 41, the fourth layer 31, the fifth layer 51, and the photosensitive composition layer 15 are preferably transparent layers. The definitions of the terms "transparent" and "transparent layer" are as mentioned above.

After the protective film 17 is peeled, the transfer film 60 is transferred to the member containing a layer with a high refractive index so that a surface of the photosensitive composition layer exposed by the peeling and the member containing a layer with a high refractive index (not shown) are in contact with each other. A laminate obtained by performing an exposing treatment after the transfer exhibits an excellent antireflection function due to an interference action of incidence rays of the third refractive index-adjusting layer derived from the third layer 41 having a higher refractive index and the fifth refractive index-adjusting layer derived from the fifth layer 51 having a lower refractive index. In addition, a refractive index difference between the resin layer derived from the photosensitive composition layer 15 and the member containing a layer with a high refractive index (not shown) is alleviated due to the presence of the second refractive index-adjusting layer derived from the second layer 21, and thus, the laminate exhibits an excellent antireflection function.

In the transfer film 60, the temporary support 11, the first layer 13, the photosensitive composition layer 15, and the protective film 17 are the same as the temporary support 11, the first layer 13, the photosensitive composition layer 15, and the protective film 17, respectively, which are included in the transfer film 10 of the first embodiment, and suitable aspects thereof are also the same.

The second layer 21 has the same definition as the second layer described in the third embodiment, and suitable aspects thereof are also the same.

The third layer 41 has the same definition as the third layer described in the fourth embodiment, and suitable aspects thereof are also the same.

Fifth Layer

The fifth layer has a refractive index which is higher than the refractive index of the photosensitive composition layer 15 and is lower than the refractive index of the third layer 41.

The fifth layer has the same configuration as the third layer, except that the refractive index is adjusted to be lower than the refractive index of the third layer, and suitable aspects thereof are also the same. The refractive index of the fifth layer is preferably 1.60 or more, more preferably 1.60 to 1.80, and still more preferably 1.60 or more and less than 1.70.

The difference between the third layer and the fifth layer is preferably 0.02 or more, and more preferably 0.05 or more.

In addition, a total thickness of the third layer and the fifth layer of the transfer film 60 is preferably 70 to 300 nm, and more preferably 100 to 300 nm.

Method for Producing Transfer Film

The method for producing a transfer film of an embodiment of the present invention (hereinafter also referred to as a "method for producing a transfer film") is not particularly limited, and a known method can be used.

For example, as an example of the method for producing the transfer film 10 shown in FIG. 1, for example, a method including a step of applying a composition for forming a first layer onto a surface of the temporary support 11 to form a coating film, and drying the coating film to form a first layer 13; and a step of applying a composition for forming a photosensitive composition layer onto a surface of the first layer 13 to form a coating film, and drying the coating film to form a photosensitive composition layer 15 may be mentioned.

The transfer film 10 shown in FIG. 1 is produced by pressure-bonding the protective film 17 onto the photosensitive composition layer 15 of a laminate produced by the above-mentioned production method.

Furthermore, the transfer film 10 shown in FIG. 1 may also be produced by forming the photosensitive composition layer 15 on the protective film 17, forming the first layer 13 on the photosensitive composition layer 15, and then pressure-bonding the first layer 13 and the temporary support 11.

In addition, for example, as an example of the method for producing the transfer film 30 shown in FIG. 4, for example, a method including a step of applying a composition for forming a first layer onto a surface of a temporary support to form a coating film, and drying the coating film to form a first layer; a step of applying a composition for forming a photosensitive composition layer onto a surface of the first layer to form a coating film, and drying the coating film to form a photosensitive composition layer; a step of applying a composition for forming a second layer onto a surface of the photosensitive composition layer to form a coating film, and drying the coating film to form a second layer; and a step of applying a composition for forming a fourth layer onto a surface of the second layer to form a coating film, and drying the coating film to form a fourth layer may be mentioned. The transfer film 30 shown in FIG. 4 is produced by pressure-bonding a protective film onto the fourth layer of a laminate produced by the above-mentioned production method.

As another example of the method for producing the transfer film 30 shown in FIG. 4, for example, a method including a step of applying a composition for forming a photosensitive composition layer onto a surface of the protective film 17 to form a coating film, and drying the coating film to form a photosensitive composition layer 15; a step of applying a composition for forming a first layer onto a surface of the photosensitive composition layer 15 to form a coating film, and drying the coating film to form a first layer 13; a step of pressure-bonding a temporary support to a surface of the first layer 13; a step of peeling the protective film to expose the photosensitive composition layer 15, applying a composition for forming a second layer onto a surface of the photosensitive composition layer 15 to form a coating film, and drying the coating film to form a second layer 21; and a step of applying a composition for forming a fourth layer onto a surface of the second layer 21 to form a coating film, and drying the coating film to form a fourth layer 31 may be mentioned. The transfer film 30 shown in FIG. 4 is produced by pressure-bonding the protective film 17 onto the fourth layer 31 of a laminate produced by the above-mentioned production method.

In addition, the transfer film may be wound up after the production and stored as a roll-type transfer film. The roll-type transfer film can be provided as it is in the affixing step with the member to be transferred in a roll-to-roll method which will be described later.

Method for Forming First to Fifth Layers

A method for forming the first layer to the fifth layer is not particularly limited, but is preferably formed by a coating method.

A composition (coating liquid) for forming the first layer to the fifth layer preferably includes the above-mentioned various components that form the first layer to the fifth layer and a solvent. Furthermore, in the first layer to the fifth layer, a suitable range of the content of each component with respect to the total solid content of the composition is the same as the suitable range of the content of each component with respect to the total mass of the first layer to the fifth layer described above.

The solvent is not particularly limited as long as each component other than the solvent can be dissolved or dispersed, and a known solvent can be used. Examples of the solvent include water, methanol, 1-methoxy-2-propyl acetate, methyl ethyl ketone, diacetone alcohol, ethylene glycol, propylene glycol, and isobutyl alcohol.

The solvents may be used singly or in combination of two or more kinds thereof.

A content of the solvent is preferably 50 to 2,500 parts by mass, more preferably 50 to 1,900 parts by mass, and still more preferably 50 to 600 parts by mass with respect to 100 parts by mass of the total solid content of the composition.

The method for forming the first layer to the fifth layer is not particularly limited as long as it is a method capable of forming a layer including the components, and examples thereof include known coating methods (slit coating, spin coating, curtain coating, ink jet coating, and the like).

Composition for Forming Photosensitive Composition Layer and Method for Forming Photosensitive Composition Layer The method for forming a photosensitive composition layer is not particularly limited, and the photosensitive composition layer is preferably formed by a coating method.

The composition for forming a photosensitive composition layer preferably includes the above-mentioned various components and solvent for forming a photosensitive composition layer. Furthermore, in the composition for forming a photosensitive composition layer, a suitable range of the content of each component with respect to the total solid content of the composition is the same as the suitable range of the content of each component with respect to the total mass of the photosensitive composition layer.

The solvent is not particularly limited as long as each component other than the solvent can be dissolved or dispersed, and a known solvent can be used. Specific examples of the solvent include an alkylene glycol ether solvent, an alkylene glycol ether acetate solvent, an alcohol solvent (methanol, ethanol, and the like), a ketone solvent (acetone, methyl ethyl ketone, and the like), an aromatic hydrocarbon solvent (toluene and the like), an aprotic polar solvent (N,N-dimethylformamide and the like), a cyclic ether solvent (tetrahydrofuran and the like), an ester solvent (n-propyl acetate and the like), an amide solvent, a lactone solvent, and a mixed solvent including two or more of these solvents.

The solvent preferably includes at least one selected from the group consisting of the alkylene glycol ether solvent and the alkylene glycol ether acetate solvent. Among those, a mixed solvent including at least one selected from the group consisting of the alkylene glycol ether solvent and the alkylene glycol ether acetate solvent and at least one selected from the group consisting of the ketone solvent and the cyclic ether solvent is more preferable, and a mixed solvent including three of at least one selected from the group consisting of the alkylene glycol ether solvent and the alkylene glycol ether acetate solvent, the ketone solvent, and the cyclic ether solvent is still more preferable.

Examples of the alkylene glycol ether solvent include ethylene glycol monoalkyl ether, ethylene glycol dialkyl ether, propylene glycol monoalkyl ether (propylene glycol monomethyl ether acetate and the like), propylene glycol dialkyl ether, diethylene glycol dialkyl ether, dipropylene glycol monoalkyl ether, and dipropylene glycol dialkyl ether.

Examples of the alkylene glycol ether acetate solvent include ethylene glycol monoalkyl ether acetate, propylene glycol monoalkyl ether acetate, diethylene glycol monoalkyl ether acetate, and dipropylene glycol monoalkyl ether acetate.

As the solvent, the solvent described in paragraphs [0092] to [0094] of WO2018/179640A and the solvent described in paragraph [0014] of JP2018-177889A, the contents of which are incorporated herein by reference, may be used.

The solvents may be used singly or in combination of two or more kinds thereof.

A content of the solvent is preferably 50 to 1,900 parts by mass, more preferably 100 to 1,200 parts by mass, and still more preferably 100 to 900 parts by mass with respect to 100 parts by mass of the total solid content of the composition Examples of the method for applying the composition for forming a photosensitive composition layer include a printing method, a spray coating method, a roll coating method, a bar coating method, a curtain coating method, a spin coating method, and a die coating method (that is, a slit coating method).

As a method for drying the coating film of the composition for forming a photosensitive composition layer, heat drying and drying under reduced pressure are preferable.

Further, a transfer film can be produced by affixing the protective film to the photosensitive composition layer.

A method for affixing the protective film to the photosensitive composition layer is not particularly limited, and examples thereof include known methods.

Examples of a device for affixing the protective film to the photosensitive composition layer include known laminators such as a vacuum laminator and an auto-cut laminator.

It is preferable that the laminator comprises any heatable roller such as a rubber roller, and can perform pressing and heating.

Use of Transfer Film

The transfer film of the embodiment of the present invention is applied to a member containing a layer with a high refractive index.

Hereinafter, the member containing a layer with a high refractive index will be described.

The member containing a layer with a high refractive index is intended to be a member to be transferred having a layer exhibiting a relatively high refractive index (layer with a high refractive index) on a surface to be transferred. Incidentally, the layer with a high refractive index typically has a higher refractive index than the refractive index of the photosensitive composition layer.

Examples of the member containing a layer with a high refractive index include a laminate having a substrate and a layer with a high refractive index arranged on a surface of the substrate. In addition, the member containing a layer with a high refractive index may be composed of only the layer with a high refractive index.

A refractive index of the layer with a high refractive index is preferably 1.55 or more, more preferably 1.60 or more, and still more preferably 1.67 or more. Furthermore, the upper limit is not particularly limited, and is, for example, preferably 2.3 or less, and more preferably 2.0 or less.

Examples of the layer with a high refractive index include a layer including refractive index-adjusting particles such as zirconium oxide and titanium oxide. In addition, for example, a transparent conductive layer arranged on a substrate also typically corresponds to the layer with a high refractive index.

As a suitable aspect of the member containing a layer with a high refractive index, a laminate having a substrate and a transparent conductive layer arranged on a surface of the substrate may be mentioned.

A thickness of the layer with a high refractive index is not particularly limited. An average thickness of the layer with a high refractive index is preferably 0.001 to 1,000 µm, more preferably 0.005 to 15 µm, still more preferably 0.01 to 10 µm, and even still more preferably 0.01 to 0.4 µm. The average thickness of the layer with a high refractive index is measured by a method according to the method for measuring the average thickness of the substrate.

Furthermore, in a case where the layer with a high refractive index is a transparent conductive layer and the average thickness is within the numerical range, it is easy to achieve both conductivity and film-forming properties.

In a case where the layer with a high refractive index is a transparent electrode layer, examples of a material for the transparent conductive layer include metal oxides and metal nanowires. Examples of the metal oxide include a metal oxide including at least one metal selected from the group consisting of In, Sn, Zn, Ga, Sb, Ti, Si, Zr, Mg, Al, Au, Ag, Cu, Pd, and W, and indium-containing oxides such as an indium tin composite oxide (ITO), a tin oxide including antimony, or the like is preferable.

The metal oxide may be further doped with a metal atom shown in the group, as necessary.

In addition, the transparent conductive layer may be a conductive pattern composed of a metal oxide or a metal. Examples of the shape of the conductive pattern include a stripe shape, a square shape, and a grid shape.

The surface electrical resistance of the transparent conductive layer is, for example, 150Ω/□ or less, for example, 1Ω/□ or more.

Substrate

The substrate is preferably transparent.

Examples of a material for the substrate include a resin material and an inorganic material.

Examples of the resin material include polyesters (for example, polyethylene terephthalate and polyethylene naphthalate), polyether ether ketone, acrylic resins, cycloolefin polymers, and polycarbonates.

Examples of the inorganic materials include glass and quartz.

The substrate is preferably a resin film, and is also preferably a polyethylene terephthalate film, a polyethylene naphthalate film, or a cycloolefin polymer film.

A thickness of the substrate is not particularly limited. An average thickness of the substrate is preferably 10 to 100 µm, and more preferably 10 to 60 µm from the viewpoints of transportability, electrical characteristics, and film-forming properties. The average thickness of the transparent substrate is an average value of the thicknesses at 10 points measured by observing a cross-section of the transparent substrate in a direction perpendicular to the in-plane direction using a scanning electron microscope (SEM).

In addition, in a suitable aspect of the member containing a layer with a high refractive index, it is also preferable to further have a sixth refractive index-adjusting layer between the substrate and the layer with a high refractive index. The sixth refractive index-adjusting layer is a layer for adjusting the refractive index, and is preferably a transparent layer. The definitions of the terms "transparent" and "transparent layer" are as mentioned above.

Sixth Refractive Index-Adjusting Layer

The sixth refractive index-adjusting layer is a layer arranged between the substrate and the layer with a high refractive index in the member containing a layer with a high refractive index, and is a layer having a higher refractive index than the substrate.

A refractive index of the sixth refractive index-adjusting layer is preferably 1.55 or more and less than 1.90, more preferably 1.60 to 1.70, and still more preferably 1.60 to 1.65.

A thickness of the sixth refractive index-adjusting layer is preferably 200 nm or less, more preferably 40 to 200 nm, and still more preferably 50 to 100 nm.

The sixth refractive index-adjusting layer preferably has a refractive index of 1.60 to 1.70 and a thickness of 50 to 100 nm.

The sixth refractive index-adjusting layer is preferably a layer in which the refractive index-adjusting particles are introduced into the above-mentioned photosensitive composition layer. As the refractive index-adjusting particles, the same ones as those introduced into the above-mentioned second layer can be used, and among those, the zirconium oxide particles ($ZrO_2$ particles) or the titanium oxide particles ($TiO_2$ particles) are preferable from the viewpoint that it is easy to adjust the refractive index to a high level, and the zirconium oxide particles ($ZrO_2$ particles) are more preferable. In addition, the refractive index-adjusting particles may be subjected to a physical surface treatment such as a plasma discharge treatment and a corona discharge treatment, or a chemical surface treatment with a surfactant, a coupling agent, and the like.

As the zirconium oxide particles ($ZrO_2$ particles), for example, ZR-010 (methyl ethyl ketone dispersion liquid, non-volatile fraction: 30% by mass) manufactured by Solar Co., Ltd. can be used.

In addition, examples of the member containing a layer with a high refractive index include a member for constituting one conductive surface of a capacitance-type ultrasonic emitter in the capacitance-type ultrasonic emitter mounted on an acoustic speaker such as a parametric speaker. The transfer film of the embodiment of the present invention is also preferably applied as a protective film that protects the conductive surface.

In addition, examples of the member containing a layer with a high refractive index include a transparent piezoelectric element used for a piezoelectric speaker (for example, a fluorine-based organic piezoelectric element typified by polyvinylidene fluoride). The transfer film of the embodiment of the present invention is also preferably applied as a protective film for electrodes that sandwich a piezoelectric element.

Furthermore, the member containing a layer with a high refractive index may be, for example, a display device comprising an image display surface (for example, a display device such as an organic electroluminescence display device and a liquid crystal display device).

Method for Producing Laminate

The photosensitive composition layer can be transferred to an object to be transferred by using the above-mentioned transfer film. Furthermore, in the following description, a layer excluding the protective film formed on the temporary support of the transfer film may be referred to as a "composition layer".

A method for producing a laminate of an embodiment of the present invention is preferably a method for producing a laminate, including:

an affixing step of affixing a surface of a transfer film on a side opposite to a temporary support, and a member to be transferred to each other to obtain a member with a composition layer having the member to be transferred, the composition layer, and the temporary support in this order, an exposing step of exposing a composition layer including a photosensitive composition layer, and a peeling step of peeling the temporary support from the member with the composition layer between the affixing step and the exposing step, or after the exposing step.

In addition, in a case where the exposing step for exposing the composition layer is an exposing step of pattern-exposing the composition layer, it is also preferable that the method for producing a laminate has a developing step after the exposing step. Incidentally, in this case, it is preferable that the above-mentioned peeling step is carried out between the affixing step and the exposing step, or after the exposing step and before the developing step.

The transfer film of the embodiment of the present invention is preferably applied to a member containing a layer with a high refractive index, but may be applied to other members to be transferred.

Among those, the method for producing a laminate of the embodiment of the present invention is preferably a method for producing a laminate, including:

an affixing step of affixing a surface of a transfer film on a side opposite to a temporary support and a member containing a layer with a high refractive index to each other to obtain a member with a composition layer, which has the member containing a layer with a high refractive index, the composition layer, and the temporary support in this order, an exposing step of exposing a composition layer including a photosensitive composition layer, and a peeling step of peeling the temporary support from the member with the composition layer between the affixing step and the exposing step, or after the exposing step.

In addition, in a case where the exposing step for exposing the composition layer is an exposing step of pattern-exposing the composition layer, it is also preferable that the method for producing a laminate has a developing step after the exposing step. Incidentally, in this case, it is preferable that the above-mentioned peeling step is carried out between the affixing step and the exposing step, or after the exposing step and before the developing step.

Hereinafter, the procedure of the steps will be specifically described.

Affixing Step

The affixing step is a step of affixing a transfer film and a member to be transferred so that a surface of the transfer film on the side opposite to a temporary support (in other words, a surface of the composition layer) and the member to be transferred are in contact with each other to obtain a member with the composition layer, which has the member to be transferred, the composition layer, and the temporary support in this order. Incidentally, in a case where the transfer film has a protective film, the affixing step is carried out after the protective film is peeled.

In the affixing, the member to be transferred and the surface of the composition layer are pressure-bonded so that the both are in contact with each other.

The pressure-bonding method is not particularly limited, and known transfer methods and laminating methods can be used. Among those, it is preferable that a surface of the composition layer is superposed on the member to be transferred, and pressurization by a roll or the like, and heating are performed.

A known laminator such as a vacuum laminator and an auto-cut laminator can be used for the affixing.

The laminating temperature is not particularly limited, but is preferably, for example, 70° C. to 130° C.

The member to be transferred is not particularly limited, but is preferably a member containing a layer with a high refractive index, and preferably has a substrate and a transparent conductive layer (a layer with a high refractive index) arranged on the substrate.

The transfer film and the member containing a layer with a high refractive index are as mentioned above.

In a case where the member to be transferred is a member containing a layer with a high refractive index, in the affixing step, a surface of the member containing a layer with a high refractive index on the side of the layer with a high refractive index and the composition layer of the transfer film are pressure-bonded so that the both are in contact with each other.

Exposing Step

The exposing step is a step of exposing the composition layer including a photosensitive composition layer.

The exposure may be performed from the side opposite to the member to be transferred of the composition layer, or may be exposed from the side of the member to be transferred of the composition layer.

As a light source of the exposure, a light source can be appropriately selected, as long as it can emit light at a wavelength region (for example, 365 nm or 405 nm) at which at least the photosensitive composition layer can be cured. Among those, a main wavelength of the exposure light for the exposure is preferably 365 nm. Incidentally, the main wavelength is a wavelength having the highest intensity.

Examples of the light source include various lasers, a light emitting diode (LED), an ultra-high pressure mercury lamp, a high pressure mercury lamp, and a metal halide lamp.

The exposure amount is preferably 5 to 200 mJ/cm$^2$ and more preferably 10 to 200 mJ/cm$^2$.

Suitable aspects of the light source, the exposure amount, and the exposing method used for the exposure are described in, for example, paragraphs [0146] and [0147] of WO2018/155193A, the contents of which are incorporated herein by reference.

The exposing step is preferably a pattern exposure.

Here, the "pattern exposure" refers to exposure in a form of performing the exposure patternwise, that is, the embodiment in which an exposed portion and an unexposed portion are present.

The positional relationship between the exposed portion and the unexposed portion in the pattern exposure is not particularly limited and is appropriately adjusted.

A resin film is formed on the member to be transferred by performing the exposing step, or by performing a developing step which will be described later in a case where the pattern exposure is performed. The resin film can also function as a protective film for the member to be transferred. Furthermore, in a case where the pattern exposure is performed and the developing step which will be described later is then performed, a resin pattern is formed.

Peeling Step

The peeling step is a step of peeling the temporary support from the member with the composition layer between the affixing step and the exposing step, or after the exposing step. Furthermore, in a case where the developing step is carried out after the exposing step, the peeling step may be carried out after the exposing step and before the developing step.

The peeling method is not particularly limited, and the same mechanism as the cover film peeling mechanism described in paragraphs [0161] and [0162] of JP2010-072589A can be used.

Developing Step

The developing step is a step of developing the exposed composition layer to form a pattern.

The development of the composition layer can be performed using a developer.

An alkaline aqueous solution is preferable as the developer. Examples of an alkaline compound which can be included in the alkaline aqueous solution include sodium hydroxide, potassium hydroxide, sodium carbonate, potassium carbonate, sodium hydrogen carbonate, potassium hydrogen carbonate, tetramethyl ammonium hydroxide, tetraethyl ammonium hydroxide, tetrapropyl ammonium hydroxide, tetrabutylammonium hydroxide, and choline (2-hydroxyethyltrimethyl ammonium hydroxide).

Examples of the developing method include methods such as puddle development, shower development, spin development, and dip development.

Examples of the developer that is suitably used in the present specification include the developer described in paragraph [0194] of WO2015/093271A, and examples of the developing method that is suitably used include the developing method described in paragraph [0195] of WO2015/093271A.

Post-Exposing Step and Post-Baking Step

The method for producing a laminate may have a step of exposing the pattern obtained by the developing step (post-exposing step) and/or a step of heating (post-baking step).

In a case where both of the post-exposing step and the post-baking step are included, it is preferable that the post-baking is carried out after the post-exposure.

An exposure amount for the post-exposure is preferably 100 to 5,000 mJ/cm$^2$, and more preferably 200 to 3,000 mJ/cm$^2$.

The post-baking temperature is preferably 80° C. to 250° C., and more preferably 90° C. to 160° C.

The post-baking time is preferably 1 to 180 minutes, and more preferably 10 to 60 minutes.

Use of Laminate

As an example of the use of the laminate produced by the method for producing a laminate of the embodiment of the present invention, an ultrasonic emitter (particularly a capacitance-type ultrasonic emitter) and the like may be mentioned. The capacitance-type ultrasonic emitter is usually a device composed of two conductive surfaces including voids, and the laminate of the embodiment of the present invention is preferably applied as a protective film for a conductive surface in a member for composing one conductive surface of the device. The ultrasonic emitter is mounted on, for example, an acoustic speaker such as a parametric speaker, or a mid-air haptics.

In addition, as another example of the use of the laminate produced by the method for producing a laminate of the embodiment of the present invention, an electrode protective film of a transparent piezoelectric element such as polyvinylidene fluoride used for a piezoelectric speaker may be mentioned.

Laminate

The laminate of an embodiment of the present invention has:
   a substrate, a layer with a high refractive index, a resin layer, and a first refractive index-adjusting layer in this order,
   in which a refractive index of the layer with a high refractive index is higher than the refractive index of the resin layer,
   a refractive index of the first refractive index-adjusting layer is lower than the refractive index of the resin layer, and
   the refractive index of the first refractive index-adjusting layer is 1.45 or less.

The laminate of the embodiment of the present invention is a laminate formed by transferring the above-mentioned transfer film of the embodiment of the present invention to a member to be transferred having a substrate and a layer with a high refractive index arranged on the substrate, the layer with a high refractive index being provided on the side of a surface to be transferred, and performing an exposing treatment.

Hereinafter, the configuration of the laminate of the embodiment of the present invention will be described.

First Embodiment

A laminate of the first embodiment has a substrate, a layer with a high refractive index, a resin layer, and a first refractive index-adjusting layer in this order. A refractive index of the first refractive index-adjusting layer is 1.45 or less, and is lower than the refractive index of the resin layer. Furthermore, the refractive index of the layer with a high refractive index is higher than the refractive index of the resin layer.

The laminate of the first embodiment corresponds to a laminate obtained by transferring the above-mentioned transfer film 10 of the first embodiment to a member containing a layer with a high refractive index.

In addition, the first refractive index-adjusting layer and the resin layer are preferably transparent layers. The definitions of the terms "transparent" and "transparent layer" are as mentioned above.

In the laminate of the first embodiment, the resin layer corresponds to a layer obtained by curing the photosensitive composition layer.

A refractive index of the resin layer is preferably more than 1.45, more preferably 1.47 to 1.56, and still more preferably 1.49 to 1.54.

In addition, a thickness of the resin layer is not particularly limited, but is often 30 μm or less, preferably 20 μm or less, more preferably 15 μm or less, still more preferably 10 μm or less, and particularly preferably 5.0 μm or less. The lower limit is preferably 0.60 μm or more, and more preferably 1.5 μm or more. The thickness of the resin layer can be calculated, for example, as an average value at any 5 random points measured by cross-section observation with a scanning electron microscope (SEM).

In the laminate of the first embodiment, the first refractive index-adjusting layer is a layer derived from the first layer.

As described above, the first layer is preferably a curable composition layer, and accordingly, the first refractive index-adjusting layer is preferably a layer obtained by curing the first layer.

The refractive index of the first refractive index-adjusting layer is 1.45 or less, preferably 1.10 to 1.45, and more preferably 1.20 to 1.40.

In addition, the upper limit value of the thickness of the first refractive index-adjusting layer is preferably 300 nm or less, more preferably 200 nm or less, and still more preferably 120 nm or less. The lower limit value is preferably 10 nm or more, more preferably 30 nm or more, and still more preferably 50 nm or more.

In addition, the first refractive index-adjusting layer preferably includes the refractive index-adjusting particles. The refractive index-adjusting particles are preferably 40.0% to 95.0% by mass, more preferably 55.0% to 95.0% by mass, and still more preferably 60.0% to 95.0% by mass with respect to the total mass of the first refractive index-adjusting layer. Furthermore, as the refractive index-adjusting particles, the same particles as those mentioned as the refractive index-adjusting particles include in the first layer can be used, and suitable aspects thereof are also the same.

In the laminate of the first embodiment, as the member containing a layer with a high refractive index, the same one as the member containing a layer with a high refractive index described in the uses of the transfer film can be used.

Modified Example of First Embodiment

In the laminate of the first embodiment, the refractive index on a surface of the first refractive index-adjusting layer opposite to the resin layer side may be set to be lower than the refractive index on a surface of the first refractive index-adjusting layer on the resin layer side.

Second Embodiment

The laminate of the second embodiment has a substrate, a layer with a high refractive index, a second refractive index-adjusting layer, a resin layer, and a first refractive index-adjusting layer in this order. A refractive index of the first refractive index-adjusting layer is 1.45 or less, and is lower than the refractive index of the resin layer. In addition, the refractive index of the second refractive index-adjusting layer is higher than the refractive index of the resin layer.

The laminate of the second embodiment corresponds to a laminate obtained by transferring the above-mentioned transfer film 20 of the second embodiment to a member containing a layer with a high refractive index.

In addition, the first refractive index-adjusting layer, the second refractive index-adjusting layer, and the resin layer are preferably transparent layers. The definitions of the terms "transparent" and "transparent layer" are as mentioned above.

In the laminate of the second embodiment, the first refractive index-adjusting layer, the resin layer, the substrate, and the layer with a high refractive index are the same as the first refractive index-adjusting layer, the resin layer, the substrate, and the layer with a high refractive index, respectively, which are included in the laminate of the first embodiment, and suitable aspects thereof are also the same.

Second Refractive Index-Adjusting Layer

In the laminate of the second embodiment, the second refractive index-adjusting layer is a layer arranged on a surface of the resin layer opposite to the first refractive index-adjusting layer, and has a higher refractive index than the refractive index of the resin layer.

A refractive index of the second refractive index-adjusting layer is preferably 1.60 or more, more preferably 1.60 to 1.90, and still more preferably 1.65 to 1.80.

Furthermore, the upper limit value of the thickness of the second refractive index-adjusting layer is preferably 200 nm or less, more preferably 150 nm or less, and still more preferably 100 nm or less. The lower limit value is preferably 20 nm or more, more preferably 30 nm or more, and still more preferably 50 nm or more.

In addition, the second refractive index-adjusting layer preferably includes refractive index-adjusting particles. The content of the refractive index-adjusting particles is preferably 40.0% to 95.0% by mass, more preferably 50.0% to 95.0% by mass, and still more preferably 60.0% to 90.0% by mass with respect to the total mass of the second refractive index-adjusting layer. Incidentally, as the refractive index-adjusting particles, the same ones as the particles mentioned as the refractive index-adjusting particles included in the second layer can be used, and suitable aspects thereof are also the same.

Modified Example of Second Embodiment

In the laminate of the second embodiment, the refractive index on a surface of the second refractive index-adjusting layer on the resin layer side may be set to be lower than the refractive index on a surface of the second refractive index-adjusting layer on the side opposite to the resin layer side.

Third Embodiment

The laminate of the third embodiment has a first refractive index-adjusting layer, a resin layer, a second refractive index-adjusting layer, a fourth refractive index-adjusting layer, a layer with a high refractive index, and a substrate in this order. A refractive index of the first refractive index-adjusting layer is 1.45 or less, and is lower than the refractive index of the resin layer. In addition, the refractive index of the second refractive index-adjusting layer is higher than the refractive index of the resin layer. In addition, the refractive index of the fourth refractive index-adjusting layer is lower than the refractive index of the resin layer.

The laminate of the third embodiment corresponds to a laminate obtained by transferring the above-mentioned transfer film 30 of the third embodiment to a member containing a layer with a high refractive index.

In addition, the first refractive index-adjusting layer, the second refractive index-adjusting layer, the fourth refractive index-adjusting layer, and the resin layer are preferably transparent layers. The definitions of the terms "transparent" and "transparent layer" are as mentioned above.

In the laminate of the third embodiment, the resin layer corresponds to a layer obtained by curing the photosensitive composition layer.

In the laminate of the third embodiment, the first refractive index-adjusting layer, the resin layer, the second refractive index-adjusting layer, the layer with a high refractive index, and the substrate are the same as the first refractive index-adjusting layer, the resin layer, the second refractive index-adjusting layer, the layer with a high refractive index, and the substrate, respectively, which are included in the laminate of the second embodiment, and suitable aspects thereof are also the same.

The fourth refractive index-adjusting layer is the same as the above-mentioned first refractive index-adjusting layer described in the first embodiment, and may have the same configuration and physical properties as the first refractive index-adjusting layer.

In addition, in the laminate of the third embodiment, a total thickness of the second refractive index-adjusting layer and the fourth refractive index-adjusting layer is preferably 30 to 100 nm, and more preferably 30 to 80 nm.

Modified Example of Third Embodiment

In the laminate of the third embodiment, the refractive index on a surface of the first refractive index-adjusting layer on the side opposite to the resin layer side may be set to be lower than the refractive index on a surface of the first refractive index-adjusting layer on the resin layer side. In addition, the laminate of the third embodiment, the refractive index on a surface of the second refractive index-adjusting layer on the resin layer side may be set to be lower than the refractive index on a surface of the second refractive index-adjusting layer on the side opposite to the resin layer side.

Moreover, in the laminate of the third embodiment, a third refractive index-adjusting layer having a higher refractive index than the resin layer may be further arranged between the first refractive index-adjusting layer and the resin layer.

The third refractive index-adjusting layer has the same definition as the third refractive index-adjusting layer described in the fourth embodiment described later, and suitable aspects thereof are also the same.

Fourth Embodiment

The laminate of the fourth embodiment has a first refractive index-adjusting layer, a third refractive index-adjusting layer, a resin layer, a layer with a high refractive index, and a substrate in this order. A refractive index of the first refractive index-adjusting layer is 1.45 or less, and is lower than the refractive index of the resin layer. Furthermore, the refractive index of the third refractive index-adjusting layer is higher than the refractive index of the resin layer.

The laminate of the fourth embodiment corresponds to the laminate obtained by transferring the above-mentioned transfer film 40 of the fourth embodiment to the member containing a layer with a high refractive index.

In addition, the first refractive index-adjusting layer, the third refractive index-adjusting layer, and the resin layer are preferably transparent layers. The definitions of the terms "transparent" and "transparent layer" are as mentioned above.

In the laminate of the fourth embodiment, the first refractive index-adjusting layer, the resin layer, the layer with a high refractive index, and the substrate are the same as the first refractive index-adjusting layer, the resin layer, the layer with a high refractive index, and the substrate, respectively, which are included in the laminate of the first embodiment, and suitable aspects thereof are also the same.

The third refractive index-adjusting layer is the same as the second refractive index-adjusting layer described in the third embodiment, and may have the same configuration and physical properties as the second refractive index-adjusting layer.

Modified Example of Fourth Embodiment

In the laminate of the fourth embodiment, the refractive index on a surface of the first refractive index-adjusting layer on the side opposite to the resin layer side may be set to be lower than the refractive index on a surface of the first refractive index-adjusting layer on the resin layer side.

Moreover, in the laminate of the fourth embodiment, the fourth refractive index-adjusting layer having a lower refractive index than the resin layer may be further arranged on a surface of the resin layer opposite to the third refractive index-adjusting layer. The fourth refractive index-adjusting layer has the same definition as the fourth refractive index-adjusting layer described in the third embodiment, and suitable aspects thereof are also the same.

Fifth Embodiment

The laminate of the fifth embodiment includes a first refractive index-adjusting layer, a third refractive index-adjusting layer, a fifth refractive index-adjusting layer, a resin layer, a second refractive index-adjusting layer, a layer with a high refractive index, and a substrate in this order. A refractive index of the first refractive index-adjusting layer is 1.45 or less, and is lower than the refractive index of the resin layer. Furthermore, the refractive index of the third refractive index-adjusting layer is higher than the refractive index of the resin layer. Moreover, the refractive index of the fifth refractive index-adjusting layer is higher than the refractive index of the resin layer and is lower than the refractive index of the third refractive index-adjusting layer. In addition, the refractive index of the second refractive index-adjusting layer is higher than the refractive index of the resin layer.

The laminate of the fifth embodiment corresponds to the laminate obtained by transferring the above-mentioned transfer film 60 of the fifth embodiment to the member containing a layer with a high refractive index.

In addition, the first refractive index-adjusting layer, the second refractive index-adjusting layer, the third refractive index-adjusting layer, the fifth refractive index-adjusting layer, and the resin layer are preferably transparent layers. The definitions of the terms "transparent" and "transparent layer" are as mentioned above.

In the laminate of the fifth embodiment, the first refractive index-adjusting layer, the resin layer, the layer with a high refractive index, and the substrate are the same as the first refractive index-adjusting layer, the resin layer, the layer with a high refractive index, and the substrate, respectively, which are included in the laminate of the first embodiment, and suitable aspects thereof are also the same.

The second refractive index-adjusting layer has the same definition as the second refractive index-adjusting layer described in the third embodiment, and suitable aspects thereof are also the same.

The third refractive index-adjusting layer has the same definition as the third refractive index-adjusting layer described in the fourth embodiment, and suitable aspects thereof are also the same.

Fifth Layer

The fifth refractive index-adjusting layer has a refractive index which is higher than the refractive index of the resin layer and is lower than the refractive index of the third refractive index-adjusting layer.

The fifth refractive index-adjusting layer has the same configuration as the third refractive index-adjusting layer, except that the refractive index is adjusted to be lower than the refractive index of the third refractive index-adjusting layer, and suitable aspects thereof are also the same. The refractive index of the fifth refractive index-adjusting layer is preferably 1.60 or more, more preferably 1.60 to 1.80, and even more preferably 1.60 or more and less than 1.70.

The difference between the third refractive index-adjusting layer and the fifth refractive index-adjusting layer is preferably 0.01 or more, and more preferably 0.05 or more.

In addition, in the laminate of the fifth embodiment, a total thickness of the third refractive index-adjusting layer and the fifth refractive index-adjusting layer is preferably 70 to 300 nm, and more preferably 100 to 300 nm.

EXAMPLES

Hereinafter, the present invention will be described in more detail with reference to Examples. In the following examples, materials, amounts thereof used, ratios thereof, the details of treatments, treatment procedures, and the like can be suitably modified without departing from the scope of the present invention. Therefore, the scope of the present invention should not be restrictively interpreted by the following Examples.

In the following, the compositional ratio of a polymer is intended to be a molar ratio unless otherwise specified.

Further, the notations "part" and "%" are intended to mean "parts by mass" and "by mass", respectively, unless otherwise specified.

In addition, in the following, the weight-average molecular weight of the resin is intended to be a value measured by gel permeation chromatography (GPC) under the following conditions.

The calibration curve was prepared using 8 samples of "F-40", "F-20", "F-4", "F-1", "A-5000", "A-2500", "A-1000", and "n-propylbenzene" which are "Standard Samples TSK standard, polystyrene" (manufactured by TOSOH Corporation).

Conditions
GPC: HLC (registered trademark)-8020GPC (manufactured by Tosoh Corporation)
Column: Three columns of TSKgel (registered trademark), Super Multipore HZ-H (Tosoh Corporation, 4.6 mm ID×15 cm)
Eluent: Tetrahydrofuran (THF)
Sample concentration: 0.45% by mass
Flow rate: 0.35 ml/min
Sample injection amount: 10 µl
Measurement temperature: 40° C.
Detector: Differential refractometer (RI)
Preparation of Coating Liquid for Forming Each Layer
Preparation of Coating Liquid for Forming Photosensitive Composition Layer Based on the components and formulations shown in Table 1 below, coating liquids (A-1 to A-9) for forming a photosensitive composition layer were prepared.

TABLE 1

| | | Coating liquid for forming photosensitive composition layer (blending amount: parts by mass) | | | | | | | | |
|---|---|---|---|---|---|---|---|---|---|---|
| | Each component | A-1 | A-2 | A-3 | A-4 | A-5 | A-6 | A-7 | A-8 | A-9 |
| Polymerizable compound | Tricyclodecane dimethanol diacrylate (A-DCP, manufactured by Shin-Nakamura Chemical Co., Ltd.) | — | — | — | — | — | — | — | — | 5.60 |
| | Monomer having carboxyl group (ARONIX TO-2349, manufactured by Toagosei Co., Ltd.) | 0.92 | 0.82 | 1.09 | 0.92 | 0.88 | 0.45 | 2.28 | 2.28 | 0.93 |
| | Urethane acrylate (8UX-015A, manufactured by Taisei Fine Chemical Co., Ltd.) | — | — | — | — | — | 0.74 | 0.76 | 0.76 | 2.80 |
| | A-NOD-N (manufactured by Shin-Nakamura Chemical Co., Ltd.) | 3.30 | 2.94 | 3.90 | 2.50 | 2.45 | 0.68 | 0.70 | 0.70 | — |
| | A-DPH (manufactured by Shin-Nakamura Chemical Co., Ltd.) | 3.03 | 2.70 | 3.59 | 3.03 | 2.29 | 2.00 | 4.32 | 4.32 | — |
| | KAYARAD R-604 (manufactured by Nippon Kayaku Co., Ltd.) | 3.30 | 2.94 | 3.90 | 3.30 | 2.44 | — | — | — | — |
| Aliphatic thiol compound | MTNR1 (manufactured by Showa Denko K. K.) | — | — | — | 0.80 | — | — | — | — | — |
| Alkali-soluble resin | P-1 solution (solid content: 36.3% by mass, acid value of 95 mgKOH/g, Mw: 27,000, Mn: 15,000) | 48.48 | 51.79 | 43.00 | 48.48 | — | — | — | — | 42.86 |
| | P-2 solution (solid content: 36.5% by mass, acid value of 95 mgKOH/g, Mw: 17,000, Mn: 62,000) | — | — | — | — | — | 36.28 | — | — | — |
| | P-3 solution (solid content: 36.2% by mass, acid value of 124 mgKOH/g, Mw: 18,000, Mn: 7,800) | — | — | — | — | 34.17 | — | 33.77 | 33.77 | — |
| | P-4 solution (solid content: 36.2% by mass, acid value of 124 mgKOH/g, Mw: 18,000, Mn: 7,800) | — | — | — | — | — | — | — | — | 0.11 |
| Photopolymerization initiator | 1-[9-Ethyl-6-(2-methylbenzoyl)-9H-carbazol-3-yl]ethanone-1-(O-acetyloxime) (OXE-02, manufactured by BASF) | — | — | — | — | — | 0.09 | 0.09 | 0.09 | — |
| | 2-Methyl-1-(4-methylthiophenyl)-2-morpholinopropan-1-one (Irgacure 907, manufactured by BASF) | 0.27 | 0.24 | 0.31 | 0.27 | 0.44 | 0.18 | 0.19 | 0.19 | 0.21 |
| | 1-(Biphenyl-4-yl)-2-methyl-2-morpholinopropan-1-one (APi 907, manufactured by Shenzhen UV-ChemTech Ltd.) | — | — | — | — | — | — | — | — | — |
| | OXE03 (manufactured by BASF) | — | — | — | — | — | — | — | — | — |
| | 2-(dimethylamino)-2-[(4-methylphenyl)methyl]-1-[4-(4-morpholinyl)phenyl]-1-butanone (Irgacure 379EG, manufactured by BASF) | 0.09 | 0.08 | 0.11 | 0.09 | 0.16 | — | — | — | — |
| Blocked isocyanate compound | WT32-B75P (manufactured by Asahi Kasei Chemicals Corporation) | — | — | — | — | — | 4.17 | — | — | 4.83 |
| | KARENZ AOI-BM (manufactured by Showa Denko K. K.) | — | — | — | — | — | — | — | — | — |
| | X6010-4 (manufactured by Asahi Kasei Corporation) | — | — | — | — | — | — | 4.46 | 4.46 | — |
| | DURANATE SBN-70D (manufactured by Asahi Kasei Corporation) | — | — | — | — | 0.79 | — | — | — | — |
| | Compound B | — | — | — | — | — | — | 0.74 | 0.74 | — |
| | Compound C | — | — | — | — | — | — | — | — | — |
| Additive | N-Phenylglycine (manufactured by Tokyo Chemical Industry Co., Ltd.) | 0.04 | 0.04 | 0.04 | — | — | 0.03 | 0.03 | 0.03 | 0.03 |
| | Phenothiazine (manufactured by Tokyo Chemical Industry Co., Ltd.) | — | — | — | — | 0.02 | — | — | — | — |
| | 1,2,4-Triazole (manufactured by Otsuka Chemical Co., Ltd.) | — | 0.09 | 0.09 | 0.07 | 0.07 | — | — | 0.09 | 0.09 |
| | Benzoimidazole (manufactured by Tokyo Chemical Industry Co., Ltd.) | 0.09 | 0.09 | 0.09 | 0.07 | 0.07 | 0.03 | 0.03 | — | — |
| | 5-Amino-1H-tetrazole (manufactured by Tokyo Chemical Industry Co., Ltd.) | — | — | — | — | — | 0.13 | 0.01 | — | — |
| | Isonicotinamide (manufactured by Tokyo Chemical Industry Co., Ltd.) | 0.04 | 0.04 | 0.04 | 0.22 | 0.22 | 0.30 | 0.30 | 0.30 | — |
| | SMA EF-40 (manufactured by Cray valley) | — | 0.09 | 0.09 | 0.04 | — | 0.16 | 0.16 | 0.16 | 0.16 |
| | MEGAFACE F551A (manufactured by DIC Corporation) | — | — | — | — | 0.24 | — | — | — | — |
| | MEGAFACE EXP.MFS-578 (manufactured by DIC Corporation) | 0.09 | — | — | 0.09 | — | — | — | — | — |
| | Futergent 710FL (manufactured by Neos Co., Ltd.) | — | — | — | — | — | — | — | — | — |
| Solvent | 1-Methoxy-2-propyl acetate | 1.89 | 2.27 | 5.38 | 1.69 | 10.83 | 12.16 | 9.56 | 9.51 | 2.38 |
| | Methyl ethyl ketone | 38.50 | 36.00 | 38.50 | 38.50 | 45.00 | 42.60 | 42.60 | 42.60 | 40.00 |
| Total (parts by mass) | | 100 | 100 | 100 | 100 | 100 | 100 | 100 | 100 | 100 |

The abbreviations in Table 1 are shown below.

P-1 Solution (Solution of Polymer P-1 with Solid Content of 36.3% by Mass)

A P-1 solution (solution of a polymer P-1 with a solid content of 36.3% by mass) obtained by the preparation method shown below was used.

Method for Preparing P-1 Solution (Solution of Polymer P-1 with Solid Content of 36.3% by Mass)

The P-1 solution (solution of a polymer P-1 with a solid content of 36.3% by mass) was prepared by a polymerizing step and an additional step shown below.

Polymerizing Step

Propylene glycol monomethyl ether acetate (manufactured by Sanwa Chemical Industrial Co., Ltd., product name PGM-Ac) (60 g) and propylene glycol monomethyl ether (manufactured by Sanwa Chemical Industrial Co., Ltd., product name PGM) (240 g) were introduced into a 2,000 mL flask. The obtained liquid was heated to 90° C. while stirring the liquid at a stirring speed of 250 rpm (round per minute; the same applies hereinafter).

For the preparation of a dropping liquid (1), 107.1 g of methacrylic acid (manufactured by Mitsubishi Rayon Co., Ltd., product name Acryester M), methyl methacrylate (manufactured by Mitsubishi Gas Chemical Company, Inc., product name MMA) (5.46 g), and cyclohexyl methacrylate (manufactured by Mitsubishi Gas Chemical Co., Ltd., product name CHMA) (231.42 g) were mixed and diluted with PGM-Ac (60 g) to obtain the dropping liquid (1).

For the preparation of a dropping liquid (2), dimethyl 2,2'-azobis(2-methylpropionate) (manufactured by FUJIFILM Wako Pure Chemical Corporation, product name V-601) (9.637 g) was dissolved in PGM-Ac (136.56 g) to obtain the dropping liquid (2).

The dropping liquid (1) and the dropping liquid (2) were simultaneously added dropwise to the above-mentioned 2,000 mL flask (specifically, the 2,000 mL flask containing the liquid heated to 90° C.) over 3 hours.

Next, the container of the dropping liquid (1) was washed with PGM-Ac (12 g) and the washing liquid was added dropwise into the 2,000 mL flask. Next, the container of the dropping liquid (2) was washed with PGM-Ac (6 g) and the washing liquid was added dropwise into the 2,000 mL flask. During these dropwise additions, the reaction liquid in the 2,000 mL flask was kept at 90° C. and stirred at a stirring speed of 250 rpm. Further, the mixture was stirred at 90° C. for 1 hour as a post-reaction.

V-601 (2.401 g) was added to the reaction liquid after the post-reaction as the first additional addition of the initiator. Further, the container of V-601 was washed with PGM-Ac (6 g), and the washing liquid was introduced into the reaction liquid. Then, the mixture was stirred at 90° C. for 1 hour.

Next, V-601 (2.401 g) was added to the reaction liquid as the second additional addition of the initiator. Further, the container of V-601 was washed with PGM-Ac (6 g), and the washing liquid was introduced into the reaction liquid. Then, the mixture was stirred at 90° C. for 1 hour.

Next, V-601 (2.401 g) was added to the reaction liquid as the third additional addition of the initiator. Further, the container of V-601 was washed with PGM-Ac (6 g), and the washing liquid was introduced into the reaction liquid. Then, the mixture was stirred at 90° C. for 3 hours.

Additional Step

After stirring at 90° C. for 3 hours, PGM-Ac (178.66 g) was introduced into the reaction liquid. Next, tetraethylammonium bromide (manufactured by FUJIFILM Wako Pure Chemical Corporation) (1.8 g) and hydroquinone monomethyl ether (manufactured by FUJIFILM Wako Pure Chemical Corporation) (0.8 g) were added to the reaction liquid. Further, each container was washed with PGM-Ac (6 g), and the washing liquid was introduced into the reaction liquid. Then, the temperature of the reaction liquid was raised to 100° C.

Next, glycidyl methacrylate (manufactured by NOF Corporation, product name Blemmer G) (76.03 g) was added dropwise to the reaction liquid over 1 hour. The container of Blemmer G was washed with PGM-Ac (6 g), and the washing liquid was introduced into the reaction liquid. Then, the mixture was stirred at 100° C. for 6 hours as an additional reaction.

Next, the reaction liquid was cooled and filtered through a mesh filter (100 meshes) for removing dust to obtain a solution (1,158 g) of the polymer P-1 (concentration of solid contents: 36.3% by mass). The obtained polymer P-1 had a weight-average molecular weight of 27,000, a number-average molecular weight of 15,000, and an acid value of 95 mgKOH/g. The structures of the polymer P-1 are shown below.

Polymer P-1: The compositional ratio of the repeating units in Structural Formula represents a molar ratio.

In addition, the polymer P-1 corresponds to an alkali-soluble resin.

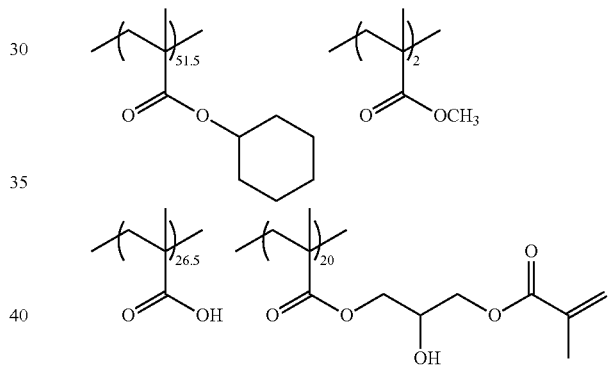

P-2 Solution (Solution of Polymer P-2 with Solid Content of 36.5% by Mass)

A P-2 solution (solution of a polymer P-2 with a solid content of 36.5% by mass) obtained by the preparation method shown below was used.

Method for Preparing P-2 Solution (Solution of Polymer P-2 with Solid Content of 36.5% by Mass)

The P-2 solution (solution of a polymer P-2 with a solid content of 36.5% by mass) was prepared by a polymerizing step and an additional step shown below.

82.4 g of propylene glycol monomethyl ether was charged into a flask and heated to 90° C. under a nitrogen stream. To this liquid were simultaneously added dropwise a solution in which 38.4 g of styrene, 30.1 g of dicyclopentanyl methacrylate, and 34.0 g of methacrylic acid had been dissolved in 20 g of propylene glycol monomethyl ether and a solution in which 5.4 g of a polymerization initiator V-601 (manufactured by FUJIFILM Wako Pure Chemical Corporation) had been dissolved in 43.6 g of propylene glycol monomethyl ether acetate over 3 hours. After the dropwise addition, 0.75 g of V-601 was added three times every hour. Thereafter, the reaction was continued for another 3 hours. Thereafter, the reaction liquid was diluted with 58.4 g of propylene glycol monomethyl ether acetate and 11.7 g of propylene glycol monomethyl ether. The reaction liquid was heated to 100° C. under an air stream, and 0.53 g of tetraethylammonium bromide and 0.26 g of p-methoxyphenol were added thereto. 25.5 g of glycidyl methacrylate (Blemmer GH manufactured by NOF Corporation) was added dropwise thereto over 20 minutes. The mixture was reacted at 100° C. for 7 hours to obtain a solution of the polymer P-1. The concentration of solid contents of the obtained solution was 36.5% by mass. In terms of standard polystyrene in GPC, the weight-average molecular weight was 17,000, the number-average molecular weight was 6,200, the dispersity was 2.4, and the acid value of the polymer was 95 mgKOH/g. The amount of residual monomer measured by gas chromatography was less than 0.1% by mass with respect to the solid content of the polymer in any of the monomers. The structures of the polymer P-2 are shown below.

Polymer P-2: The compositional ratios of the repeating units in the structural formulae represent the molar ratios.

In addition, the polymer P-2 corresponds to an alkali-soluble resin.

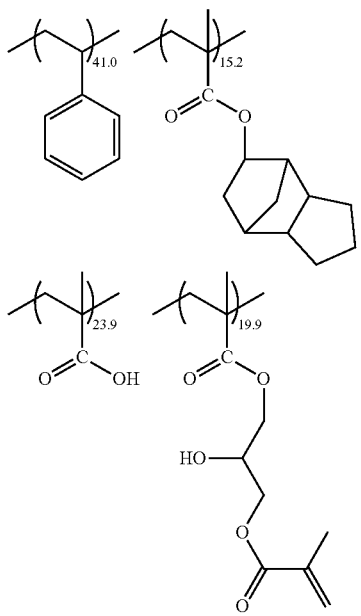

P-3 Solution (Solution of Polymer P-3 with Solid Content of 36.2% by Mass)

A P-3 solution (solution of a polymer P-3 with a solid content of 36.2% by mass) obtained by the preparation method shown below was used.

Method for Preparing P-3 Solution (Solution of Polymer P-3 with Solid Content of 36.2% by Mass)

The P-3 solution (solution of a polymer P-3 with a solid content of 36.2% by mass) was prepared by a polymerizing step and an additional step shown below.

113.5 g of propylene glycol monomethyl ether was charged into a flask and heated to 90° C. under a nitrogen stream. To this liquid were simultaneously added dropwise a solution in which 172 g of styrene, 4.7 g of methyl methacrylate, and 112.1 g of methacrylic acid had been dissolved in 30 g of propylene glycol monomethyl ether and a solution in which 27.6 g of a polymerization initiator V-601 (manufactured by FUJIFILM Wako Pure Chemical Corporation) had been dissolved in 57.7 g of propylene glycol monomethyl ether over 3 hours. After the dropwise addition, 2.5 g of V-601 was added three times every hour. Thereafter, the reaction was continued for another 3 hours. Thereafter, the reaction liquid was diluted with 160.7 g of propylene glycol monomethyl ether acetate and 233.3 g of propylene glycol monomethyl ether. The reaction liquid was heated to 100° C. under an air stream, and 1.8 g of tetraethylammonium bromide and 0.86 g of p-methoxyphenol were added thereto. 71.9 g of glycidyl methacrylate (Blemmer G manufactured by NOF Corporation) was added dropwise thereto over 20 minutes. The mixture was reacted at 100° C. for 7 hours to obtain a solution of the resin P-3. The concentration of solid contents of the obtained solution was 36.2% by mass. In terms of standard polystyrene in GPC, the weight-average molecular weight was 18,000, the number-average molecular weight was 7,800, the dispersity was 2.3, and the acid value of the polymer was 124 mgKOH/g. The amount of residual monomer measured by gas chromatography was less than 0.1% by mass with respect to the solid content of the polymer in any of the monomers. The structures of the polymer P-3 are shown below.

Polymer P-3: The compositional ratios of the repeating units in the structural formulae represent the molar ratios.

In addition, the polymer P-3 corresponds to an alkali-soluble resin.

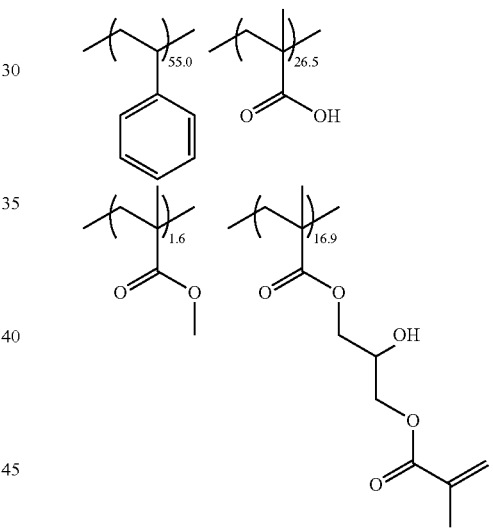

P-4 Solution (Solution of Polymer P-4 with Solid Content of 36.2% by Mass)

A P-4 solution (solution of a polymer P-4 with a solid content of 36.2% by mass) obtained by the preparation method shown below was used.

Method for Preparing P-4 Solution (Solution of Polymer P-4 with Solid Content of 36.2% by Mass)

A solution of the polymer P-4 with a solid content of 36.2% by mass was prepared by changing the type and the amount of the monomers in the synthesis of the P-3 solution. The obtained polymer P-4 had a weight-average molecular weight of 18,000, a number-average molecular weight of 7,800, a dispersity of 2.3, and an acid value of 124 mgKOH/g. The structures of the polymer P-4 are shown below.

Polymer P-4: The compositional ratios of the repeating units in the structural formulae represent the molar ratios.

In addition, the polymer P-4 corresponds to an alkali-soluble resin.

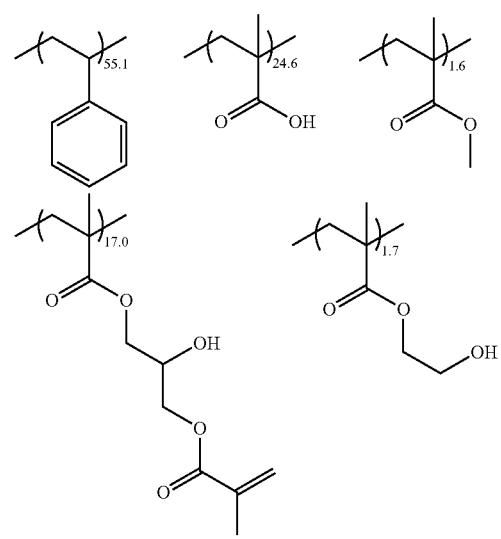

Compound B

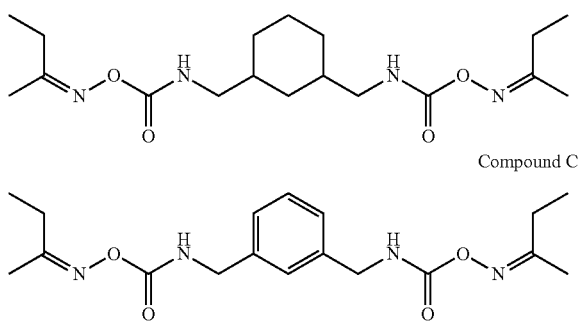

Compound C

"A-NOD-N": 1,9-Nonanediol diacrylate (manufactured by Shin-Nakamura Chemical Co., Ltd.)
"A-DPH": Dipentaerythritol hexaacrylate (manufactured by Shin-Nakamura Chemical Co., Ltd.)
"KAYARAD R-604": β,β-Dimethyl-1,3-dioxan-2-ethanol diacrylate (manufactured by Nippon Kayaku Co., Ltd.)
"MT NR1": 1,3,5-Tris(2-(3-sulfanylbutanoyloxy)ethyl)-1,3,5-triazinane-2,4,6-trione (manufactured by Showa Denko K. K.)
"OXE03": Oxime ester-based photopolymerization initiator (Irgacure OXE03, manufactured by BASF).
"WT32-B75P": Blocked isocyanate compound (manufactured by Asahi Kasei Corporation)
"KARENZ AOI-BM": Blocked isocyanate compound (manufactured by Showa Denko K. K.)
"X6010-4": Blocked isocyanate compound (manufactured by Asahi Kasei Corporation)
"DURANATE SBN-70D": Blocked isocyanate compound (manufactured by Asahi Kasei Corporation)
"MEGAFACE F551A": Fluorine-based surfactant (manufactured by DIC Corporation)
"MEGAFACE EXP.MFS-578": Surfactant (manufactured by DIC Corporation)
"FTERGENT 710FL": Fluorine-based surfactant (manufactured by Neos Corporation)
"SMA EF-40": Copolymer of styrene/maleic anhydride=4:1 (molar ratio) (acid anhydride value: 1.94 mmol/g, Mw: 10,500, manufactured by Cray Valley SA)

Preparation of Coating Liquids for Forming First Layer and Fourth Layer

Based on the components and formulations shown in Table 2 below, coating liquids (B-1 to B-4) for forming the first layer and the fourth layer were prepared.

TABLE 2

| Each component | Coating liquid for forming first layer and fourth layer (blending amount: parts by mass) | | | |
|---|---|---|---|---|
| | B-1 | B-2 | B-3 | B-4 |
| Sluria 4110 (Dispersion liquid including hollow silica particles and IPA, solid content: 20% by mass, manufactured by JGC GC Catalysts & Chemicals Ltd.) | 3.50 | 6.00 | 3.50 | — |
| Colloidal Silica SNOWTEX ST-N (Non-volatile content: 20% by mass, manufactured by Nissan Chemical Industries, Ltd.) | — | — | 0.50 | 3.00 |
| Ammonia water | 7.84 | 7.84 | 7.84 | 7.84 |
| Copolymer of methacrylic acid and allyl methacrylate | 0.21 | 0.03 | 0.21 | 0.21 |
| Polymerizable compound having carboxy group (ARONIX TO-2349, manufactured by Toagosei Co., Ltd.) | 0.03 | — | 0.03 | 0.03 |
| Fluorine-containing polymerizable compound (Compound FFA-1) | — | 0.10 | — | — |
| 1,2,4-Triazole (manufactured by Otsuka Chemical Co., Ltd.) | — | — | — | 0.03 |
| MEGAFACE F444 (manufactured by DIC Corporation) | 0.01 | — | — | — |
| Futergent 212M (manufactured by Neos Co., Ltd.) | — | 0.01 | 0.04 | 0.04 |
| Ion exchange water | 22.2 | 19.8 | 21.7 | 22.7 |
| Methanol | 66.2 | 66.2 | 66.2 | 66.2 |
| Total (parts by mass) | 100 | 100 | 100 | 100 |

The abbreviations in Table 2 are shown below.

FFA-1

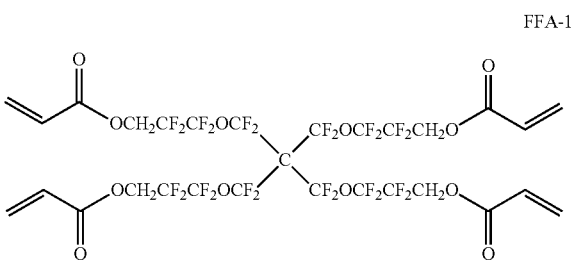

Preparation of Coating Liquids for Forming Second Layer, Third Layer, and Fifth Layer Based on the components and formulations shown in Table 3 below, coating liquids (C-1 to C-5) for forming the second layer, the third layer, and the fifth layer were prepared.

TABLE 3

| Each component | | Coating liquid for forming second layer, third layer, and fifth layer (blending amount: parts by mass) | | | | |
|---|---|---|---|---|---|---|
| | | C-1 | C-2 | C-3 | C-4 | C-5 |
| NanoUse OZS-30M (dispersion liquid including ZrO2 particles and methanol, manufactured by Nissan Chemical Industries, Ltd.) | | 4.61 | 4.34 | | 3.57 | 4.34 |
| TS-020: Aqueous dispersion liquid of TiO2 particles (nonvolatile fraction: 25.6% by mass, manufactured by TAYCA) | | | | 4.61 | | |
| Ammonia water (25% by mass) | | 7.84 | 7.84 | 7.84 | 7.84 | 7.84 |
| Binder polymer | Polymer A (copolymer of methacrylic acid and allyl methacrylate (mass ratio: 76/24)) | 0.13 | 0.25 | 0.13 | 0.45 | 0.21 |
| | ARUFON UC-3920 (manufactured by Toagosei Co., Ltd.) | 0.01 | 0.01 | — | 0.01 | 0.01 |
| Polymerizable compound having carboxyl group (ARONIX TO-2349, manufactured by Toagosei Co., Ltd.) | | 0.03 | 0.03 | 0.03 | 0.06 | 0.03 |
| 1,2,4-Triazole (manufactured by Otsuka Chemical Co., Ltd.) | | — | — | — | — | 0.03 |
| BT-LX (manufactured by Johoku Chemical Industry Co., Ltd.) | | — | 0.03 | — | — | — |
| N-Methyldiethanolamine (manufactured by Nippon Emulsifier Co., Ltd.) | | 0.03 | — | 0.03 | 0.03 | 0.03 |
| Adenine (manufactured by KJ Chemical Corporation) | | 0.03 | — | 0.03 | 0.03 | — |
| MEGAFACE F444 (manufactured by DIC Corporation) | | 0.01 | 0.01 | 0.01 | — | — |
| Futergent 212M (manufactured by Neos Co., Ltd.) | | — | — | — | 0.04 | 0.04 |
| Ion exchange water | | 21.1 | 21.3 | 21.1 | 21.8 | 21.3 |
| Methanol | | 66.2 | 66.2 | 66.2 | 66.2 | 66.2 |
| Total (parts by mass) | | 100 | 100 | 100 | 100 | 100 |

The abbreviations in Table 2 are shown below.

Polymer A

A polymer A obtained by the preparation method shown below was used.

(Method for Synthesizing Polymer A)

1-Methoxypropanol (manufactured by Tokyo Chemical Industry Co., Ltd.) (270.0 g) was introduced into a 1 L three-neck flask, and a temperature thereof was raised to 70° C. under a nitrogen stream under stirring. Meanwhile, allyl methacrylate (45.6 g) (manufactured by Fujifilm Wako Pure Chemical Industries, Ltd.) and methacrylic acid (14.4 g) (manufactured by Fujifilm Wako Pure Chemical Industries, Ltd.) were dissolved in 1-methoxypropanol (manufactured by Tokyo Chemical Industry Co., Ltd.) (270.0 g), 3.94 g of V-65 (manufactured by Fujifilm Wako Pure Chemical Industries, Ltd.) was further dissolved therein to produce a dropping liquid, and the liquid was added dropwise to a flask over 2.5 hours. The reaction was performed while keeping the stirred state as it was for 2.0 hours.

Then, the temperature was returned to room temperature, and the mixture was added dropwise to ion exchange water (2.7 L) in a stirred state and subjected to reprecipitation to obtain a turbid liquid. The filtration was carried out by introducing a turbid liquid in Nutche with a filter paper, and the filtered material was further washed with ion exchange water to obtain a wet powder. The powder was dried by blowing air at 45° C. to confirm that the amount was constant, thereby obtaining a polymer A as a powder in a yield of 70%.

A compositional ratio (mass ratio (% by mass)) of methacrylic acid/allyl methacrylate of the obtained polymer A was 76/24. The weight-average molecular weight thereof was 38,000.

Manufacture of Transfer Film

Manufacture of Transfer Film of Example 1

A coating liquid A-1 for forming a photosensitive composition layer was applied onto an easily peelable polyethylene terephthalate film (Cerapeel 25WZ, manufactured by Toray Industries, Inc.), which served as a protective film, while adjusting the coating amount using a slit-shaped nozzle so as to obtain a film thickness shown in Table 4 after drying, and the solvent was volatilized in a drying zone at 80° C. to form a photosensitive composition layer.

Next, a coating liquid C-1 for forming a third layer was applied onto the photosensitive composition layer while adjusting the coating amount using a slit-shaped nozzle so as to obtain a film thickness shown in Table 4 after drying, and then dried at a drying temperature of 70° C. to form a third layer.

Next, a coating liquid B-1 for forming a first layer was applied on a surface of the third layer while adjusting the coating amount using a slit-shaped nozzle so as to obtain a film thickness shown in Table 4 after drying, and then dried at a drying temperature of 70° C. to form a first layer.

Next, polyethylene terephthalate (16KS40, manufactured by Toray Industries, Inc.) with a thickness of 16 μm, which served as a temporary support, was pressure-bonded to a surface of the first layer to manufacture a transfer film of Example 1.

Manufacture of Transfer Films of Example 2 and Comparative Example 2

A coating liquid A-1 for forming a photosensitive composition layer was applied onto an easily peelable polyethylene terephthalate film (Cerapeel 25WZ, manufactured by Toray Industries, Inc.), which served as a protective film, while adjusting the coating amount using a slit-shaped nozzle so as to obtain a film thickness shown in Table 4 after drying, and the solvent was volatilized in a drying zone at 80° C. to form a photosensitive composition layer.

Next, a coating liquid B-1 for forming a first layer was applied onto the photosensitive composition layer while adjusting the coating amount using a slit-shaped nozzle so as to obtain a film thickness shown in Table 4 after drying, and then dried at a drying temperature of 70° C. to form a first layer.

Next, polyethylene terephthalate (16KS40, manufactured by Toray Industries, Inc.) with a thickness of 16 μm, which served as a temporary support, was pressure-bonded to a surface of the first layer to manufacture a transfer film of Example 2.

In addition, the transfer film of Comparative Example 2 was manufactured by the same method as in Example 2, except that the coating liquid and the film thickness were changed to those shown in Table 4.

Manufacture of Transfer Films of Examples 3, 4, and 9 to 18

A material A-1 for forming a photosensitive composition layer was applied onto an easily peelable polyethylene terephthalate film (Cerapeel 25WZ, manufactured by Toray Industries, Inc.) while adjusting the coating amount using a slit-shaped nozzle so as to obtain a film thickness shown in Table 4 after drying, and the solvent was volatilized in a drying zone at 80° C. to form a photosensitive composition layer.

Next, a coating liquid B-1 for forming a first layer was applied onto the photosensitive composition layer while adjusting the coating amount using a slit-shaped nozzle so as to obtain a film thickness shown in Table 4 after drying, and then dried at a drying temperature of 70° C. to form a first layer.

Next, polyethylene terephthalate (16KS40, manufactured by Toray Industries, Inc.) with a thickness of 16 µm, which served as a temporary support, was pressure-bonded to the surface of the first layer.

Next, after the easily peelable polyethylene terephthalate film (Cerapeel 25WZ, manufactured by Toray Industries, Inc.) was peeled, a coating liquid C-2 for forming a second layer was applied onto a surface of the photosensitive composition layer while adjusting the coating amount using a slit-shaped nozzle so as to obtain a film thickness shown in Table 4 after drying, and then dried in a drying temperature at 70° C. to form a second layer.

Next, polyethylene terephthalate (16KS40, manufactured by Toray Industries, Inc.) with a thickness of 16 µm as a protective film was pressure-bonded to a surface of the second layer to manufacture a transfer film of Example 3.

In addition, the transfer films of Examples 4 and 9 to 18 were manufactured by the same method as in Example 3, except that the coating liquid and the film thickness were changed to those shown in Table 4.

Manufacture of Transfer Film of Example 5

A photosensitive composition layer, a third layer, and a first layer were formed on an easily peelable polyethylene terephthalate film (Cerapeel 25WZ, manufactured by Toray Industries, Inc.) by the same method as in Example 1, except that the coating liquid and the film thickness were changed to those shown in Table 4, and polyethylene terephthalate (16KS40, manufactured by Toray Industries, Inc.) with a thickness of 16 µm, which served as a temporary support, was further pressure-bonded to a surface of the first layer.

Next, after the easily peelable polyethylene terephthalate film (Cerapeel 25WZ, manufactured by Toray Industries, Inc.) was peeled, a coating liquid C-1 for forming a second layer was applied onto a surface of the photosensitive composition layer while adjusting the coating amount using a slit-shaped nozzle so as to obtain a film thickness shown in Table 4 after drying, and then dried in a drying temperature at 70° C. to form a second layer.

Next, polyethylene terephthalate (16KS40, manufactured by Toray Industries, Inc.) with a thickness of 16 µm as a protective film was pressure-bonded to a surface of the second layer to manufacture a transfer film of Example 5.

Manufacture of Transfer Film of Example 6

A photosensitive composition layer, a third layer, and a first layer were formed on an easily peelable polyethylene terephthalate film (Cerapeel 25WZ, manufactured by Toray Industries, Inc.) by the same method as in Example 1, except that the coating liquid and the film thickness were changed to those shown in Table 4, and polyethylene terephthalate (16KS40, manufactured by Toray Industries, Inc.) with a thickness of 16 µm, which served as a temporary support, was further pressure-bonded to a surface of the first layer.

Next, after the easily peelable polyethylene terephthalate film (Cerapeel 25WZ, manufactured by Toray Industries, Inc.) was peeled, a coating liquid C-1 for forming a second layer was applied onto a surface of the photosensitive composition layer while adjusting the coating amount using a slit-shaped nozzle so as to obtain a film thickness shown in Table 4 after drying, and then dried in a drying temperature at 70° C. to form a second layer.

Next, a coating liquid B-1 for forming a fourth layer was applied on a surface of the second layer while adjusting the coating amount using a slit-shaped nozzle so as to obtain a film thickness shown in Table 4 after drying, and then dried at a drying temperature of 70° C. to form a fourth layer.

Next, polyethylene terephthalate (16KS40, manufactured by Toray Industries, Inc.) with a thickness of 16 µm was pressure-bonded to a surface of the fourth layer as a protective film to manufacture a transfer film of Example 6.

Manufacture of Transfer Film of Example 7

A transfer film of Example 7 was manufactured by the same method as in Example 6, except that the coating liquid and the film thickness shown in Table 4 were changed and the first layer was directly formed on a surface of the photosensitive composition layer without forming the third layer.

Manufacture of Transfer Film of Example 8

A transfer film of Example 8 was manufactured by the same method as in Example 5, except that the coating liquid and the film thickness shown in Table 4 are changed and the fifth layer is formed by the following procedure after the formation of the photosensitive composition layer and before the formation of the third layer.

Procedure for Forming Fifth Layer

A coating liquid C-4 for forming a fifth layer was applied onto the photosensitive composition layer while adjusting the coating amount using a slit-shaped nozzle so as to obtain a film thickness shown in Table 4 after drying, and then dried at a drying temperature of 70° C. to form a fifth layer. Furthermore, the third layer and the first layer were arranged in this order on the fifth layer.

Manufacture of Transfer Film of Comparative Example 1

A coating liquid A-1 for forming a photosensitive composition layer was applied onto a polyethylene terephthalate film (16KS40, manufactured by Toray Industries, Inc.) with a thickness of 16 µm, which served as a temporary support, while adjusting the coating amount using a slit-shaped nozzle so as to obtain a film thickness shown in Table 4 after drying, and the solvent was volatilized in a drying zone at 80° C. to form a photosensitive composition layer.

Next, polyethylene terephthalate (16KS40, manufactured by Toray Industries, Inc.) with a thickness of 16 µm, which served as a protective film, was pressure-bonded to a surface of the photosensitive composition layer to manufacture a transfer film used in Comparative Example 1.

FIG. 7 shows a schematic view for illustrating a positional relationship of the respective layers included in transfer films manufactured in Examples and Comparative Examples. Incidentally, FIG. 7 is merely a schematic view for convenience for illustrating a positional relationship with each layer, and none of the transfer films of Examples and Comparative Examples has the configuration shown in FIG. 7 (in FIG. 7, each symbol means the following configuration: 11: temporary support, 13: first layer, 15: photosensitive composition layer, 17: protective film, 21: second layer, 31: fourth layer, 41: third layer, 51: fifth layer)

Measurement of Refractive Index and Thickness of Each Layer of Transfer Film

The refractive index of each layer of the transfer film is measured in accordance with an ellipsometry method, using M-2000 manufactured by J. A. Woollam Co. as a measuring device. Specifically, the method is as follows.

Measurement of Refractive Index and Thickness of Each Layer of Transfer Film of Example 1

(1) Measurement of Refractive Index of Temporary Support

One surface of the temporary support used in the manufacture of the transfer film of Example 1 was subjected to a filing treatment to roughen the surface so that reflection did not occur. Then, a reflection spectrum was measured at a wavelength of 400 to 1,000 nm at 25° C., using the above-mentioned measuring device in accordance with the ellipsometry method, and a refractive index of the temporary support at each wavelength was determined by fitting using a Cauchy model.

(2) Measurement of Refractive Index and Thickness of Each Layer

First Layer

With regard to the transfer film of Example 1, a test sample A in which only a layer (hereinafter also referred to as a "layer A") arranged adjacent to the temporary support in the transfer film before the temporary support was peeled was formed on the temporary support was manufactured. That is, in Example 1, since the layer A corresponded to the first layer, the test sample A in which the first layer was formed on the temporary support was manufactured. Furthermore, the test sample A was manufactured in accordance with the above-mentioned layer forming procedure (forming procedure by a coating method).

Next, a surface of the temporary support (a surface on the side where the layer of the temporary support was not formed) in each of the obtained test sample A was subjected to a filing treatment in the same manner as in the procedure (1). Then, a reflection spectrum (wavelength: 400 to 1,000 nm) of the test sample A in which only the temporary support and the layer A were laminated was measured at 25° C., using the above-mentioned measuring device in accordance with the ellipsometry method, and a refractive index of the layer A at each wavelength was determined by fitting using a Cauchy model.

In addition, the thickness of the layer A was also measured using the test sample A. For the thickness of the layer A, the cross-section cut by a microtome was observed with a scanning electron microscope (SEM) or a transmission electron microscope (TEM), and an average value of the thicknesses measured at 10 points was used. It should be noted that those having a thickness of 1 μm or more were measured by SEM, and those having a thickness of less than 1 μm were measured by TEM.

Second Layer

Similarly, a test sample B in which a layer B was further formed on the layer A formed on the temporary support in the above-mentioned test sample A was manufactured. Here, the layer B is a layer arranged on a side of the layer (layer A) arranged adjacent to the temporary support, opposite to the temporary support, in the transfer film of Example 1 before the temporary support was peeled. Accordingly, in a case of Example 1, the third layer is applicable. Next, the reflection spectrum of the test sample B was measured by the same method as that for the above-mentioned first layer, and the refractive index of the layer B was determined. In addition, the thickness was determined by the same method as for the above-mentioned first layer.

Third Layer

Similarly, a test sample C in which a layer C was further formed on the layer B formed on the temporary support in the above-mentioned test sample B was manufactured. Here, the layer C is a layer arranged on a side of the layer B opposite to the layer A in the transfer film of Example 1 before the temporary support is peeled. Accordingly, in a case of Example 1, the photosensitive composition layer is applicable. Next, the reflection spectrum of the test sample C was measured by the same method as for the above-mentioned first layer, and the refractive index of the layer C was determined. In addition, the thickness was determined by the same method as for the above-mentioned first layer.

In the description above, the refractive index and the thickness of each layer arranged on the temporary support are measured while sequentially laminating one layer at a time from the temporary support side, and finally the refractive index and the thickness of all the layers of the transfer film are measured.

In addition, at that time, in each of the layers in the test samples A to C, fitting was performed on the assumption that the refractive indices from one surface to the other surface of each layer were uniform. Furthermore, in a case where the test samples A to C are samples comprising a layer having a gradient refractive index such that the refractive indices from one surface to the other surface of the layer change, the above-mentioned fitting is performed by setting up a model in which the refractive indices from one surface to the other surface of the layer change linearly.

The refractive indices based on the fitting are shown in Table 5. It should be noted that the refractive index shown in Table 5 is shown by extracting the refractive index calculated at a wavelength of 550 nm.

Measurement of Refractive Index and Thickness of Each Layer of Transfer Films of Examples 2 to 18 and Comparative Examples 1 and 2

According to [Measurement of Refractive Index and Thickness of Each Layer of Transfer Film of Example 1] described above, measurement of the refractive index and the thickness of each layer of the transfer films of Examples 2 to 18 and Comparative Examples 1 and 2 was carried out.

TABLE 4

| | | | Configuration of transfer film | | | | | | | |
|---|---|---|---|---|---|---|---|---|---|---|
| | | | Photosensitve composition layer | | | First layer | | | Second layer | | |
| | Temporary support | Protective film | Coating liquid No. | Refractive index (550 nm) | Thickness | Coating liquid No. | Refractive index (550 nm) | Thickness | Coating liquid No. | Refractive index (550 nm) | Thickness |
| Example 1 | Transfer film 1 | 16KS40 Cerapeel 25WZ | A-1 | 1.51 | 10 um | B-1 | 1.35 | 101 nm | — | — | — |

TABLE 4-continued

| | | | | | | | | | | | | |
|---|---|---|---|---|---|---|---|---|---|---|---|---|
| Example 2 | Transfer film 2 | 16KS40 | Cerapeel 25WZ | A-1 | 1.51 | 10 um | B-1 | 1.35 | 80 nm | — | — | — |
| Example 3 | Transfer film 3 | 16KS40 | Cerapeel 25WZ | A-1 | 1.51 | 10 um | B-1 | 1.35 | 101 nm | C-2 | 1.68 | 77 nm |
| Example 4 | Transfer film 4 | 16KS40 | Cerapeel 25WZ | A-1 | 1.51 | 10 um | B-2 | 1.26 | 95 nm | C-2 | 1.68 | 77 nm |
| Example 5 | Transfer film 5 | 16KS40 | Cerapeel 25WZ | A-1 | 1.51 | 10 um | B-1 | 1.35 | 87 nm | C-1 | 1.70 | 72 nm |
| Example 6 | Transfer film 6 | 16KS40 | Cerapeel 25WZ | A-1 | 1.51 | 10 um | B-1 | 1.35 | 87 nm | C-1 | 1.70 | 66 nm |
| Example 7 | Transfer film 7 | 16KS40 | Cerapeel 25WZ | A-1 | 1.51 | 10 um | B-2 | 1.26 | 102 nm | C-3 | 1.80 | 36 nm |
| Example 8 | Transfer film 8 | 16KS40 | Cerapeel 25WZ | A-1 | 1.51 | 10 um | B-1 | 1.35 | 95 nm | C-1 | 1.70 | 74 nm |
| Example 9 | Transfer film 9 | 16KS40 | Cerapeel 25WZ | A-1 | 1.51 | 10 um | B-1 | 1.35 | 98 nm | C-1 | 1.70 | 82 nm |
| Example 10 | Transfer film 10 | 16KS40 | Cerapeel 25WZ | A-1 | 1.51 | 10 um | B-2 | 1.26 | 81 nm | C-1 | 1.70 | 86 nm |
| Example 11 | Transfer film 11 | 16KS40 | Cerapeel 25WZ | A-2 | 1.51 | 30 um | B-1 | 1.35 | 101 nm | C-2 | 1.68 | 77 nm |
| Example 12 | Transfer film 12 | 16KS40 | Cerapeel 25WZ | A-3 | 1.51 | 8 um | B-1 | 1.35 | 101 nm | C-2 | 1.68 | 77 nm |
| Example 13 | Transfer film 13 | 16KS40 | Cerapeel 25WZ | A-4 | 1.51 | 20 um | B-1 | 1.35 | 101 nm | C-2 | 1.68 | 77 nm |
| Example 14 | Transfer film 14 | 16KS40 | Cerapeel 25WZ | A-5 | 1.51 | 1 um | B-1 | 1.35 | 101 nm | C-2 | 1.68 | 77 nm |
| Example 15 | Transfer film 15 | 16KS40 | Cerapeel 25WZ | A-6 | 1.51 | 2 um | B-1 | 1.35 | 101 nm | C-2 | 1.68 | 77 nm |
| Example 16 | Transfer film 16 | 16KS40 | Cerapeel 25WZ | A-7 | 1.51 | 4 um | B-1 | 1.35 | 101 nm | C-2 | 1.68 | 77 nm |
| Example 17 | Transfer film 17 | 16KS40 | Cerapeel 25WZ | A-8 | 1.51 | 6 um | B-1 | 1.35 | 101 nm | C-2 | 1.68 | 77 nm |
| Example 18 | Transfer film 18 | 16KS40 | Cerapeel 25WZ | A-9 | 1.51 | 15 um | B-3 | 1.35 | 101 nm | C-5 | 1.68 | 77 nm |
| Comparative Example 1 | Transfer film R1 | 16KS40 | Cerapeel 25WZ | A-1 | 1.51 | 10 um | — | — | — | — | — | — |
| Comparative Example 2 | Transfer film R2 | 16KS40 | Cerapeel 25WZ | A-1 | 1.51 | 10 um | B-4 | 1.48 | 70 nm | — | — | — |

| | | Configuration of transfer film | | | | | | |
|---|---|---|---|---|---|---|---|---|
| | | Third layer | | | Fourth layer | | | Fifth layer | | |
| | | Coating liquid No. | Refractive index (550 nm) | Thickness | Coating liquid No. | Refractive index (550 nm) | Thickness | Coating liquid No. | Refractive index (550 nm) | Thickness |
| Example 1 | Transfer film 1 | C-1 | 1.70 | 70 nm | — | — | — | — | — | — |
| Example 2 | Transfer film 2 | — | — | — | — | — | — | — | — | — |
| Example 3 | Transfer film 3 | — | — | — | — | — | — | — | — | — |
| Example 4 | Transfer film 4 | — | — | — | — | — | — | — | — | — |
| Example 5 | Transfer film 5 | C-1 | 1.70 | 133 nm | — | — | — | — | — | — |
| Example 6 | Transfer film 6 | C-1 | 1.70 | 133 nm | B-1 | 1.35 | 3 nm | — | — | — |
| Example 7 | Transfer film 7 | | | | B-2 | 1.26 | 20 nm | | | |
| Example 8 | Transfer film 8 | C-1 | 1.70 | 80 nm | — | — | — | C-4 | 1.61 | 70 nm |
| Example 9 | Transfer film 9 | | | | | | | | | |
| Example 10 | Transfer film 10 | | | | | | | | | |
| Example 11 | Transfer film 11 | | | | | | | | | |
| Example 12 | Transfer film 12 | | | | | | | | | |
| Example 13 | Transfer film 13 | | | | | | | | | |
| Example 14 | Transfer film 14 | | | | | | | | | |
| Example 15 | Transfer film 15 | | | | | | | | | |
| Example 16 | Transfer film 16 | | | | | | | | | |

TABLE 4-continued

| | | | | | | | | | | |
|---|---|---|---|---|---|---|---|---|---|---|
| Example 17 | Transfer film 17 | | | | | | | | | |
| Example 18 | Transfer film 18 | | | | | | | | | |
| Comparative Example 1 | Transfer film R1 | — | — | — | — | — | — | — | — | — |
| Comparative Example 2 | Transfer film R2 | — | — | — | — | — | — | — | — | — |

Manufacture of Member Containing Layer with High Refractive Index

Member F1 Containing Layer with High Refractive Index (used in Examples 1A to 8A and 11A to 18A, and Comparative Examples 1A and 2A)

Formation of Transparent Conductive Layer

A cycloolefin resin film having a film thickness of 38 μm and a refractive index of 1.53 was subjected to a corona discharge treatment for 3 seconds under the conditions of an electrode length of 240 mm and a distance between work electrodes of 1.5 mm at an output voltage of 100% and an output of 250 W with a wire electrode having a diameter of 1.2 mm by using a high frequency oscillator, to perform the surface reforming, thereby obtaining a transparent film substrate (corresponding to a substrate).

Next, a film in which the transparent film substrate was introduced into a vacuum chamber, and an ITO thin film having a thickness of 30 nm and a refractive index of 1.82 was formed as a transparent electrode layer using an ITO target (indium:tin=95:5 (molar ratio)) having a $SnO_2$ content of 10% by mass by a direct current (DC) magnetron sputtering (conditions: transparent film substrate temperature: 150° C., argon pressure: 0.13 Pa, oxygen pressure: 0.01 Pa). A surface electrical resistance of the ITO thin film was 85Ω/□ (square per Ω). In this manner, a member containing a layer with a high refractive index F1 (corresponding to the layer with a high refractive index), comprising the substrate and the transparent conductive layer arranged on the substrate, was manufactured.

Member F2 Containing Layer with High Refractive Index (Used in Examples 9 and 10)

Formation of Sixth Refractive Index-Adjusting Layer

A cycloolefin resin film having a film thickness of 38 μm and a refractive index of 1.53 was subjected to a corona discharge treatment for 3 seconds under the conditions of an electrode length of 240 mm and a distance between work electrodes of 1.5 mm at an output voltage of 100% and an output of 250 W with a wire electrode having a diameter of 1.2 mm by using a high frequency oscillator, to perform the surface reforming, thereby obtaining a transparent film substrate.

Next, a coating composition shown in Table 5 below was coated onto a corona discharge-treated surface of the transparent film substrate using a slit-shaped nozzle, then irradiated with ultraviolet rays (integrated light amount 300 mJ/cm$^2$), and dried at about 110° C. to form a sixth refractive index-adjusting layer having a refractive index of 1.64 and a film thickness of 90 nm on the transparent film substrate. In this manner, a transparent film substrate with a sixth refractive index-adjusting layer, which had a transparent film substrate and a sixth refractive index-adjusting layer on a surface of the transparent film substrate, was manufactured.

TABLE 5

| Material | Parts by mass |
|---|---|
| ZrO2: ZR-010 manufactured by Solar Co., Ltd. | 2.08 |
| KARAYAD DPHA (manufactured by Shin-Nakamura Chemical Co., Ltd.) | 0.11 |
| Urethane-based monomer: NK Oligo UA-32P, manufactured by Shin-Nakamura Chemical Co., Ltd. | 0.11 |
| Viscoat # 802 (Mixture of tripentaerythritol acrylate, mono-, di-, or polypentaerythritol acrylate manufactured by Osaka Organic Chemical Industry Ltd.) | 0.36 |
| Polymer with structure represented by the following formula P-25, Mw: 35,000 | 0.85 |
| Photoradical polymerization initiator: 2-Benzyl-2-dimethylamino-1-(4-morpholinophenyl)-butanone (Irgacure (registered trademark) 369, manufactured by BASF) | 0.03 |
| Photopolymerization Initiator: KAYACURE DETX-S (Nippon Kayaku Co., Ltd., alkyl thioxanthone) | 0.03 |
| MEFAFACE F-551 (manufactured by DIC Corporation) | 0.01 |
| 1-Methoxy-2-propyl acetate | 38.73 |
| Methyl ethyl ketone | 57.69 |
| Total (parts by mass) | 100 |

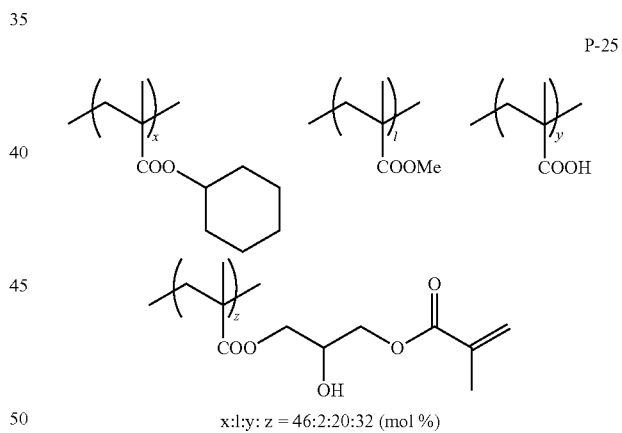

P-25 x:l:y: z = 46:2:20:32 (mol %)

Formation of Transparent Conductive Layer

A film in which the obtained transparent film substrate with a sixth refractive index-adjusting layer introduced into a vacuum chamber, and an ITO thin film having a thickness of 30 nm and a refractive index of 1.82 was formed as a transparent electrode layer, using an ITO target (indium:tin=95:5 (molar ratio)) having a $SnO_2$ content of 10% by mass by a direct current (DC) magnetron sputtering (conditions: temperature of the transparent film substrate with a sixth refractive index-adjusting layer: 150° C., argon pressure: 0.13 Pa, oxygen pressure: 0.01 Pa). A surface electrical resistance of the ITO thin film was 85Ω/□ (square per Ω). In this way, a member containing a layer with a high refractive index F2 (corresponding to the layer with a high refractive index), comprising a substrate, a sixth refractive index-adjusting layer, and a transparent conductive layer, was manufactured.

Manufacture of Laminate

The protective film of the manufactured transfer film was peeled. Next, a peeled surface exposed by peeling the protective film was brought into contact with a surface on which the transparent electrode film of a member containing a layer with a high refractive index shown in Table 6 was formed, and thus, a laminate obtained by laminating the transfer film on the member containing a layer with a high refractive index under the following conditions was obtained.

Conditions

Temperature of transparent film substrate: 40° C.
Temperature of rubber roller: 90° C.
Linear pressure: 3 N/cm
Transport speed: 4 m/min Next, the laminate was exposed over the entire surface through a temporary support using a proximity type exposure machine (manufactured by Hitachi High-Tech Electronics Engineering Co., Ltd.) including an ultra-high pressure mercury lamp with an exposure amount of 100 mJ/cm$^2$ (measured with an i-line).

Then, the temporary support was peeled from the laminate and exposed with an exposure amount of 400 mJ/cm$^2$ (measured with an i-line) using a post-exposure machine (manufactured by Ushio, Inc.) having a high pressure mercury lamp (post-exposure). Then, a post-baking treatment at 145° C. for 30 minutes was performed to form a laminate.

FIG. 8 shows a schematic view for illustrating a positional relationship of the respective layers included in laminates manufactured in Examples and Comparative Examples. Incidentally, FIG. 8 is merely a schematic view for convenience for illustrating a positional relationship with each layer, and none of the laminates of Examples and Comparative Examples has the configuration shown in FIG. 8 (in FIG. 8, each symbol means the following configuration: 113: first refractive index-adjusting layer, 115: resin layer, 121: second refractive index-adjusting layer, 131: fourth refractive index-adjusting layer, 141: third refractive index-adjusting layer, 151: fifth refractive index-adjusting layer, 200: member containing a layer with a high refractive index, 200A: transparent film substrate, 200B: sixth refractive index-adjusting layer, 200C: transparent conductive layer)

Measurement of Refractive Index and Thickness of Each Layer of Laminate

Also with regard to the obtained laminate, measurement of the refractive index and the thickness was carried out by the same method as described in [Measurement of Refractive Index and Thickness of Each Layer of Transfer Film] described above, and any of the thickness and the refractive index are the same as the thickness and the refractive index measured using the transfer film.

Evaluation

Measurement of Reflectance and Reflection Tint

By affixing a black polyethylene terephthalate (PET) material on the entire surface of the obtained laminate on the side of the member containing a layer with a high refractive index, the surface on the side of the member containing a layer with a high refractive index was shielded from light. The black PET material was affixed using a transparent adhesive tape (product name: OCA Tape 8171CL, manufactured by 3M Japan Ltd.). Then, using a spectrophotometer V-570 (manufactured by JASCO Corporation) so that light was incident from a side opposite to the surface to which the black PET substrate was affixed, a reflectance with respect to a D65 light source and a tint of the reflected light (reflection tint) of the laminate were measured (incidence angle 5°). Based on the obtained measurement results, the evaluation was carried out on the basis of the following standard. The results are shown in Table 6.

Furthermore, the reflection tint was evaluated based on the CIE1976 (L*, a*, b*) color space.

Evaluation Standard for Reflectance

AA: Less than 1.1%
A: 1.1% or more and less than 2.3%
B: 2.3% or more and less than 2.8%
C: 2.8% or more and 3.8% or less
D: More than 3.8%

Evaluation Standard of Reflection Tint

A: The absolute value of a* and the absolute value of b* are both 6.0 or less.
B: At least one of the absolute value of a* or the absolute value of b* is more than 6.0.

TABLE 6

| | Configuration of laminate | | | | Evaluation | |
|---|---|---|---|---|---|---|
| | Member containing layer with high refractive index | | Transfer film used | | | |
| | Type | Presence or absence of sixth layer | No. | Correspondent Example No. | Reflectance | Reflection tint (a*, b*) |
| Example 1A | F1 | Absent | Transfer film 1 | Example 1 | A (1.5%) | B (1.1, −16.2) |
| Example 2A | F1 | Absent | Transfer film 2 | Example 2 | A (2.2%) | B (8.3, −22.3) |
| Example 3A | F1 | Absent | Transfer film 3 | Example 3 | A (2.0%) | A (5.0, −5.0) |
| Example 4A | F1 | Absent | Transfer film 4 | Example 4 | A (1.1 %) | A (5.0, −3.3) |
| Example 5A | F1 | Absent | Transfer film 5 | Example 5 | A (1.35%) | A (−2.7, −5.0) |
| Example 6A | F1 | Absent | Transfer film 6 | Example 6 | A (1.29%) | A (−3.1, −5.0) |
| Example 7A | F1 | Absent | Transfer film 7 | Example 7 | AA (0.42%) | A (5.0, −5.0) |
| Example 8A | F1 | Absent | Transfer film 8 | Example 8 | A (1.12%) | A (1.1, −5.0) |
| Example 9A | F2 | Present | Transfer film 9 | Example 9 | A (1.1 %) | A (5.0, −5.0) |
| Example 10A | F2 | Present | Transfer film 10 | Example 10 | AA (0.7%) | A (4.3, −5.0) |
| Example 11A | F1 | Absent | Transfer film 11 | Example 11 | A (2.0%) | A (5.0, −5.0) |
| Example 12A | F1 | Absent | Transfer film 12 | Example 12 | A (2.0%) | A (5.0, −5.0) |
| Example 13A | F1 | Absent | Transfer film 13 | Example 13 | A (2.0%) | A (5.0, −5.0) |
| Example 14A | F1 | Absent | Transfer film 14 | Example 14 | A (2.0%) | A (5.0, −5.0) |
| Example 15A | F1 | Absent | Transfer film 15 | Example 15 | A (2.0%) | A (5.0, −5.0) |

TABLE 6-continued

| | Configuration of laminate | | | | | |
|---|---|---|---|---|---|---|
| | Member containing layer with high refractive index | | Transfer film used | | Evaluation | |
| | Type | Presence or absence of sixth layer | No. | Correspondent Example No. | Reflectance | Reflection tint (a*, b*) |
| Example 16A | F1 | Absent | Transfer film 16 | Example 16 | A (2.0%) | A (5.0, −5.0) |
| Example 17A | F1 | Absent | Transfer film 17 | Example 17 | A (2.0%) | A (5.0, −5.0) |
| Example 18A | F1 | Absent | Transfer film 18 | Example 18 | A (2.0%) | A (5.0, −5.0) |
| Comparative Example 1A | F1 | Absent | Transfer film R1 | Comparative Example 1 | D (5.7%) | A (−3.1, −5.2) |
| Comparative Example 2A | F1 | Absent | Transfer film R2 | Comparative Example 2 | D (4.0%) | B (6.5, −16.0) |

From the results shown in the table, it was confirmed tat the transfer films of Examples could provide a laminate having excellent antireflection properties and excellent reflection tint (the reflected light is not tinted).

EXPLANATION OF REFERENCES

11: temporary support
13: first layer
13A, 13B: surface of first layer
15: photosensitive composition layer
17: protective film
21: second layer
21A, 21B: surface of second layer
31: fourth layer
41: third layer
51: fifth layer
113: first refractive index-adjusting layer
115: resin layer
121: second refractive index-adjusting layer
131: fourth refractive index-adjusting layer
141: third refractive index-adjusting layer
151: fifth refractive index-adjusting layer
200: member containing layer with high refractive index
200A: transparent film substrate
200B: sixth refractive index-adjusting layer
200C: transparent conductive layer (corresponding to a layer with high refractive index)

What is claimed is:

1. A laminate comprising, in the following order:
a substrate;
a layer with a high refractive index;
a second refractive index-adjusting layer;
a resin layer; and
a first refractive index-adjusting layer,
wherein a refractive index of the layer with a high refractive index is higher than a refractive index of the resin layer,
the second refractive index-adjusting layer exhibits a higher refractive index than the refractive index of the resin layer and a lower refractive index than the refractive index of the layer with a high refractive index,
a refractive index of the first refractive index-adjusting layer is lower than the refractive index of the resin layer,
the refractive index of the first refractive index-adjusting layer is 1.45 or less,
the layer with a high refractive index is a transparent conductive layer,
the laminate comprises a fourth refractive index-adjusting layer on a side opposite to the resin layer side of the second refractive index-adjusting layer, and
the fourth refractive index-adjusting layer exhibits a lower refractive index than the refractive index of the resin layer.

2. The laminate according to claim 1,
wherein a refractive index on a surface of the second refractive index-adjusting layer on the resin layer side is lower than a refractive index on a surface of the second refractive index-adjusting layer on a side opposite to the resin layer side.

3. The laminate according to claim 1,
wherein a refractive index on a surface of the first refractive index-adjusting layer on a side opposite to the resin layer side is lower than a refractive index on a surface of the first refractive index-adjusting layer on the resin layer side.

4. The laminate according to claim 1,
wherein the resin layer is a cured product layer formed by curing a photosensitive composition.

5. The laminate according to claim 1,
wherein the resin layer is transparent.

6. The laminate according to claim 1,
wherein the resin layer is a cured product layer formed by curing a photosensitive composition, and
the layer with a high refractive index is a transparent conductive layer.

7. The laminate according to claim 6,
wherein the layer with a high refractive index has a thickness of 0.01 to 0.4 μm,
the resin layer has a thickness of 0.60 to 15 μm,
the first refractive index-adjusting layer has a thickness of 10 to 200 nm, and
the second refractive index-adjusting layer has a thickness of 20 to 200 nm.

8. An acoustic speaker comprising the laminate according to claim 1.

9. The laminate according to claim 2, further comprising a fourth refractive index-adjusting layer on a side opposite to the resin layer side of the second refractive index-adjusting layer,
wherein the fourth refractive index-adjusting layer exhibits a lower refractive index than the refractive index of the resin layer.

10. The laminate according to claim 2,
wherein a refractive index on a surface of the first refractive index-adjusting layer on a side opposite to the resin layer side is lower than a refractive index on a surface of the first refractive index-adjusting layer on the resin layer side.

11. A laminate comprising, in the following order:
a substrate;
a layer with a high refractive index;
a second refractive index-adjusting layer;
a resin layer; and
a first refractive index-adjusting layer,
wherein a refractive index of the layer with a high refractive index is higher than a refractive index of the resin layer,
the second refractive index-adjusting layer exhibits a higher refractive index than the refractive index of the resin layer and a lower refractive index than the refractive index of the layer with a high refractive index,
a refractive index of the first refractive index-adjusting layer is lower than the refractive index of the resin layer,
the refractive index of the first refractive index-adjusting layer is 1.45 or less,
the layer with a high refractive index is a transparent conductive layer, and
the laminate comprises a third refractive index-adjusting layer exhibiting a higher refractive index than the refractive index of the resin layer between the first refractive index-adjusting layer and the resin layer.

12. A laminate comprising, in the following order:
a substrate;
a layer with a high refractive index;
a second refractive index-adjusting layer;
a resin layer; and
a first refractive index-adjusting layer,
wherein a refractive index of the layer with a high refractive index is higher than a refractive index of the resin layer,
the second refractive index-adjusting layer exhibits a higher refractive index than the refractive index of the resin layer and a lower refractive index than the refractive index of the layer with a high refractive index,
a refractive index of the first refractive index-adjusting layer is lower than the refractive index of the resin layer,
the refractive index of the first refractive index-adjusting layer is 1.45 or less,
the layer with a high refractive index is a transparent conductive layer,
a refractive index on a surface of the second refractive index-adjusting layer on the resin layer side is lower than a refractive index on a surface of the second refractive index-adjusting layer on a side opposite to the resin layer side, and
the laminate comprises a third refractive index-adjusting layer exhibiting a higher refractive index than the refractive index of the resin layer between the first refractive index-adjusting layer and the resin layer.

13. A laminate comprising, in the following order:
a substrate;
a layer with a high refractive index;
a second refractive index-adjusting layer;
a resin layer; and
a first refractive index-adjusting layer,
wherein a refractive index of the layer with a high refractive index is higher than a refractive index of the resin layer,
the second refractive index-adjusting layer exhibits a higher refractive index than the refractive index of the resin layer and a lower refractive index than the refractive index of the layer with a high refractive index,
a refractive index of the first refractive index-adjusting layer is lower than the refractive index of the resin layer,
the refractive index of the first refractive index-adjusting layer is 1.45 or less,
the layer with a high refractive index is a transparent conductive layer,
the laminate comprises a fourth refractive index-adjusting layer on a side opposite to the resin layer side of the second refractive index-adjusting layer,
the fourth refractive index-adjusting layer exhibits a lower refractive index than the refractive index of the resin layer, and
the laminate comprises a third refractive index-adjusting layer exhibiting a higher refractive index than the refractive index of the resin layer between the first refractive index-adjusting layer and the resin layer.

14. A laminate comprising, in the following order:
a substrate;
a layer with a high refractive index;
a second refractive index-adjusting layer;
a resin layer; and
a first refractive index-adjusting layer,
wherein a refractive index of the layer with a high refractive index is higher than a refractive index of the resin layer,
the second refractive index-adjusting layer exhibits a higher refractive index than the refractive index of the resin layer and a lower refractive index than the refractive index of the layer with a high refractive index,
a refractive index of the first refractive index-adjusting layer is lower than the refractive index of the resin layer,
the refractive index of the first refractive index-adjusting layer is 1.45 or less,
the layer with a high refractive index is a transparent conductive layer,
a refractive index on a surface of the first refractive index-adjusting layer on a side opposite to the resin layer side is lower than a refractive index on a surface of the first refractive index-adjusting layer on the resin layer side, and
the laminate comprises a third refractive index-adjusting layer exhibiting a higher refractive index than the refractive index of the resin layer between the first refractive index-adjusting layer and the resin layer.

\* \* \* \* \*